(12) United States Patent
Yoshimoto et al.

(10) Patent No.: US 9,385,819 B2
(45) Date of Patent: Jul. 5, 2016

(54) TERMINAL DEVICE, BASE STATION DEVICE, COMMUNICATION SYSTEM, RECEPTION METHOD, TRANSMISSION METHOD, AND COMMUNICATION METHOD

(71) Applicant: Sharp Kabushiki Kaisha, Osaka-shi, Osaka (JP)

(72) Inventors: Takashi Yoshimoto, Osaka (JP); Kozue Yokomakura, Osaka (JP); Ryota Yamada, Osaka (JP); Katsuya Kato, Osaka (JP); Hiromichi Tomeba, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/769,871

(22) PCT Filed: Feb. 25, 2014

(86) PCT No.: PCT/JP2014/054549
§ 371 (c)(1),
(2) Date: Aug. 24, 2015

(87) PCT Pub. No.: WO2014/136620
PCT Pub. Date: Sep. 12, 2014

(65) Prior Publication Data
US 2016/0006521 A1  Jan. 7, 2016

(30) Foreign Application Priority Data

Mar. 6, 2013  (JP) .................................. 2013-043664
Apr. 4, 2013  (JP) .................................. 2013-078218
Aug. 7, 2013  (JP) .................................. 2013-164089

(51) Int. Cl.
*H03D 1/04*    (2006.01)
*H03D 1/06*    (2006.01)
(Continued)

(52) U.S. Cl.
CPC .............. *H04B 15/00* (2013.01); *H04B 7/0417* (2013.01); *H04B 7/0452* (2013.01); *H04W 8/24* (2013.01); *H04W 76/02* (2013.01)

(58) Field of Classification Search
CPC .... H04B 15/00; H04B 7/0417; H04B 7/0452; H04B 7/024; H04W 8/24; H04W 76/02; H04W 72/082
USPC ................... 375/346, 347, 348; 370/252, 238
See application file for complete search history.

(56) References Cited

U.S. PATENT DOCUMENTS

| 8,593,976 | B2 | 11/2013 | Kishigami et al. |
| 8,731,480 | B2 * | 5/2014 | Kim ...................... H04B 7/024 370/238 |

(Continued)

FOREIGN PATENT DOCUMENTS

| JP | 2006-238423 A | 9/2006 |
| JP | 2012-029181 A | 2/2012 |

(Continued)

OTHER PUBLICATIONS

Official Communication issued in International Patent Application No. PCT/JP2014/054549, mailed on Apr. 28, 2014.

(Continued)

*Primary Examiner* — Phuong Phu
(74) *Attorney, Agent, or Firm* — Keating & Bennett, LLP

(57) ABSTRACT

A terminal device according to an aspect of the present invention includes a reception module that receives a control channel and a spatially multiplexed data signal channel, a control signal detection module that extracts, from an output from the reception module, a demodulation control information which is a transmission parameter of a signal that is transmitted to the terminal device, in a data signal channel that is output from the reception module, and assistance control information which is a transmission parameter of a signal that is transmitted to a different terminal device, in the data signal channel that is output from the reception module, a channel estimator that obtains a channel estimate by using a reference signal, a signal detection module that demultiplexes the data signal channel by using the demodulation control information, the assistance control information, and the channel estimate, and a decoding module that decodes a signal that is output by the signal detection module, in which information indicating a rank is included in the assistance control information.

15 Claims, 22 Drawing Sheets

(51) Int. Cl.
*H03K 5/01* (2006.01)
*H03K 6/04* (2006.01)
*H04B 1/10* (2006.01)
*H04L 1/00* (2006.01)
*H04L 25/08* (2006.01)
*H04B 15/00* (2006.01)
*H04W 8/24* (2009.01)
*H04B 7/04* (2006.01)
*H04W 76/02* (2009.01)

(56) References Cited

U.S. PATENT DOCUMENTS

| | | | |
|---|---|---|---|
| 8,879,468 | B2 | 11/2014 | Benjebbour et al. |
| 2009/0016263 | A1 | 1/2009 | Kishigami et al. |
| 2012/0026955 | A1 | 2/2012 | Benjebbour et al. |
| 2012/0051303 | A1 | 3/2012 | Dhanda et al. |
| 2014/0045497 | A1 | 2/2014 | Abe et al. |
| 2014/0185528 | A1 | 7/2014 | Shimezawa et al. |
| 2014/0314033 | A1 | 10/2014 | Ohwatari et al. |
| 2015/0117341 | A1 | 4/2015 | Ohwatari et al. |
| 2015/0139004 | A1* | 5/2015 | Fodor .............. H04W 72/082 370/252 |

FOREIGN PATENT DOCUMENTS

| | | |
|---|---|---|
| JP | 2012-248909 A | 12/2012 |
| JP | 2013-042263 A | 2/2013 |
| JP | 2013-093749 A | 5/2013 |
| WO | 2012/027718 A1 | 3/2012 |
| WO | 2013/157331 A1 | 10/2013 |

OTHER PUBLICATIONS

Spencer et al., "An Introduction to the Multi-User MIMO Downlink", IEEE Communications Magazine, Oct. 2004, pp. 60-67.

Johann et al., "MMSE Approaches to Multiuser Spatio-Temporal Tomlinson-Harashima Precoding", Proc. 5th Int. ITG Conf. on Source and Channel Coding, Jan. 2004, 8 pages.

Hochwald et al., "A Vector-Perturbation Technique for Near-Capacity Multiantenna Multiuser Communication-Part II: Perturbation", IEEE Transactions on Communications, vol. 53, No. 3, Mar. 2005, pp. 537-544.

Qualcomm Europe, "Heterogeneous Networks: General views", 3GPP TSG-RAN WG1 #58bis, R1-094224, Oct. 12-16, 2009, pp. 1-4.

Hoshino et al., "Tutorial on Coordinated Multi-point Transmisssion/Reception Techniques for LTE-Advanced", IEICE Technical Report, RCS2011-34, May 2011, 1 page.

MediaTek et al., "Study on Network Assisted Interference Cancellation and Suppression for LTE", 3GPP TSG RAN Meeting #58, RP-121995, Dec. 4-7, 2012, 7 pages.

* cited by examiner

FIG. 12

| UE CATEGORY | MAXIMUM NUMBER OF DL-SCH TRANSPORT BLOCK BITS THAT ARE RECEIVED IN 1TTI | MAXIMUM NUMBER OF BITS OF DL-SCH TRANSPORT BLOCK THAT IS RECEIVED IN 1TTI | TOTAL NUMBER OF SOFT CHANNEL BITS | MAXIMUM NUMBER OF LAYERS THAT ARE SUPPORTED FOR SPATIAL MULTIPLEXING IN DL |
|---|---|---|---|---|
| CATEGORY 1 | 10296 | 10296 | 250368 | 1 |
| CATEGORY 2 | 51024 | 51024 | 1237248 | 2 |
| CATEGORY 3 | 102048 | 75376 | 1237248 | 2 |
| CATEGORY 4 | 150752 | 75376 | 1827072 | 2 |
| CATEGORY 5 | 299552 | 149776 | 3667200 | 4 |
| CATEGORY 6 | 301504 | 149776 (4 layers) 75376 (2 layers) | 3654144 | 2 or 4 |
| CATEGORY 7 | 301504 | 149776 (4 layers) 75376 (2 layers) | 3654144 | 2 or 4 |
| CATEGORY 8 | 2998560 | 299856 | 35982720 | 8 |
| CATEGORY A | A1 | A2 | A3 | A4 |

FIG. 13

| UE CATEGORY | MAXIMUM NUMBER OF DL-SCH TRANSPORT BLOCK BITS THAT ARE RECEIVED IN 1 TTI | MAXIMUM NUMBER OF BITS OF DL-SCH TRANSPORT BLOCK THAT IS RECEIVED IN 1 TTI | TOTAL NUMBER OF SOFT CHANNEL BITS | MAXIMUM NUMBER OF LAYERS THAT ARE SUPPORTED FOR SPATIAL MULTIPLEXING IN DL | ITEM B |
|---|---|---|---|---|---|
| CATEGORY 1 | 10296 | 10296 | 250368 | 1 | B1 |
| CATEGORY 2 | 51024 | 51024 | 1237248 | 2 | B2 |
| CATEGORY 3 | 102048 | 75376 | 1237248 | 2 | B3 |
| CATEGORY 4 | 150752 | 75376 | 1827072 | 2 | B4 |
| CATEGORY 5 | 299552 | 149776 | 3667200 | 4 | B5 |
| CATEGORY 6 | 301504 | 149776 (4 layers) 75376 (2 layers) | 3654144 | 2 or 4 | B6 |
| CATEGORY 7 | 301504 | 149776 (4 layers) 75376 (2 layers) | 3654144 | 2 or 4 | B7 |
| CATEGORY 8 | 2998560 | 299856 | 35982720 | 8 | B8 |

FIG. 14

| UE CATEGORY | MAXIMUM NUMBER OF DL-SCH TRANSPORT BLOCK BITS THAT ARE RECEIVED IN 1TTI | MAXIMUM NUMBER OF BITS OF DL-SCH TRANSPORT BLOCK THAT IS RECEIVED IN 1TTI | TOTAL NUMBER OF SOFT CHANNEL BITS | MAXIMUM NUMBER OF LAYERS THAT ARE SUPPORTED FOR SPATIAL MULTIPLEXING IN DL | MAXIMUM NUMBER OF PIECES OF RECEIVABLE TERMINAL INFORMATION |
|---|---|---|---|---|---|
| CATEGORY 1 | 10296 | 10296 | 250368 | 1 | 0 |
| CATEGORY 2 | 51024 | 51024 | 1237248 | 2 | 1 |
| CATEGORY 3 | 102048 | 75376 | 1237248 | 2 | 1 |
| CATEGORY 4 | 150752 | 75376 | 1827072 | 2 | 1 |
| CATEGORY 5 | 299552 | 149776 | 3667200 | 4 | 2 |
| CATEGORY 6 | 301504 | 149776 (4 layers) 75376 (2 layers) | 3654144 | 2 or 4 | 1 or 2 |
| CATEGORY 7 | 301504 | 149776 (4 layers) 75376 (2 layers) | 3654144 | 2 or 4 | 1 or 2 |
| CATEGORY 8 | 2998560 | 299856 | 35982720 | 8 | 6 |

FIG. 15

| UE CATEGORY | MAXIMUM NUMBER OF DL-SCH TRANSPORT BLOCK BITS THAT ARE RECEIVED IN 1TTI | MAXIMUM NUMBER OF BITS OF DL-SCH TRANSPORT BLOCK THAT IS RECEIVED IN 1TTI | TOTAL NUMBER OF SOFT CHANNEL BITS | MAXIMUM NUMBER OF LAYERS THAT ARE SUPPORTED FOR SPATIAL MULTIPLEXING IN DL | ITEM D |
|---|---|---|---|---|---|
| CATEGORY 1 | 10296 | 10296 | 250368 | 1 | C5 |
| CATEGORY 2 | 51024 | 51024 | 1237248 | 2 | C6 |
| CATEGORY 3 | 102048 | 75376 | 1237248 | 2 | C7 |
| CATEGORY 4 | 150752 | 75376 | 1827072 | 2 | C8 |
| CATEGORY 5 | 299552 | 149776 | 3667200 | 4 | C9 |
| CATEGORY 6 | 301504 | 149776 (4 layers) 75376 (2 layers) | 3654144 | 2 or 4 | C10 |
| CATEGORY 7 | 301504 | 149776 (4 layers) 75376 (2 layers) | 3654144 | 2 or 4 | C11 |
| CATEGORY 8 | 2998560 | 299856 | 35982720 | 8 | C12 |
| CATEGORY C | C1 | C2 | C3 | C4 | C13 |

FIG. 19

|  | #0 | #1 | #2 | #3 | #4 | #5 | #6 | #7 | #8 | #9 |
|---|---|---|---|---|---|---|---|---|---|---|
| (1) | Downlink | Guard | Uplink | Uplink | Uplink | Downlink | Guard | Uplink | Uplink | Uplink |
| (2) | Downlink | Guard | Uplink | Uplink | Downlink | Downlink | Guard | Uplink | Uplink | Downlink |
| (3) | Downlink | Guard | Uplink | Downlink | Downlink | Downlink | Guard | Uplink | Downlink | Downlink |
| (4) | Downlink | Guard | Uplink | Uplink | Uplink | Downlink | Downlink | Downlink | Downlink | Downlink |
| ... |

TERMINAL DEVICE, BASE STATION DEVICE, COMMUNICATION SYSTEM, RECEPTION METHOD, TRANSMISSION METHOD, AND COMMUNICATION METHOD

TECHNICAL FIELD

The present invention relates to a terminal device, a base station device, a communication system, a reception method, a transmission method, and a communication method.

The present application claims the benefit of priority of Japanese Patent Application JP 2013-43664 filed Mar. 6, 2013, Japanese Patent Application JP 2013-78218 filed Apr. 4, 2013, and Japanese Patent Application JP 2013-164089 filed Aug. 7, 2013, the entire contents of which are hereby incorporated by reference.

BACKGROUND ART

In recent years, in order to cope with an increase in high-capacity service or the like in a wireless communication system such as a portable telephone, multi-user Multi Input Multi Output (MIMO) transmission techniques have been studied in terms of improving spectral efficiency (NPL 1). In order to suppress degradation in performance due to interference (inter-user interference) that occurs between users, transmission precoding techniques that have high interference suppression performance, such as Tomlinson Harashima Precoder (THP) and Vector Perturbation (VP), have been studied in such multi-user MIMO (NPL 2 and NPL 3).

Furthermore, in order to cope with the increase in high-capacity service or the like, in terms of dispersing traffic, a cellular environment including a heterogeneous network has been studied where multiple base station devices are arranged in such a manner that part or all of a coverage area of a macro cell that micro cell base station devices constitute overlaps a coverage area of a cell that low-power base station devices (a pico-cell base station device, a femto-cell base station device, and the like) which have lower transmission power than the macro cell base station devices constitute, and each terminal is distributed (load-distributed) to each base station device (NPL 4).

Furthermore, in order to suppress degradation in performance due to interference (intercell interference, inter-sector interference and the like) and the like that occur between cells in a cellular environment, coordinated communication (Coordinated Multi Point transmission/reception (CoMP)) techniques that suppress interference which is applied from a cell on the transmitting side to a different cell have been studied (NPL 5).

CITATION LIST

Non Patent Literature

NPL 1: Quentin H. Spencer, Christian B. Peel, A. Lee Swindlehurst, Martin Haardt, "An Introduction to the Multi-User MIMO Downlink," IEEE Communications Magazine, October 2004

NPL 2: M. Joham, et. al., "MMSE approaches to multiuser spatio-temporal Tomlinson-Harashima precoding," Proc. 5th Int. ITG Conf. on Source and Channel Coding, Erlangen, Germany, January 2004

NPL 3: B. M. Hochwald, et. al., "A vector—perturbation technique for near-capacity multiantenna multiuser communication—Part II: Perturbation," IEEE Trans. Commun., Vol. 53, No. 3, pp. 537-544, March 2005

NPL 4: R1-094224, 3GPP TSG-RAN WG1 #58bis Miyazaki, Japan, 12-16 Oct. 2009

NPL 5: The Institute of Electronics, Information and Communication Engineers' Technology Research Technical Committee on Radio Communication Systems RCS2011-34, May 2011

SUMMARY OF INVENTION

Technical Problem

In order to calculate transmission weight that is used for transmission precoding in the multiuser MIMO described above, for example, in a downlink, a base station device needs channel state information (for example, a channel frequency response) on a channel between the base station device and each of the terminal devices of all users that perform MIMO multiplexing. For example, in a case where transmission weight that suppresses the inter-user interference with high precision is calculated, the channel state information is a channel matrix that is made from a combination of the number of transmit antennas and the number of receive antennas. Then, in order to calculate the transmission weight that suppresses the inter-user interference with high precision, it is desirable that the number of quantized bits of the channel state information is large. Additionally, each terminal device needs to calculate the channel state information, and feed back, for example, a Channel State Indicator (CSI) to the base station device, using an uplink. Accordingly, in a communication system to which the multiuser MIMO is applied, control information that is fed back is increased.

Furthermore, as a transmission method in the CoMP technique described above, for example, there is a Coordinated Beamforming (CB) scheme. With the CB scheme, in a group of multiple base station devices (a group of coordinating base station devices) that coordinate with each other, for example, a certain base station device precodes the transmission weight that performs beamforming in such a manner as to direct null toward the terminal device that connects to a different base station device. For the calculation of the transmission weight with the CB scheme, the channel state information (the channel matrix) on the channel between the base station device that calculates the transmission weight and each of all the terminal devices that connect to the group of coordinating base station devices is required. Then, for the suppression of the intercell interference with high precision, it is desirable that the number of quantized bits of the channel state information is large. Additionally, each terminal device needs to calculate the channel state information, and feed back the calculated channel state information to the coordinating base station device to which the terminal device connects. Accordingly, also in a communication system that uses the CoMP, the fed-back control information is increased.

However, from the viewpoint of preventing the spectral efficiency from degrading or the like, there is a limit to a resource that can be allocated to the feedback information. Accordingly, an amount of feedback information for suppressing the inter-user interference and the intercell interference is limited. When the amount of feedback information is small and the precision of the fed-back channel state information is low, because the precoding is performed using incomplete transmission weight, there is a problem that the inter-user interference suppression performance and the intercell interference suppression performance on the transmitting side are limited and it is not possible to sufficiently improve the spectral efficiency.

In view of such situation, the present invention is made and an object of the present invention is to provide a terminal device, a base station device, a communication system, a reception method, a transmission method, and a communication method, in which it is possible to suppress inter-user interference and intercell interference and to improve spectral efficiency.

Solution to Problem

Configurations of the terminal device, the base station device, the communication system, the reception method, the transmission method, and the communication method according to embodiments of the present invention for solving the problems described above are as follows.

A terminal device according to an aspect of the present invention is a terminal device that communicates with a base station device. The terminal device causes an interference suppression capability indicating information relating to a capability, which the terminal device has, of suppressing interference to be included in UE capability information indicating information relating to a function that the terminal device is able to use and the terminal device transfers the UE capability information to the base station device.

In the terminal device, the interference suppression capability may include information on whether or not to have a function of suppressing interference.

In the terminal device, the interference suppression capability may include an interference suppression scheme that the terminal device has.

In the terminal device, the interference suppression capability may include information indicating the maximum number of layers of interference signals that the terminal device can suppress.

In the terminal device, the interference suppression capability may include the maximum number of pieces of information relating to an interference signal that is transferred from the base station device.

In the terminal device, the UE capability information may be transferred as a function group index.

In the terminal device, the interference suppression capability may be transferred to the base station device in a state of being associated with a UE category indicating a category of the terminal device.

In the terminal device, the interference suppression capability may be defined on the basis of a number of the UE category.

In addition, in the terminal device, the interference suppression capability may be defined on the basis of items of the UE category.

A communication device according to another aspect of the present invention is a communication device that communicates with a terminal device. The communication device receives an interference suppression capability indicating information relating to a capability, which the terminal device has, of suppressing interference, the interference suppression capability being transferred from the terminal device, and the communication device transmits assistance control information indicating information relating to an interference signal that is suppressed by the terminal device.

In the communication device, in a case where the maximum number of pieces of receivable terminal information is included in the interference suppression capability, pieces of signal information relating to an interference signal, of which the number is smaller than the maximum number of pieces of receivable terminal information, may be set to be the assistance control information.

Advantageous Effects of Invention

According to the embodiments of the present invention, while an influence due to a limitation on an amount of feedback information in the communication system is reduced, the inter-user interference and intercell interference can be suppressed, and the spectral efficiency can be improved.

BRIEF DESCRIPTION OF DRAWINGS

FIG. 12 is a first configuration example of a UE category according to the third embodiment.

FIG. 13 is a second configuration example of the UE category according to the third embodiment.

FIG. 14 is a specific example of the second configuration example of the UE category according to the third embodiment.

FIG. 15 is a third configuration example of the UE category according to the third embodiment.

FIG. 19 is a diagram illustrating one example of transmission frame format according to the fourth embodiment.

DESCRIPTION OF EMBODIMENTS (First Embodiment)

Figure 1:
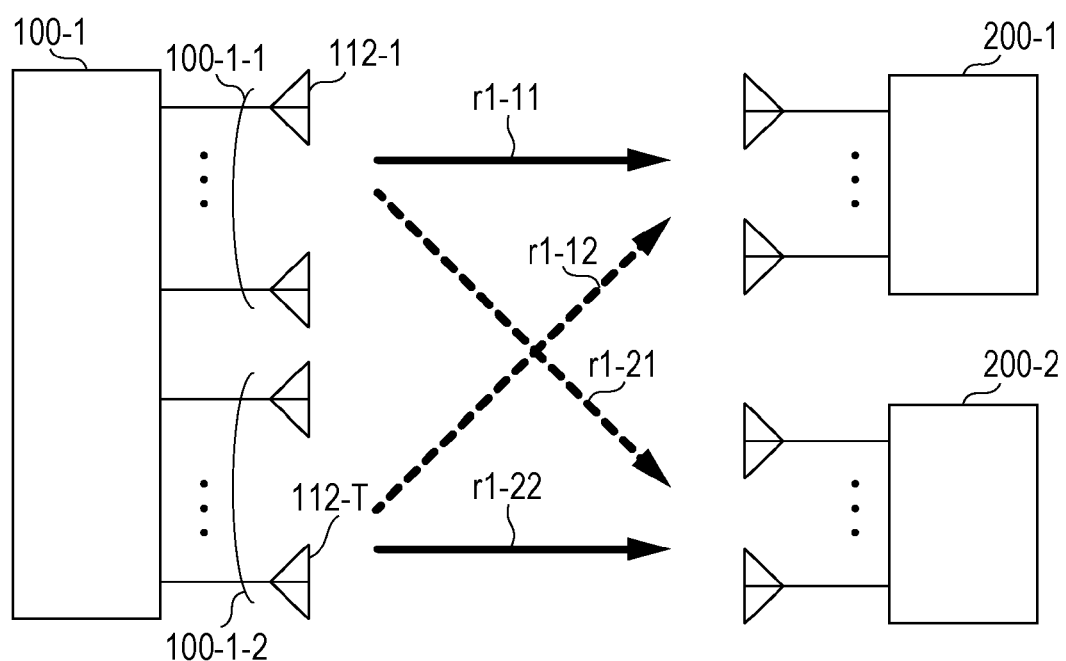
FIG. 1 is a schematic diagram illustrating a configuration of a communication system according to a first embodiment.

A terminal device according to an aspect of the present embodiment includes a reception module that receives a control channel and a spatially multiplexed data signal channel, a control signal detection module that extracts, from an output from the reception module, demodulation control information which is a transmission parameter of a signal that is transmitted to the terminal device, in a data signal channel that is output from the reception module, and assistance control information which is a transmission parameter of a signal that is transmitted to a different terminal device, in the data signal channel that is output from the reception module, a channel estimator that obtains a channel estimate by using a reference signal, a signal detection module that demultiplexes the data signal channel by using the demodulation control information, the assistance control information, and the channel estimate, and a decoding module that decodes a signal that is output by the signal detection module, in which information indicating a rank is included in the assistance control information.

Furthermore, in the terminal device described above, information indicating a port number may be included in the assistance control information.

Furthermore, in the terminal device described above, information relating to the reference signal may be included in the assistance control information.

Furthermore, in the terminal device described above, information indicating transmission power may be included in the assistance control information.

Furthermore, in the terminal device described above, information indicating a transmission mode may be included in the assistance control information.

Furthermore, in the terminal device described above, information indicating a duplex scheme may be included in the assistance control information.

Furthermore, in the terminal device described above, a cell ID of a base station device to which a different terminal device connects may be included in the assistance control information.

Furthermore, in the terminal device described above, the decoding module may be configured in such a manner that results of decoding of the signal that is transmitted to the terminal device to which the decoding module belongs and the signal that is transmitted to the different terminal device are fed back to the signal detection module, and the signal detection module may be configured in such a manner that the spatially multiplexed data signals are demultiplexed using the result of the decoding.

Furthermore, in the terminal device described above, the signal detection module may be configured in such a manner that, using the results of the decoding, the signal detection module generates a receive signal replica of a signal that is transmitted to at least the different terminal device, and subtracts the receive signal replica from the data signal channel that is output from the reception module.

Furthermore, in the terminal device described above, the detection module may be configured to perform maximum likelihood detection.

A base station device according to another aspect of the present embodiment includes a control signal generation module that, for a certain terminal device, generates a control channel which includes demodulation control information that is a transmission parameter of a signal that is transmitted to the terminal device and assistance control information that is a transmission parameter relating to a signal that is transmitted to a terminal device other than the terminal device, a layer mapping module that maps a data signal channel that is destined for multiple terminal devices, to a layer onto which to perform spatial multiplexing, a resource mapping module that maps the control channel and the data signal channel to a radio resource, and a transmit antenna through which an output of the resource mapping module is transmitted, in which information indicating a rank is included in the assistance control information.

Furthermore, in the base station device, the information indicating the port number may be included in the assistance control information.

Furthermore, in the base station device, the information relating to the reference signal may be included in the assistance control information.

Furthermore, in the base station device, the information indicating the transmission power may be included in the assistance control information.

Furthermore, in the base station device, the information indicating the transmission mode may be included in the assistance control information.

Furthermore, in the base station device, the information indicating the duplex scheme may be included in the assistance control information.

Furthermore, in the base station device, the cell ID of the base station device to which a difference terminal device connects may be included in the assistance control information.

Furthermore, in the base station device, each of the signals destined for the multiple terminal devices may be transmitted from a different transmit antenna.

Furthermore, in the base station device, the assistance control information may be information relating to a transmission parameter of a signal that is transmitted by a different base station device.

Furthermore, the base station device may further include a precoding module that performs precoding on an output of the layer mapping module, for a terminal device that is a transmission destination.

A communication system according to still another aspect of the present embodiment includes a base station device that includes a control signal generation module that, for a certain terminal device, generates a control channel which includes demodulation control information that is a transmission parameter of a signal that is transmitted to the terminal device and assistance control information that is a transmission parameter relating to a signal that is transmitted to a terminal device other than the terminal device, a layer mapping module that maps a data signal channel that is destined for multiple terminal devices, to a layer onto which to perform spatial multiplexing, a reference signal generation module that generates a reference signal, a resource mapping module that maps the control channel, the data signal channel, and the reference signal to a radio resource, and a transmit antenna through which an output of the resource mapping module is transmitted, and a terminal device that includes a reception module that receives a control channel and a spatially multiplexed data signal channel, a control signal detection module that extracts, from an output from the reception module, the demodulation control information and the assistance control information that are included in a data signal channel that is output from the reception module, a channel estimator that obtains a channel estimate, using the reference signal, a signal detection module that demultiplexes the data signal channel, using the demodulation control information, the assistance control information, and the channel estimate, and a decoding module that decodes a signal that is output from the signal detection module, in which information indicating a rank is included in the assistance control information.

A reception method according to still another aspect of the present embodiment includes a reception step of receiving a control channel and a spatially multiplexed data signal channel, a control signal detection step of extracting, from the data signal channel, demodulation control information that is a transmission parameter of a signal that is transmitted to a terminal device in which the reception method is performed in a data signal channel that is obtained in the reception step, and assistance control information that is a transmission parameter of a signal that is transmitted to a different terminal device in the data signal channel that is obtained in the reception step, a channel estimation step of obtaining a channel estimate by using a reference signal, a signal detection step of demultiplexing the data signal channel, using the demodulation control information, the assistance control information and the channel estimate, and a decoding step of decoding a signal that is obtained in the signal detection step, in which information indicting a rank is included in the assistance control information.

A transmission method according to still another aspect of the present embodiment includes a control signal step of generating for a certain terminal device a control channel which includes demodulation control information that is a transmission parameter of a signal that is transmitted to the terminal device and assistance control information that is a transmission parameter relating to a signal that is transmitted to a terminal device other than the terminal device, a layer mapping step of mapping a data signal channel that is destined for multiple terminal devices, to a layer onto which to perform spatial multiplexing, a resource mapping step of mapping the control channel and the data signal channel to a radio resource, and a transmission step of transmitting an output of the resource mapping module, in which information indicating a rank is included in the assistance control information.

A communication method according to still another aspect of the present embodiment includes a transmission method that includes a control signal generation step of generating for a certain terminal device a control channel which includes demodulation control information that is a transmission parameter of a signal that is transmitted to the terminal device and assistance control information that is a transmission parameter relating to a signal that is transmitted to a terminal device other than the terminal device, a layer mapping step of mapping a data signal channel that is destined for multiple terminal devices, to a layer onto which to perform spatial multiplexing, a reference signal generation step of generating a reference signal, a resource mapping step of mapping the control channel, the data signal channel, and the reference signal to a radio resource, and a transmission step of transmitting a signal that is obtained in the resource mapping step, and a reception method that includes a reception step of receiving a control channel and a spatially multiplexed data signal channel, a control signal detection step of extracting from a signal obtained in the reception step the demodulation control information and the assistance control information that are included in a data signal channel that is output in the reception step, a channel step of obtaining a channel estimate, using the reference signal, a signal detection step of demultiplexing the data signal channel, using the demodulation control information, the assistance control information, and the channel estimate, and a decoding step of decoding a signal that is output in the signal detection step, in which information indicating a rank is included in the assistance control information.

FIG. 1 is a schematic diagram illustrating a downlink configuration of the communication system according to the first embodiment. A terminal device 200-1 and a terminal device 200-2 (items of user equipment (UE)) wirelessly connect to a base station device 100-1 (eNodeB). The base station device 100-1 has multiple transmit antennas. Furthermore, the terminal device 200-1 and the terminal device 200-2 each have multiple receive antennas. The base station device 100-1 can transmit a signal that is destined for the terminal device 200-1 and the terminal device 200-2, in a state of being spatially multiplexed (this is also referred to as multi user-multi input multi output (MU-MIMO). Among the transmit antennas, one group of transmit antennas (100-1-1) is used for transmitting a signal that is destined for the terminal device 200-1. The other group of transmit antennas (100-1-2) is used for transmitting a signal that is destined for the terminal device 200-2. Accordingly, a signal that is transmitted from the group of transmit antennas 100-1-1 is a desired signal for the terminal device 200-1 (r1-11) and is an interference signal for the terminal device 200-2 (r1-21). Furthermore, a signal that is transmitted from the group of transmit antennas 100-1-2 is the interference signal for the terminal device 200-1 (r1-12) and is the desired signal for the terminal device 200-2 (r1-22).

Figure 2:
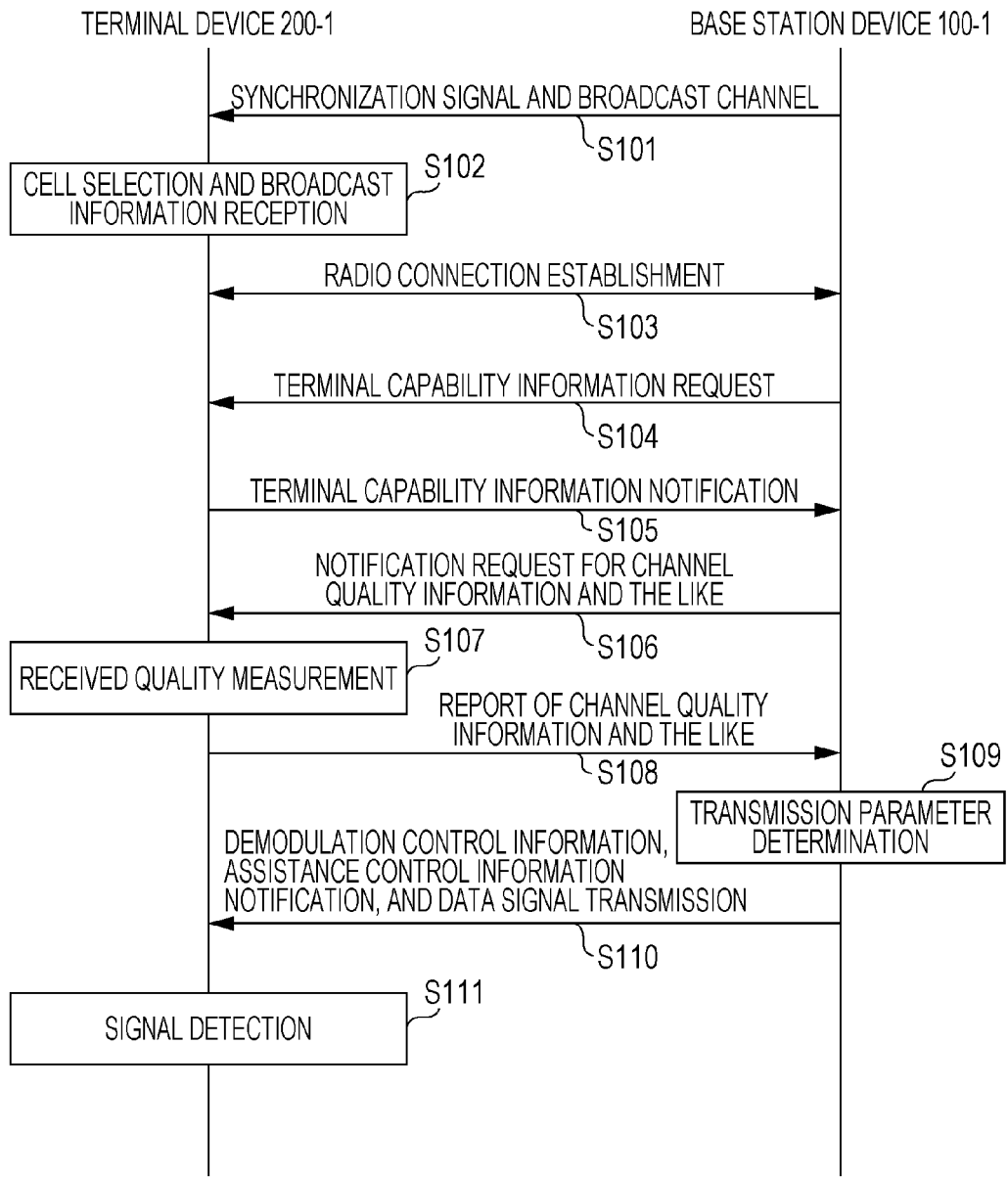
FIG. 2 is a sequence diagram illustrating processing between the base station device and the terminal device in the communication system according to the first embodiment.

FIG. 2 is a sequence diagram illustrating processing between the base station device and the terminal device in the communication system according to the first embodiment. FIG. 2 is a diagram for describing a connection and downlink data transmission processing between the base station device 100-1 and the terminal device 200-1 in the communication system described in FIG. 1. The same processing can also be performed in the terminal device 200-2.

The base station device transmits a synchronization signal and a broadcast channel (a Physical Broadcast Channel) at a given frequency and time timing that are determined in the communication system (S101). The terminal device 200-1 performs cell selection using the received synchronization signal (S102). The cell selection is to select the base station device to which the terminal device connects. For example, with correlation processing that uses the synchronization signal, the terminal device 200-1 selects the base station device that has high reception electric field strength. In FIG. 2, the terminal device 200-1 selects the base station device 100-1 from among multiple base station devices. At the time of the cell selection, the terminal device 200-1 establishes frame synchronization and symbol synchronization. Furthermore, the terminal device 200-1 can acquire a cell ID of the base station device 100-1. For example, in Long Term Evolution (LTE) or LTE-Advanced (LTE-A), a Primary Synchronization Signal (a PSS) and a Secondary Synchronization Signal (an SSS) can be used.

Furthermore, the terminal device 200-1 acquires broadcast information from the broadcast channel (S102). Accordingly, the terminal device 200-1 can acquire pieces of basic system information (for example, is also referred to as a Master Information Block (MIB)) in the base station device 100-1, such as a system bandwidth, a system frame number, and the number of transmit antennas.

Next, the base station device 100-1 and the terminal device 200-1 establish a radio connection (for example, RRC Connection establish) (S103). For example, a 3-way handshake and the like are used in which a connection request (a RRC Connection Request) from the terminal device 200-1 to the base station device 100-1, a connection setup information notification (for example, RRC Connection setup) from the base station device 100-1 to the terminal device 200-1, and a connection completion information notification (for example RRC Connection Setup Complete) from the terminal device 200-1 to the base station device 100-1 are performed in this order. Moreover, the base station device can transmit the connection request as one portion of random access.

Next, the base station device 100-1 makes a request to the terminal device 200-1, which establishes the radio connection, for terminal capability information (S104). When receiving the request for the terminal capability information (S104), the terminal device 200-1 notifies the base station device 100-1 of the terminal capability information (S105). For example, the terminal capability information is replaced with UE capability Information in LTE and the like. Information relating to a function that can be used by the terminal device is included in the terminal capability information. Furthermore, as the terminal capability information, a category of terminal devices can be included.

For example, the terminal device 200-1 can notify the base station device 100-1 of information that the terminal device 200-1 has an interference suppression function (or a cancellation function), as the terminal capability information. For example, the terminal device 200-1 can notify the base station device 100-1 that the terminal device 200-1 belongs to a category of terminals that have the interference suppression function, as the terminal capability information. Moreover, the information indicating that the terminal device 200-1 has the interference suppression function can be further divided by an interference suppression method and the like into multiple pieces of information. For example, the division into information that a linear type interference suppression function is retained and information that a non-linear type interference suppression function is retained can be chosen for definition.

Furthermore, the terminal device 200-1 can notify the base station device 100-1 of information that the terminal device 200-1 includes a function of performing assistance (for example, sharing information relating to a higher layer above a physical layer and relating to a different cell or a different terminal device) through a network, as the terminal capability information. Furthermore, the terminal device 200-1 can notify the base station device 100-1 of a release (for example, a specification version) that the terminal device 200-1 can support, as the terminal capability information.

Furthermore, the base station device 100-1 performs a notification request for Channel Quality Information (CQI) (a CQI request) on the terminal device 200-1 (S106). Furthermore, the base station device 100-1 makes a notification request for a rank (for example, a Rank Indicator (RI)), and precoding (for example, a Precoding Matrix Indicator (PMI)) (S106). When receiving each notification request (S106), the terminal device 200-1 performs received-quality measurement required for responding to each request (S107). The terminal device 200-1 performs the received-quality measurement by using a reference signal and the like (for example, a CRS and a CSI-RS) that are transmitted from the base station device 100-1. Reception electric field strength, a Signal to Noise Ration (SNR), a Signal to Interference and Noise Ratio (SINR), and the like correspond to received quality. Then, the terminal device 200-1 reports channel quality information (CQI report), a rank, and precoding, as a result of the measurement, to the base station device 100-1 (S108). The channel quality information may be on the received quality itself, and may be on a codebook that is stipulated in advance with a Modulation and Coding Scheme (MCS) information that can be received and the like, in the communication system. Moreover, the base station device can set the notification requests (S106) to be made at different timings and at different request intervals.

Next, the base station device 100-1 determines the transmission parameter for downlink (S109). When processing operations in S101 to S108 are performed on both of the terminal device 200-1 and the terminal device 200-2, the base station device 100-1 determines the transmission parameter for each terminal device based on the terminal capability information, the channel quality information, and the like that are notified from the terminal device 200-1 and the terminal device 200-2. The transmission parameters can include scheduling of a transmission signal, an MCS, a rank, a port number, a transmission mode (precoding, transmission diversity, or the like). Each of the transmission parameters will be described in detail below.

Next, the base station device transmits the control channel that includes the demodulation control information, to each terminal device (110). The demodulation control information is control information required for demodulating and decoding a data signal (a desired signal) that is sent to each terminal device. The demodulation control information includes the transmission parameter in the data signal that is destined for the terminal device.

Furthermore, the base station device transmits the control channel including the assistance control information to the terminal device based on contents of the terminal capability information that is notified in S105 (S110). For example, the base station device 100-1 can transmit the control channel including the assistance control information to the terminal device that makes a notification of the information indicating that the terminal device has the interference suppression function (S105) (S110). For example, the base station device 100-1 can transmit the control channel including the assistance control information to the terminal device that makes a notification of the information that the terminal device has the function of performing assistance through a network (S110). Moreover, a case will be representatively described in which when notified by the terminal device of the information indicating that the terminal device has the interference suppression function, as the terminal capability information, the base station device transmits the control channel including the assistance control information to the terminal device.

The base station device can include scheduling information for a different terminal device that connects to the base station device, MCS information, information indicating the rank, information indicating the port number, and information (precoding, transmission diversity, a multi-user MIMO mode, and the like) indicating the transmission mode, as the assistance control information.

Furthermore, the base station device can include information (channel estimation information for an interference signal) for estimating a channel of a signal (the interference signal) that is destined for a different terminal device, as the assistance control information, for the terminal device that makes a notification of the information that the terminal has the function of performing assistance through a network. The base station device can include scheduling information of a reference signal of a different terminal device, and a code sequence for the reference signal, as the channel estimation information for the interference signal. Furthermore, the base station device can include transmission signal power (for example, a power difference between the data signal and the reference signal, and the like) of a different terminal device, as the channel estimation information of the interference signal.

In a case of the communication system in FIG. 1, in addition to the demodulation control information, the base station device 100-1 notifies the terminal device 200-1 of the assistance control information that is information relating to a different terminal device 200-2. Moreover, the demodulation control information and the assistance control information can be included in a Physical Downlink Control CHannel (PDCCH), an Enhanced Physical Downlink Control CHannel (EPDCCH), and a Physical Downlink Shared CHannel (PDSCH), in LTE and the like.

Last, the terminal device that is notified of the demodulation control information and the assistance control information detects a data signal that is destined to the terminal device, using these pieces of information (S111).

Figure 3:
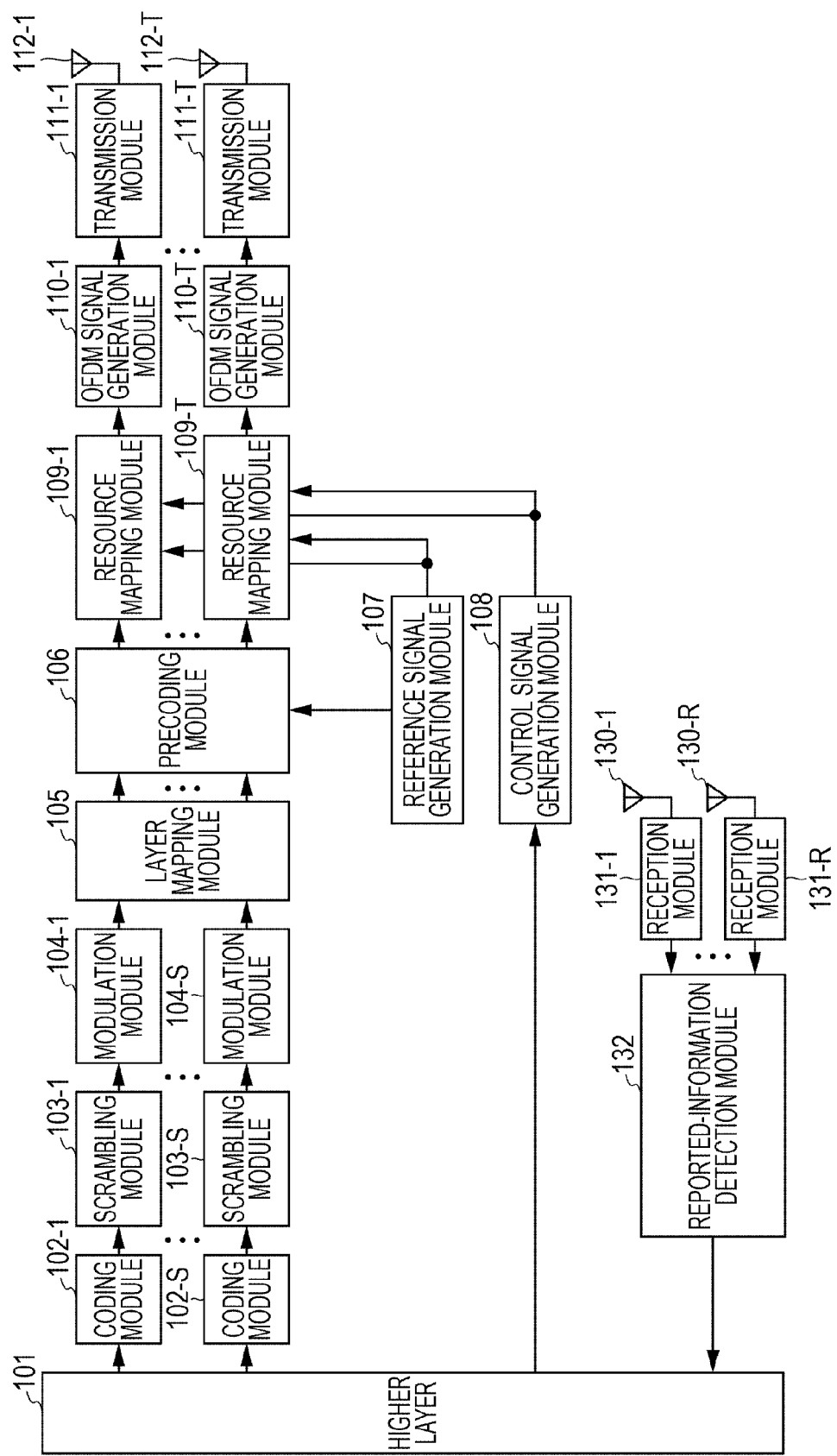
FIG. 3 is a schematic block diagram illustrating a configuration of a base station device 100-1 according to the first embodiment.

FIG. 3 is a schematic block diagram illustrating a configuration of the base station device 100-1 according to the first embodiment. The base station device 100-1 includes a higher layer 101 (a higher layer step), coding modules 102-1 to 102-S (a coding step), scramble modules 103-1 to 103-S (a scramble step), modulation modules 104-1 to 104-S (a modulation step), a layer mapping module 105 (a layer mapping step), precoding module 106 (a precoding step), a reference signal generation module 107 (a reference signal generation step), a control signal generation module 108 (a control signal generation step), resource mapping modules 109-1 to 109-T (a resource mapping step), OFDM signal generation modules 110-1 to 110-T (an OFDM signal generation step), transmission modules 111-1 to 111-T (a transmission step), transmit antenna modules 112-1 to 112-T, receive antenna modules 130-1 to 130-R, reception modules 131-1 to 131-R (a reception step), and a report information detection module 132 (a report information detection step). At this point, S, T, and R indicate the number of streams, the number of transmit antennas, and the number of receive antennas, respectively. Moreover, in a case where one portion or all portions of the base station device 100-1 are integrated into an integrated circuit, a chip control circuit is retained that performs control on each functional block. Furthermore, according to the present invention, the base station device 100-1 and the terminal devices 200-1 and 200-2 that are described below are for a block diagram in a case of single carrier transmission such as Orthogonal Frequency Division Multiplexing (OFDM) transmission, but can also be applied in a case of single carrier transmission such as Single Carrier-Frequency Division Multiple Access (SC-FDMA), and Discrete Fourier Transform-spread-OFDM (DFT-s-OFDM).

The base station device 100-1 receives a signal (an uplink signal) that is transmitted by the terminal devices 200-1 to 200-2, through the receive antenna modules 130-1 to 130-R. The data signal channel (for example, a Physical Uplink Shared Channel (PUSCH) in LTE and the like) on which to transmit information data and control information, and uplink control channel (for example, a Physical Uplink Control Channel (PUCCH) in LTE and the like) on which to transmit the control information are included in the uplink signal.

The reception module 131-1 to 131-R down-coverts (performs radio frequency conversion on) signals that are received by the receive antenna modules 131-1 to 131-R into a frequency band in which digital signal processing such as signal detection processing is possible, and performs conversion (analog to digital conversion) of a signal on which filtering processing is performed from an analog signal into a digital signal, without performing the filtering processing that further removes spurious. Furthermore, the reception modules 131-1 to 131-R perform demodulation processing, decoding processing, and the like, using the digital signal. Accordingly, the various signals (the data signal channel, the control channel, and the like) that are described above can be acquired from the uplink signal. Moreover, the reception modules 131-1 to 131-R can perform the demodulation processing, the decoding processing, and the like according to an uplink transmission scheme.

The report information detection module 132 detects the control channel that is fed back from the terminal device that makes a connection (S103, S105, and S108 in FIG. 2) and outputs a result of the detection to the higher layer 101. Included in the control information that is included in the channel are information (for example, an RRC Connection Request, an RRC Connection Setup Complete, and the like) that is transmitted by the terminal device and that is required for radio connection setup between the base station device and the terminal device, the terminal capability information (for example, UE Capability Information), a channel quality information report (a Channel Quality Information (CQI) report), and the like.

In a communication function hierarchy that is defined with an OSI reference model, the higher layers 101 are higher functional layers above a Physical Layer, for example, a Media Access Control (MAC) layer, a data link layer, a network layer, and the like. Furthermore, the higher layer 101 makes a notification of other parameters required for each module that makes up the base station device 100-1 to perform a function, as well.

The higher layer 101 generates the information data and the control information that are transmitted to each terminal device. A transmission parameter of a downlink signal that is transmitted to each terminal device is included in the control information that is generated by the higher layer 101 (S109 in FIG. 2). The higher layer 101 determines parameters (an MCS, a rank, scheduling, a port number, and transmission modes (precoding, transmission diversity, and the like)) for downlink transmission from the base station device to each terminal device, considering the terminal capability information on each terminal, the channel quality information report, and the like that are included in the control channel that is output by the report information detection module 132 (S109 in FIG. 2).

The MCS is a scheme of modulation coding that is performed on information data that is transmitted by the base station device 100-1 to each terminal device. Data modulation processing, for example, are Binary Phase Shift Keying (BPSK), Quadrature Phase Shift Keying (QPSK), M-Quadrature Amplitude Modulation (M-QAM) (for example, M=16, 64, 256, 1024, and 4096), and the like. In an error correction code, the data modulation processing is a coding rate of the error correction code.

The rank is the number of spatial multiplexes that are performed on a signal that is transmitted by the base station device 100-1 to each terminal device. In a case where the higher layer 101 is transmitted to multiple terminal devices in the state of being spatially multiplexed (MU-MIMO), when a terminal that is notified that the interference suppression function is retained is included among the multiple terminal devices, it is desirable that the rank of a signal that is transmitted to the terminal device that is notified that the interference suppression is retained is set to be an upper limit and the number of spatial multiplexes for each terminal device is determined.

The port number indicates from which antenna port the base station device 100-1 transmits a transmission signal to each terminal device.

The higher layer 101 can determine a resource onto which to map a downlink data signal channel, a control channel, a reference signal, and the like that are transmitted to each terminal device, as the scheduling. The resource is an allocation unit that is defined by time and frequency. For example, in 3GPP, there are a resource element that is defined by 1 OFDM symbol and 1 subcarrier, a resource block that is defined by 14 OFDM symbols and 12 subcarriers, and the like. Furthermore, the resource block is a minimum unit of user arrangement.

As the precoding, the higher layer 101 can calculate transmission weight (a precoding matrix) that makes the SNR of a receive signal of the terminal device good, and can multiply a result of the calculation by the transmission signal (for example, CDD) as the precoding. The higher layer 101 can select desired precoding that is included in the control channel from the report information detection module 132, as the precoding. The higher layer 101 can select the precoding from a codebook that is determined in advance in the communication system.

The higher layer 101 can use the precoding (Tomlinson Harashima Precoding (THP)) and the like that suppress inter-user interference, as the precoding. In this case, information (for example, a channel estimate measured by the terminal device or information that results from compressing the channel estimate), which is included in the control channel from the report information detection module 132, and which relates to a channel between the base station device and each terminal device, can be used.

The higher layer 101 can determine a transmission mode of a signal that is transmitted to each terminal device. The transmission mode can apply the precoding, the transmission diversity (for example, SFBC), and the like.

The coding module 102-1 to 102-S performs error correction coding on information data that is input from the higher layer 101, and generates coded bits (referred to as a codeword). Furthermore, the information data, for example, includes a voice signal that is involved in a telephone call, a signal of a static image or of a moving image that is captured, a text message, and the like. Coding schemes, which are used by the coding module 102-1 to 102-S when performing the error correction coding, for example, include Turbo Coding, Convolutional Coding, Low Density Parity Check Coding (LDPC), and the like.

Moreover, the coding module 102-1 to 102-S may perform rate matching processing on a sequence of coded bits in order to match a coding rate of data sequence data on which the error correction coding is performed to a coding rate corresponding to a data transmission rate. Furthermore, the coding module 102-1 to 102-S may have a function of rearranging and interleaving the data sequence on which the error correction encoding is performed. Furthermore, the error correction coding is performed on a coding rate of the MCS.

The scramble module 103-1 to 103-S performs scrambling on codewords that are input from the coding modules 102-1 to 102-S, based on the cell ID of the base station device. Moreover, information relating to a scramble pattern can be naturally included in the control information.

The modulation modules 104-1 to 104-S map a post-scrambling codeword that is input, onto a data modulation symbol. Moreover, the data modulation processing is performed on modulation levels of the MCS. Moreover, the modulation modules 104-1 to 104-S may have a function of rearranging and interleaving a generated modulation symbol. Information relating to this interleave pattern can be assuredly included in the control information.

At this point, S is the number of terminal devices to which at least the base station device 100-1 transmits a signal in the state of being spatially multiplexed. In FIG. 1, because the terminal device 200-1 and the terminal device 200-2 perform spatial multiplexing for transmission to the base station device 100-1, S is equal to or greater than 2. Specifically, in a case where the base station device 100-1 transmits a data signal channel to each terminal device with one stream, the coding module 102-1, the scramble module 103-1, and the modulation module 104-1 generate a data signal channel that is transmitted to the terminal device 200-1, and a coding module 102-2, a scrambling module 103-2, and a modulation module 104-2 generates a data signal channel that is transmitted to a terminal device 200-2.

The layer mapping module 105 performs layer mapping in order to spatially multiplex data modulation symbols that are input from the modulation modules 104-1 to 104-S. The number of layer mapping operations depends on a rank of each terminal device, which is determined by the higher layer 101. For example, in LTE and the like, up to a maximum of 8 layers is supported, but one codeword is mapped onto a maximum of 4 layers.

The reference signal generation module 107 generates a reference signal, and outputs the reference signal for performing the precoding to the precoding module 106. The reference signal for performing the precoding, for example, is a Demodulation Reference Signal (DM-RS). Furthermore, the reference signal generation module 108 outputs the reference signal that is not precoded to the resource mapping modules 109-1 to 109-T. The reference signal that is not precoded, for example, is a Cell Specific Reference Signal (CRS) or a measurement reference signal (CSI-Reference Signal (CSI-RS)).

The precoding module 106 multiplies an output of the layer mapping module 106 by the precoding matrix determined by the higher layer 101, and generates a signal of each transmit antenna port. The precoding matrix can be determined for every terminal device. In this case, the precoding module 106 preforms the multiplication by the precoding matrix for every terminal device. For example, in FIG. 1, the base station device 100-1 transmits the precoding matrix that is used for each of the terminal device 200-1 and the terminal device 200-2.

Moreover, in some cases, the precoding is performed on all the terminal devices that transmit a spatially multiplexed signal (for example, the MU-MIMO). In this case, the precoding module 106 performs the multiplication by the precoding matrix for all the terminal devices.

Moreover, the base station device 100-1 can omit the precoding. In this case, the output of the layer mapping module 106 is input directly into the resource mapping modules 109-1 to 109-T.

The control signal generation module 108 generates the control channel that is transmitted to each terminal device, using the control information that is input from a higher layer. As the control channel, for example, a Physical Downlink Control CHannel (PDCCH), an Enhance Physical Downlink Control CHannel (EPDCCH), a Radio Resource Control (RRC) signaling, and the like can be used. The RRC signaling is a control signal of an L3 layer control signal that is included in a PBCH and a PDSCH. Because the RRC signal can transmit a large amount of information and is resistant to an error when compared with the PDCCH, the RRC signaling is signaling that is not frequently transmitted. Furthermore, the control signal generation module 108 generates a synchronization signal and a broadcast channel.

The control signal generation module 108 generates control information that includes the demodulation control information. Furthermore, the control signal generation module 108 generates a control channel that includes the assistance control information.

The resource mapping modules 109-1 to 109-T map an output of the precoding module 106, a reference signal, a control channel, and the like onto a resource according to the scheduling. The resource mapping modules 109-1 to 109-T are categorized by the terminal device, transmission to which is performed by the base station device 100-1. For example, in the system in FIG. 1, the transmit antenna modules 112-1 to 112-T are categorized into a group (100-1-1 in FIG. 1) that is used for transmitting a signal that is destined for the terminal device 200-1, and a group (100-1-2 in FIG. 1) that is used for transmitting a signal that is destined for the terminal device 200-2. Based on this categorization, the resource mapping modules 109-1 to 109-T are categorized into a group (a group 1) that is used for transmitting a signal that is destined for the terminal device 200-1, and a group (a group 2) that is used for a signal that is destined for the terminal device 200-2.

For example, the group 1 is used for transmitting a signal to the terminal device 200-1 that notifies that the terminal device 200-1 has the interference suppression function (S105). Accordingly, the resource mapping module that belongs to the group 1 maps onto a resource the control channel that includes the demodulation control information and the assistance control information, and the data signal channel (the output of the precoding module 106) that is transmitted to the terminal device 200-1.

Furthermore, the resource mapping modules 109-1 to 109-T can map the reference signal onto a resource that is determined based on the port number information.

Inverse Fast Fourier Transform (IFFT) and insertion of Cyclic Prefix (CP) are performed on outputs of the resource mapping modules 109-1 to 109-T in Orthogonal Frequency Division Multiplexing (OFDM) signal generation modules 110-1 to 110-T, digital and analog conversion, filtering, frequency conversion, and the like are performed on the outputs in the transmission modules 111-1 to 111-T, and the outputs are transmitted from transmit antennas 112-1 to 112-T.

Figure 4:
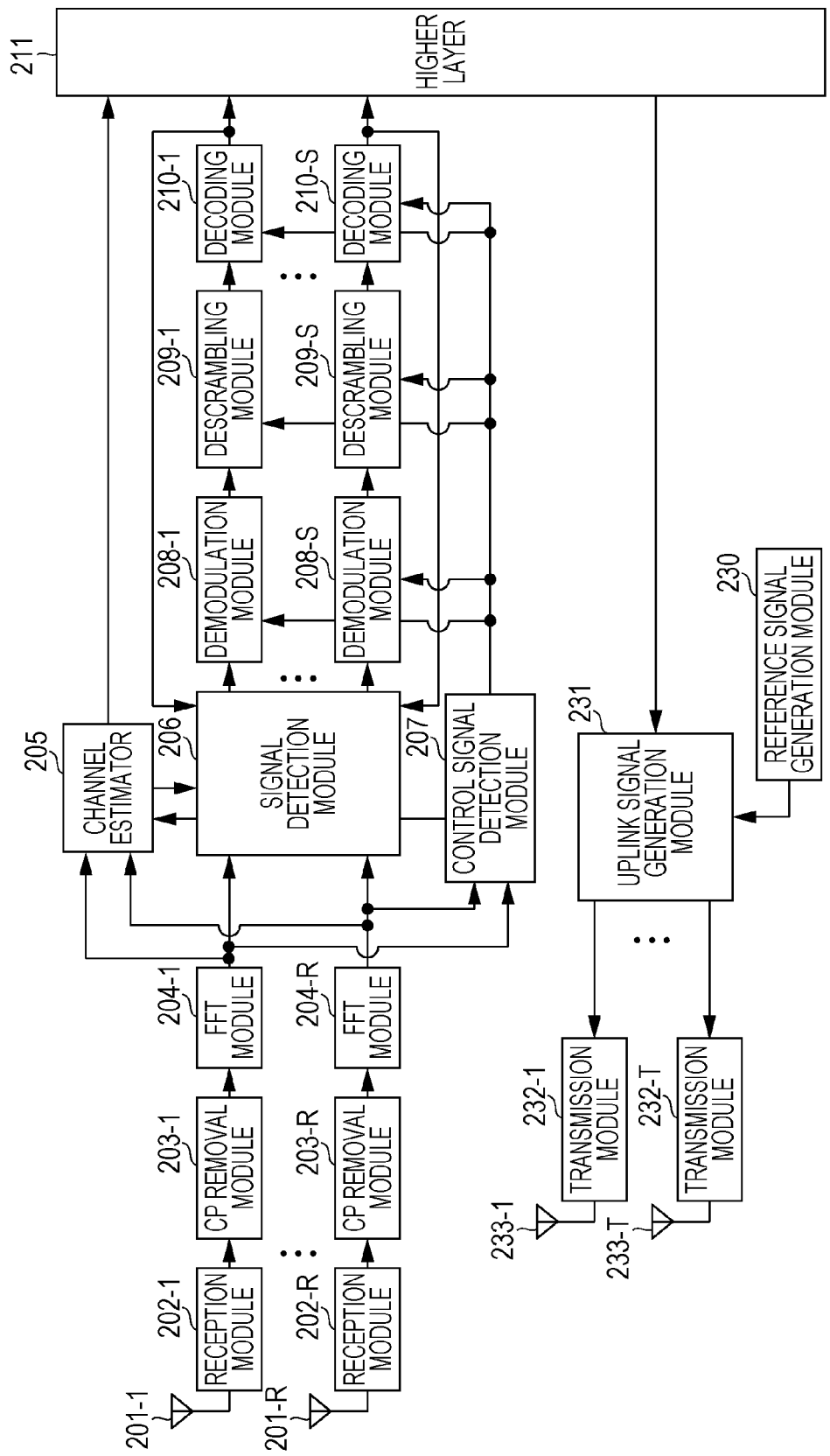
FIG. 4 is a schematic block diagram illustrating a configuration of a terminal device 200-1 according to the first embodiment.

FIG. 4 is a schematic block diagram illustrating a configuration of the terminal device 200-1 according to the first embodiment. The terminal device 200-1 is a terminal device that has the interference suppression function. The terminal device 200-1 includes receive antennas 201-1 to 201-R, reception modules 202-1 to 202-R (a reception step), CP removal modules 203-1 to 203-R (a CP removal step), Fast Fourier Transform (FFT) modules 204-1 to 204-R (a FFT step), a channel estimator 205 (a channel estimation step), a signal detection module 206 (a signal detection step), a control signal detection module 207 (a control signal detection step), demodulation modules 208-1 to 208-S (a demodulation step), descrambling modules 209-1 to 209-S (a descrambling step), decoding modules 210-1 to 210-S (a decoding step), a higher layer 211 (a higher layer step), a reference signal generation module 230 (a reference signal generation step), an uplink signal generation module 231 (an uplink signal generation step), transmission modules 232-1 to 232-T (a transmission step), and transmit antennas 233-1 to 233-T.

Furthermore, in a case where one portion or all portions of the terminal device 200-1 are integrated into an integrated circuit, a chip control circuit (not illustrated) is retained that performs control on each functional block. Moreover, R indicates the number of receive antennas. Furthermore, the number of transmit antennas is set to be T, and is set to be the same as that of the base station device 100-1, but the present invention is not limited to this and the number of antennas of the terminal device and the number of antennas of the base station device may be different from each other.

The reception modules 202-1 to 202-R receive signals that are transmitted by the base station device 100-1 through the transmit antennas 112-1 to 112-T, through the receive antennas 201-1 to 201-R, respectively. That is, the reception module 202-1 receives a signal that is transmitted by the base station device 100-1 to a terminal device (the terminal device 200-1 in FIG. 1), and a signal that is transmitted by the base station device 100-1 to a different terminal device (the terminal device 200-2 in FIG. 1). The latter signal is inter-user interference. Additionally, the reception modules 202-1 to 202-R perform reception frequency conversion, precoding, analog and digital conversion, and the like on the receive signal. Removal of the cyclic prefix is performed on outputs of the reception modules 202-1 to 202-R in the CP removal modules 203-1 to 203-R, and time frequency conversion is performed on the outputs in the FFT modules 204-1 to 204-R.

The channel estimator 205 performs the received-quality measurement (S107) by using the reference signals that are included in the signal that is subjected to the time frequency conversion, such as the CRS and the CSI-RS. Furthermore, the channel estimator 205 performs channel estimation (S111) by using the reference signals such as the CRS, the CSI-RS, and the DM-RS. The channel estimator 205 performs measurement of the received-quality between the transmit antenna through which a signal destined for a terminal device (the terminal device 200-1) is transmitted from the base station device 100-1 and each of the receive antennas 201-1 to 201-R, and estimation of the channel estimate. Furthermore, the channel estimator 205 performs the measurement of received-quality between the transmit antenna through which a signal destined for a different terminal device (the terminal device 200-2) is transmitted from the base station device 100-1 and each of the receive antennas 201-1 to 201-R, and the estimation of the channel estimate. At this point, when performing the estimation, the channel estimator 205 can use the port number information that is included in the demodulation control information and the assistance control information. Accordingly, the channel estimator 205 can know a resource of the reference signal and a code sequence that are used for the channel estimation.

The control signal detection module 207 extracts the control channel that is included in the signal that is subjected to the time frequency conversion, and acquires the demodulation control information and the assistance control information (S110). The control signal detection module 207 notifies each module of information that is information which is included in the demodulation control information and the assistance control information and that is required for realizing a function of each module that makes up the terminal device 200-1.

The signal detection module 206 detects the data signal channel and the control channel that are transmitted to the terminal device. Furthermore, the signal detection module 206 detects the data signal channel and the control channel that are transmitted to other than the terminal device. At this point, when performing the detection, the signal detection module 206 can use the channel estimate, the demodulation control information, and information indicating the rank that is included in the assistance control information. Furthermore, when performing the detection, the signal detection module 206 can use the demodulation control information and transmission mode information that is included in the assistance control information. Furthermore, when performing the detection, the signal detection module 206 can use the demodulation control information and the scheduling information that is included in the assistance control information. Furthermore, the signal detection module 206 can use results of the decoding that are fed back from the decoding modules 210-1 to 210-S, for signal detection.

The demodulation modules 208-1 to 208-S perform the demodulation processing on a signal that is input from the signal detection module 206, and calculate a bit logarithm likelihood ratio (a Log Likelihood Ratio (LLR)). When performing the demodulation processing, the demodulation modules 208-1 to 208-S can use the demodulation control information and the MCS information that is included in the assistance control information.

The descrambling modules 209-1 to 209-S descramble the codeword on which the scrambling is performed in the base station device, and calculate a bit logarithm likelihood ratio of a codeword. The descrambling modules 209-1 to 209-S can use the demodulation control information and the assistance control information.

The decoding modules 210-1 to 210-S perform error correction decoding on the bit logarithm likelihood ratio of the codeword (a post-decoding bit logarithm likelihood ratio), calculate information data and various pieces of control data (a terminal capability information request, requests for notification of the channel quality information and the like, and the like) that are transmitted to the decoding modules, and outputs a result of the calculation to the higher layer 211. Moreover, the higher layer 211 can notify each module of the control information (the MCS information or the like to the terminal device and a different terminal device) for performing the demodulation processing, the descrambling, and the decoding processing. At this point, when performing the demodulation processing, the demodulation modules 210-1 to 210-S can use the demodulation control information and the MCS information that is included in the assistance control information.

Furthermore, the decoding modules 210-1 to 210-S can feed back the post-decoding bit logarithm likelihood ratio to the signal detection module 206.

In response to the terminal capability information request, the higher layer 211 outputs the terminal capability information of the terminal device to the uplink signal generation module 231. In response to the request for the notification of the channel quality information and the like, the higher layer 211 outputs the channel quality information and the like to the uplink signal generation module 231. Furthermore, the higher layer 211 acquires information data that is output by the decoding modules 210-1 to 210-S.

The terminal device 200-1 has a function of transmitting a signal as well. The reference signal generation module 230 generates an uplink reference signal. The uplink signal generation module 231 generates a signal that includes the terminal capability information, the channel quality information, and the like, as the uplink signal. The uplink signal is a signal that is configured from an SC-FDMA symbol or an OFDMA symbol. The digital and analog conversion, the filtering, the frequency conversion, and the like are performed on an output of the uplink signal generation module 231 in the transmission modules 232-1 to 232-T, and the output is transmitted from the transmit antennas 233-1 to 233-T.

Figure 5:
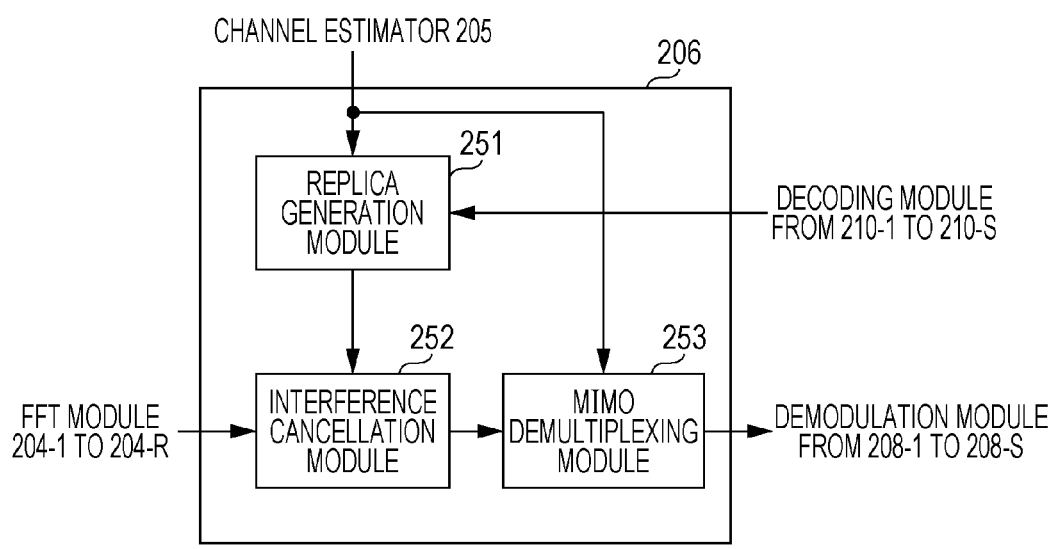
FIG. 5 is one example of a schematic block diagram illustrating a configuration of a signal detection module 206 according to the first embodiment.

FIG. 5 is a one example of a schematic block diagram illustrating a configuration of the signal detection module 206 according to the first embodiment. The signal detection module 206 in FIG. 5 is a block in a case where successive interference cancellation (SIC) is included as an interference cancellation function. The signal detection module 206 is configured from a replica generation module 251 (a replica generation step), an interference cancellation module 252 (an interference cancellation step), and a MIMO demultiplexing module 253 (a MIMO demultiplexing step).

The replica generation module 251 generates the receive signal replica by using the channel estimate that is input from the channel estimator 205, and the LLRs that are input from the decoding modules 210-1 to 210-S. The interference cancellation module 252 subtracts the receive signal replica from the signals that are input from the FFT modules 204-1 to 204-R, and outputs a result of the subtraction to the demodulation modules 208-1 to 208-S.

At this point, a signal R(k) in a k-th subcarrier that is input into the signal detection module 206 of the terminal device 200-1 is expressed as the following equations. In the following equations, D is a sequence number (the number of spatial multiplexes) of an output S(k) of the layer mapping module 105. Furthermore, a matrix H is an equivalent channel matrix including the precoding. Furthermore, N(k) is noise in every receive antenna and $^T$ is a transposed matrix.

[Math 1]

$$R(k) = H(k)S(k) + N(k) \qquad (1)$$

[Math 2]

$$R(k) = [R_1(k) \ ... \ R_R(k)]^T \qquad (2)$$

[Math 3]

$$H(k) = \begin{pmatrix} H_{11}(k) & ... & H_{1D}(k) \\ \vdots & \ddots & \vdots \\ H_{R1}(k) & ... & H_{RD}(k) \end{pmatrix} \qquad (3)$$

[Math 4]

$$S(k) = [S_{,1}(k) \ ... \ S_D(k)]^T \qquad (4)$$

[Math 5]

$$N(k) = [N_1(k) \ ... \ N_R(k)]^T \qquad (5)$$

The interference cancellation module 252 subtracts the receive signal replica (a stream replica) that is generated in the replica generation module 251, from an output signal of the FFT module. At the time of i-th repeating processing, for an output signal of the interference cancellation module that results when subtracting an n-th stream (n is 1 and so forth up to D), $\tilde{R}_{n,i}(k)$ is expressed as the following equation.

[Math 6]

$$\tilde{R}_{n,i}(k) = R(k) - \hat{R}_{n,i}(k) \qquad (6)$$

where R(k) indicates an FFT output, $\hat{R}_{n,i}(k)$ indicates a receive signal replica of a stream, which is removed n-th time in i-th repeating processing, and k indicates a subcarrier index. Moreover, $\hat{R}_{1,0}(k)=0$ is established.

An interference replica $\hat{R}_{n,i}(k)$ is generated using a data modulation symbol replica that is generated using the LLRs which are output by the decoding modules 210-1 to 210-S, and the channel estimate that is estimated by the channel estimator 205. For example, in a case where the signal detection of the n-th stream is performed, receive signal replicas of a stream 1 to a stream (n−1) and of a stream (n+1) to a stream D are generated. More specifically, at the time of the i-th repeating processing, the interference replica is generated using symbol replicas of the stream 1 to the stream (n−1) that are generated in the i-th repeating processing, symbol replicas of the stream (n+1) to the stream D that are generated in (i−1)-th repeating processing, and the channel estimate. At the time of the i-th repeating processing, for the output signal of a reception replica generation module for the n-th stream, $\hat{R}_{n,i}(k)$ is expressed as the following equation.

[Math 7]

$$\hat{R}_{n,i}(k) = \left( \sum_{u=1}^{n-1} H_u(k)\hat{S}_{u,i}(k) + \sum_{u=n+1}^{D} H_u(k)\hat{S}_{u,i-1}(k) \right) \quad (7)$$

where $H_u(k)$ is a channel estimate of a stream u, and $\hat{S}_{u,i}(k)$ is a modulation symbol replica that is generated in the i-th repeating processing for the streams u. Moreover, in a case where i=0 (first time processing), the receive signal replica is generated from only the symbol replicas of the stream 1 to a stream (n−1) that are already generated with 0-th repeating processing and from the channel estimate.

The replica generation module 251 generates the data modulation symbol replicas such as QPSK modulation and 16 QAM modulation, using the output signal from the decoding module. Processing by a modulation symbol replica generation module is described using the QPSK modulation as an example. When LLRs for bits that construct a QPSK modulation symbol are set to be $\lambda(b_0)$ and $\lambda(b_1)$, a replica of a QPSK modulation symbol is expressed as the following equation.

[Math 8]

$$\frac{1}{\sqrt{2}}\tanh(\lambda(b_0)/2) + \frac{j}{\sqrt{2}}\tanh(\lambda(b_1)/2) \quad (8)$$

where j indicates an imaginary number. Moreover, also with other modulation schemes such as 16 QAM, it is possible to generate the symbol replica in the same manner.

The MIMO demultiplexing module 253 performs demultiplexing of a stream of a signal that results from performing the spatial multiplexing (MIMO) on an output of the interference cancellation module 252 using the channel estimate that is an output of the channel estimator 205. For a demultiplexing method, a method of reproducing a data signal of a stream, for example, with Maximum Likelihood Detection (MLD), can be applied. Furthermore, the demultiplexing method can be used such as calculating MMSE weight for the output of the interference cancellation module 252 and then multiplying the output of the interference cancellation module 252 by the calculated weight.

For example, the MIMO demultiplexing module 253 can demultiplex the stream by multiplying the output signal that results from the interference cancellation module 252 subtracting the n-th stream, by weight coefficients $W_{ZF,n}(k)$ and $W_{MMSE,n}(k)$ that are based on a ZF reference and an MMSE reference. The following equations can be used.

[Math 9]

$$W_{ZF,n}(k) = H_n^H(k)(H_n(k)H_n^H(k))^{-1} \quad (9)$$

[Math 10]

$$W_{MMSE,n}(k) = H_n^H(k)(H_n(k)H_n^H(k) + \sigma_2 I_R)^{-1} \quad (10)$$

where $^H$ indicates complex conjugate transposition of a matrix, $^{-1}$ indicates an inverse matrix, $\sigma^2$ indicates noise power, and $I_R$ indicates an R×R unit matrix. Furthermore, $H_n(k)$ in a case of the first time processing (i=0) in repeating successive interference cancellation is expressed as the following equation.

[Math 11]

$$H_n(k) = \begin{pmatrix} H_{1n}(k) & \cdots & H_{1D}(k) \\ \vdots & \ddots & \vdots \\ H_{Rn}(k) & \cdots & H_{RD}(k) \end{pmatrix} \quad (11)$$

$H_n(k)$ in a case of the repeating processing (i>0) in the repeating successive interference cancellation is expressed as the following equation.

[Math 12]

$$H_n(k) = \begin{pmatrix} H_{1n} \\ \vdots \\ H_{Rn} \end{pmatrix} \quad (12)$$

The signal detection module 206 can acquires the number D of the streams by using information indicating the ranks that are included in the demodulation control information and the assistance control information, and information indicating the transmission mode. Furthermore, when generating the data modulation symbol replica, the signal detection module 206 can acquire the MCS information that is included in the demodulation control information and the assistance control information.

Moreover, the equation described above is one example of the interference cancellation, and the present invention can be applied to the terminal device to which the interference cancellation is applied, without depending on a type of interference cancellation and a method of calculating weight.

As described above, in the communication system according to the first embodiment, the terminal device receives a notification of the assistance control information that is information relating to a different terminal device. Therefore, the terminal device can suppress different user interference using the assistance control information. Accordingly, while an influence due to limitation on an amount of feedback information in the communication system is reduced, the inter-user interference can be suppressed, and spectral efficiency can be improved.

(Second Embodiment)

A terminal device according to an aspect of the present embodiment includes a reception module that receives a control channel and a spatially multiplexed data signal channel, a control signal detection module that extracts, from an output from the reception module, a demodulation control information which is a transmission parameter of a signal that is transmitted to the terminal device, in a data signal channel that is output from the reception module, and assistance control information which is a transmission parameter of a signal that is transmitted to a different terminal device, in the data signal channel that is output from the reception module, a channel estimator that obtains a channel estimate by using a reference signal, a signal detection module that demultiplexes the data signal channel by using the demodulation control information, the assistance control information, and the channel estimate, and a decoding module that decodes a signal that is output by the signal detection module, in which information indicating a rank is included in the assistance control information.

Furthermore, in the terminal device described above, information indicating a port number may be included in the assistance control information.

Furthermore, in the terminal device described above, information indicating the reference signal may be included in the assistance control information.

Furthermore, in the terminal device described above, information indicating transmission power may be included in the assistance control information.

Furthermore, in the terminal device described above, information indicating a transmission mode may be included in the assistance control information.

Furthermore, in the terminal device described above, information indicating a duplex scheme may be included in the assistance control information.

Furthermore, in the terminal device described above, a cell ID of a base station device to which a different terminal device connects may be included in the assistance control information.

Furthermore, in the terminal device described above, the decoding module may be configured in such a manner that results of decoding of the signal that is transmitted to the terminal device to which the decoding module belongs and the signal that is transmitted to the different terminal device are fed back to the signal detection module, and the signal detection module may be configured in such a manner that the spatially multiplexed data signal are demultiplexed using the result of the decoding.

Furthermore, in the terminal device described above, the signal detection module may be configured in such a manner that, using the results of the decoding, the signal detection module generates a receive signal replica of a signal that is transmitted to at least the different terminal device, and subtracts the receive signal replica from the data signal channel that is output from the reception module.

Furthermore, in the terminal device described above, the detection module may be configured in such a manner as to perform maximum likelihood detection.

A base station device according to another aspect of the present embodiment includes a control signal generation module that, for a certain terminal device, generates a control channel which includes demodulation control information that is a transmission parameter of a signal that is transmitted to the terminal device and assistance control information that is a transmission parameter relating to a signal that is transmitted to a terminal device other than the terminal device, a layer mapping module that maps a data signal channel that is destined for multiple terminal devices, to a layer, spatial multiplexing onto which takes place, a resource mapping module that maps the control channel and the data signal channel to a radio resource, and a transmit antenna through which an output of the resource mapping module is transmitted, in which information indicating a rank is included in the assistance control information.

Furthermore, in the base station device, the information indicating the port number may be included in the assistance control information.

Furthermore, in the base station device, the information relating to the reference signal may be included in the assistance control information.

Furthermore, in the base station device, the information indicating the transmission power may be in the assistance control information.

Furthermore, in the base station device, the information indicating the transmission mode may be included in the assistance control information.

Furthermore, in the base station device, the information the duplex scheme may be included in the assistance control information.

Furthermore, in the base station device, the cell ID of the base station device to which a difference terminal device connects may be included in the assistance control information.

Furthermore, in the base station device, each of the signals destined for the multiple terminal devices may be transmitted from a different transmit antenna.

Furthermore, in the base station device, the assistance control information may be information relating to a transmission parameter of a signal that is transmitted by a different base station device.

Furthermore, the base station device may further include a precoding module that performs precoding on an output of the lay mapping module, for every terminal device that is a transmission source.

A communication system according to still another aspect of the present embodiment includes a base station device that includes a control signal generation module that, for a certain terminal device, generates a control channel which includes demodulation control information that is a transmission parameter of a signal that is transmitted to the terminal device and assistance control information that is a transmission parameter relating to a signal that is transmitted to a terminal device other than the terminal device, a layer mapping module that maps a data signal channel that is destined for multiple terminal devices, to a layer onto which to perform spatial multiplexing, a reference signal generation module that generates a reference signal, a resource mapping module that maps the control channel, the data signal channel, and the reference signal to a radio resource, and a transmit antenna through which an output of the resource mapping module is transmitted, and a terminal device that includes a reception module that receives a control channel and a spatially multiplexed data signal channel, a control signal detection module that extracts, from an output from the reception module, the demodulation control information and the assistance control information that are included in a data signal channel that is output from the reception module, a channel estimator that obtains a channel estimate, using the reference signal, a signal detection module that demultiplexes the data signal channel, using the demodulation control information, the assistance control information, and the channel estimate, and a decoding module that decodes a signal that is output from the signal detection module, in which information indicating a rank is included in the assistance control information.

A reception method according to still another aspect of the present embodiment includes a reception step of receiving a control channel and a spatially multiplexed data signal channel, a control signal detection step of extracting, from the data signal channel, demodulation control information that is a transmission parameter of a signal that is transmitted to a base station in which the reception method is performed in a data signal channel that is obtained in the reception step, and assistance control information that is a transmission parameter of a signal that is transmitted to a different terminal device in the data signal channel that is obtained in the reception step, a channel estimation step of obtaining a channel estimate by using a reference signal, a signal detection step of demultiplexing the data signal channel, using the demodulation control information, the assistance control information and the channel estimate, and a decoding step of decoding a signal that is obtained in the signal detection step, in which information indicating a rank is included in the assistance control information.

A transmission method according to still another aspect of the present embodiment includes a control signal step of generating for a certain terminal device a control channel which includes demodulation control information that is a transmission parameter of a signal that is transmitted to the terminal device and assistance control information that is a transmission parameter relating to a signal that is transmitted to a terminal device other than the terminal device, a layer mapping step of mapping a data signal channel that is destined for multiple terminal devices, to a layer onto which to perform spatial multiplexing, a resource mapping step of mapping the control channel and the data signal channel to a radio resource, and a transmission step of transmitting an output of the resource mapping module, in which information indicating a rank is included in the assistance control information.

A communication method according to still another aspect of the present embodiment includes a transmission method that includes a control signal generation step of generating for a certain terminal device a control channel which includes demodulation control information that is a transmission parameter of a signal that is transmitted to the terminal device and assistance control information that is a transmission parameter relating to a signal that is transmitted to a terminal device other than the terminal device, a layer mapping step of mapping a data signal channel that is destined for multiple terminal devices, to a layer onto which to perform spatial multiplexing, a reference signal generation step of generating a reference signal, a resource mapping step of mapping the control channel, the data signal channel, and the reference signal to a radio resource, and a transmission step of transmitting a signal that is obtained in the resource mapping step, and a reception method that includes a reception step of receiving a control channel and a spatially multiplexed data signal channel, a control signal detection step of extracting from a signal obtained in the reception step the demodulation control information and the assistance control information that are included in a data signal channel that is output in the reception step, a channel step of obtaining a channel estimate, using the reference signal, a signal detection step of demultiplexing the data signal channel, using the demodulation control information, the assistance control information, and the channel estimate, and a decoding step of decoding a signal that is output in the signal detection step, in which information indicating a rank is included in the assistance control information.

Figure 6:
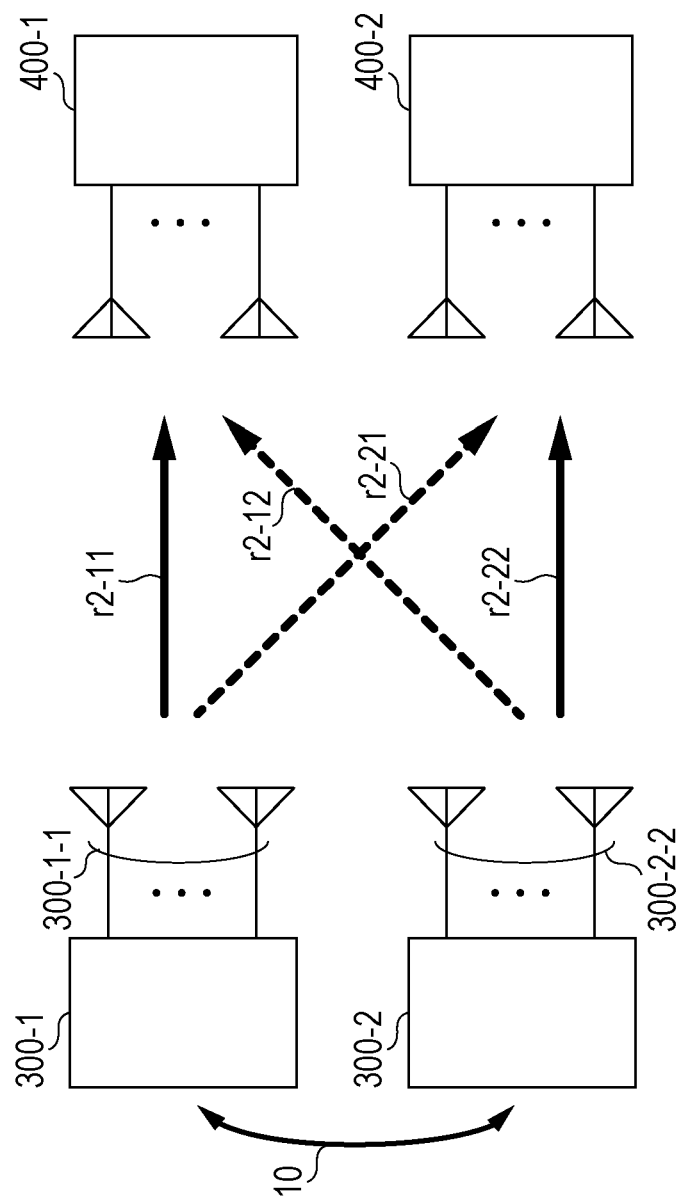
FIG. 6 is a schematic diagram illustrating a downlink configuration of a communication system according to a second embodiment.

FIG. 6 is a schematic diagram illustrating a downlink configuration of a communication system according to a second embodiment. A terminal device 400-1 makes a radio connection to a base station device 300-1. A terminal device 400-2 makes a radio connection to a base station device 300-2. The base station device 300-1 and the base station device 300-2 are connected to each other with a backhaul line 10, and base station devices can be mutually notified of information. For the backhaul line 10, a wired connection may be made using an optical fiber, an X2 interface, or the like, and a wireless connection may be made as with a relay base station.

Base station devices 400-1 to 400-2 are base station devices that are independent of each other in terms of a cell configuration. The base station device 400-2 (also referred to as a macro cell base station or a first base station device) can be arranged in such a manner that a cell coverage (a macro cell) of the base station device 400-2 and a cell coverage (a pico cell, femto cell, a small cell or the like) of a base station device 400-1 (also referred to as a low power base station, a pico cell base station, a femto cell base station, a small cell base station, or a second base station device) that has lower transmission power than the base station device 400-2 overlap each other. The coverage indicates a range in which the base station device and the terminal device can connect to each other, and is also referred to as a communication area.

In such a communication system, the base station device 300-2 transmits a signal to the terminal device 400-2 (r2-22), and thus the base station device 300-2 provides intercell interference to the terminal device 400-1 (r2-12). In the same manner, the base station device 300-1 transmits a signal to the terminal device 400-1 (r2-11), and thus provides the intercell interference to the terminal device 400-2 (r2-21). Moreover, the base station devices 300-1 and 300-2, only as macro cell base stations, may make up the multicells, respectively, and only as low power base stations, may make up multicells, respectively. Furthermore, a case where multiple low power base stations are arranged within a coverage of the macro cell base station device is also included in the present invention. Furthermore, in FIG. 6, one terminal device connects to the base station device, but the present invention is not limited to this. A case where multiple terminal devices connect to the base station device is also included in the present invention.

Furthermore, in a case where multiple low power base stations are present, transmission power may differ from one low power base station to another. Furthermore, the macro cell base station and the low power base station may be distinguished from each other not only by the transmission power, but may be distinguished for each other also by distinguishing a cell that has backward-compatibility and that supports a scheme that is already in service and a cell that is newly defined and that has no backward-compatibility.

Furthermore, schemes (a version of a communication system, an option, and the like) that are in service between the low power base stations may differ from each other.

Furthermore, the present invention can be applied in any macro cell environment, and is not limited to the number of cells, the number of base stations, the number of terminals, types of cells (for example, a macro cell, a pico cell, a femto cell, a small cell, and the like), types of base stations, and the like.

Figure 7:
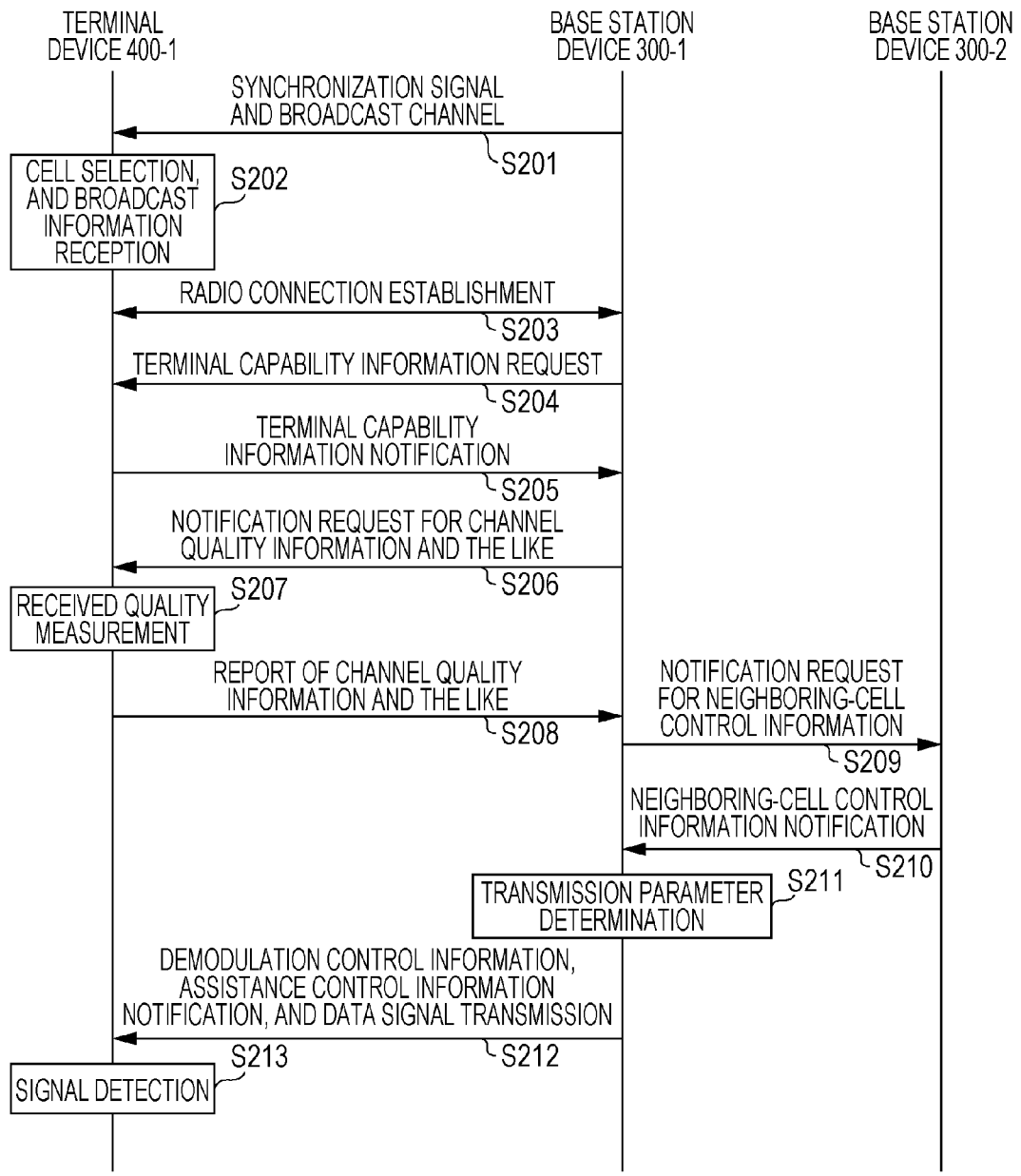
FIG. 7 is a sequence diagram illustrating processing between the base station device and the terminal device in the communication system according to the second embodiment.

FIG. 7 is a sequence diagram illustrating processing between the base station device and the terminal device in the communication system according to the second embodiment. FIG. 7 is for describing a connection and downlink data transmission processing between each of the base station devices 300-1 and 300-2 and the terminal device 400-1 that connects to the base station device 300-1 in the communication system illustrated in FIG. 6. The same processing can also be performed in the terminal device 400-2 that connects to the base station device 300-2.

Processing operations in S201 to S208 in FIG. 7 correspond to those in S101 to S108 in FIG. 2, respectively. In order to transmit a downlink data signal to the terminal device 400-1 that has the interference function, the base station device 300-1 requests the base station device 300-2 in an neighboring cell to make a notification of a neighboring-cell control information (S209). The neighboring-cell control information can include a cell ID, scheduling information, an MCS information, information indicating a rank, information indicating a port number, information indicating a transmission mode (precoding, transmission diversity, or the like), information (a power ratio between any two of data signal channel, reference signal, and control channels, or the like) indicating transmission power, and information (scheduling information of a reference signal, a code sequence of the reference signal, or the like) relating to the reference signal (a CRS or the like) of the neighboring cell, which is used in order to estimate channel information. Furthermore, the base station device 300-1 can make a notification of information a duplex scheme (Frequency Division Duplex (FDD) or Time Division Duplex (TDD)) of the base station device 300-2, as the neighboring-cell control information. For example, the information relating to the duplex scheme includes information indicating which duplex scheme of the FDD and the TDD a signal that is transmitted by the base station device is transmitted with, information indicating a frame configuration of the FDD or the TDD, and the like. Furthermore, the base station device 300-1 can make a notification of a trigger for frame synchronization of the base station device 300-2, as the neighboring-cell control information.

In response to receiving the neighboring-cell control information request (S209), the base station device 300-2 that receives the request makes a notification of cell control information on the base station device 300-2 (S210) according to the request. Moreover, the neighboring-cell control notification request (S209) and the neighboring-cell control information notification (S210) can be transmitted over the backhaul line 10.

Next, the base station device 300-1 determines a parameter for downlink for transmission to the terminal device 400-1 (S211). The base station device 300-1 determines a transmission parameter for the terminal device 300-1, using the terminal capability information, the channel quality information and the like that are notified from the terminal device 400-1, the neighboring-cell control information, and the like. The transmission parameters can include transmission signal scheduling, Modulation and Coding Scheme (MCS), a rank, a port number, and a transmission mode (precoding, transmission diversity or the like).

Next, the base station device 300-1 transmits the control channel including the demodulation control information to the terminal device 400-1 (212). The demodulation control information is control information required for the terminal device 400-1 to demodulate and decode a signal (a desired signal) that is transmitted to the terminal device 400-1. The demodulation control information includes the transmission parameter in the data signal that is destined for the terminal device.

Furthermore, the base station device 300-1 transmits the control channel including the assistance control information to the terminal device 400-1 that makes a notification of information that the terminal device 401-1 has the interference suppression function (S205) (S212). The assistance control information can include the neighboring-cell control information.

In the case of the communication system in FIG. 6, in addition to the demodulation control information, the base station device 300-1 notifies the terminal device 400-1 of the assistance control information that is information relating to a neighboring base station device 300-2. Moreover, the demodulation control information and the assistance control information can be included in the Physical Downlink Control CHannel (PDCCH), the Enhanced Physical Downlink Control CHannel (EPDCCH), and the Physical Downlink Shared CHannel (PDSCH), in LTE and the like.

Last, the terminal device that is notified of the demodulation control information and the assistance control information detects a data signal that is destined for the terminal device, using these pieces of information (S213).

Figure 8:
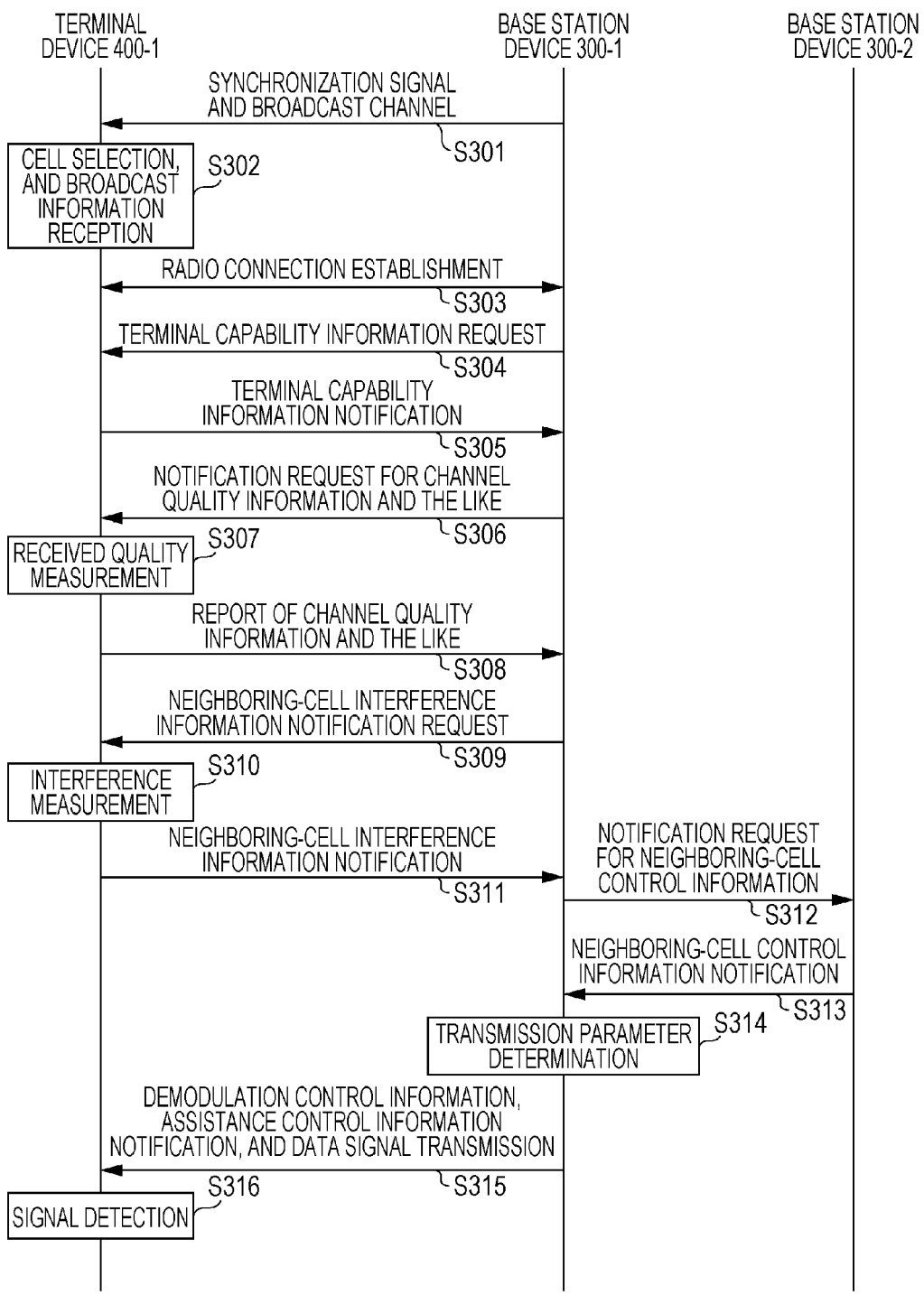
FIG. 8 is another sequence diagram illustrating the processing between the base station device and terminal device in the communication system according to the second embodiment.

FIG. 8 is another sequence diagram illustrating processing the base station device and the terminal device between the communication system according to the second embodiment. Processing operations in S301 to S308 in FIG. 8 correspond to those in S101 to S108 in FIG. 2, respectively. The base station device 300-1 makes a request to the terminal device 400-1, which has the interference suppression function, for a neighboring-cell interference information notification (S309). The base station device 300-1 can designate a resource (for example, a position of a null resource element) for measuring neighboring-cell interference. For example, Channel State Information-Interference Measurement (CSI-IM) and the like in LTE-A can be substituted. Furthermore, the base station device 300-1 can notify the terminal device 400-1 of a cell ID of a neighboring cell, information (scheduling information or the like) relating to a reference signal of the neighboring cell.

In response to this request, the terminal device 400-1 measures interference from the neighboring cell (S310). For such intercell interference measurement, the interference can be measured using the reference that is transmitted by the neighboring cell. Furthermore, the interference can be measured by measuring a signal level of the null resource element. The terminal device 400-1 notifies the base station device 300-1 of neighboring-cell interference information, as a result of the interference measurement (S311).

The base station device 300-1 selects a neighboring cell that acquires the control information, considering the neighboring-cell interference information, and requests the base station device to make a notification of the neighboring-cell control information (S312). According to such a request, the base station device 300-2 that receives the neighboring-cell control information request (S313) makes a notification of the cell control information of the base station device 300-2 (S313). Moreover, the neighboring-cell control information notification request (S312) and the neighboring-cell control information notification (S313) can be transmitted over the backhaul line 10.

Next, the base station device determines a parameter that is transmitted to the terminal device in downlink (S314). Then, the base station device 300-1 notifies the terminal device 400-1 of the demodulation control information and the assistance control information (S315). Then, the terminal device 400-1 performs the signal detection processing on the data signal that is transmitted from the base station device 300-1, using the demodulation control information and the assistance control information (S316). Processing operations in S314 to S316 in FIG. 8 correspond to those in S211 to S213 in FIG. 7, respectively.

Figure 9:
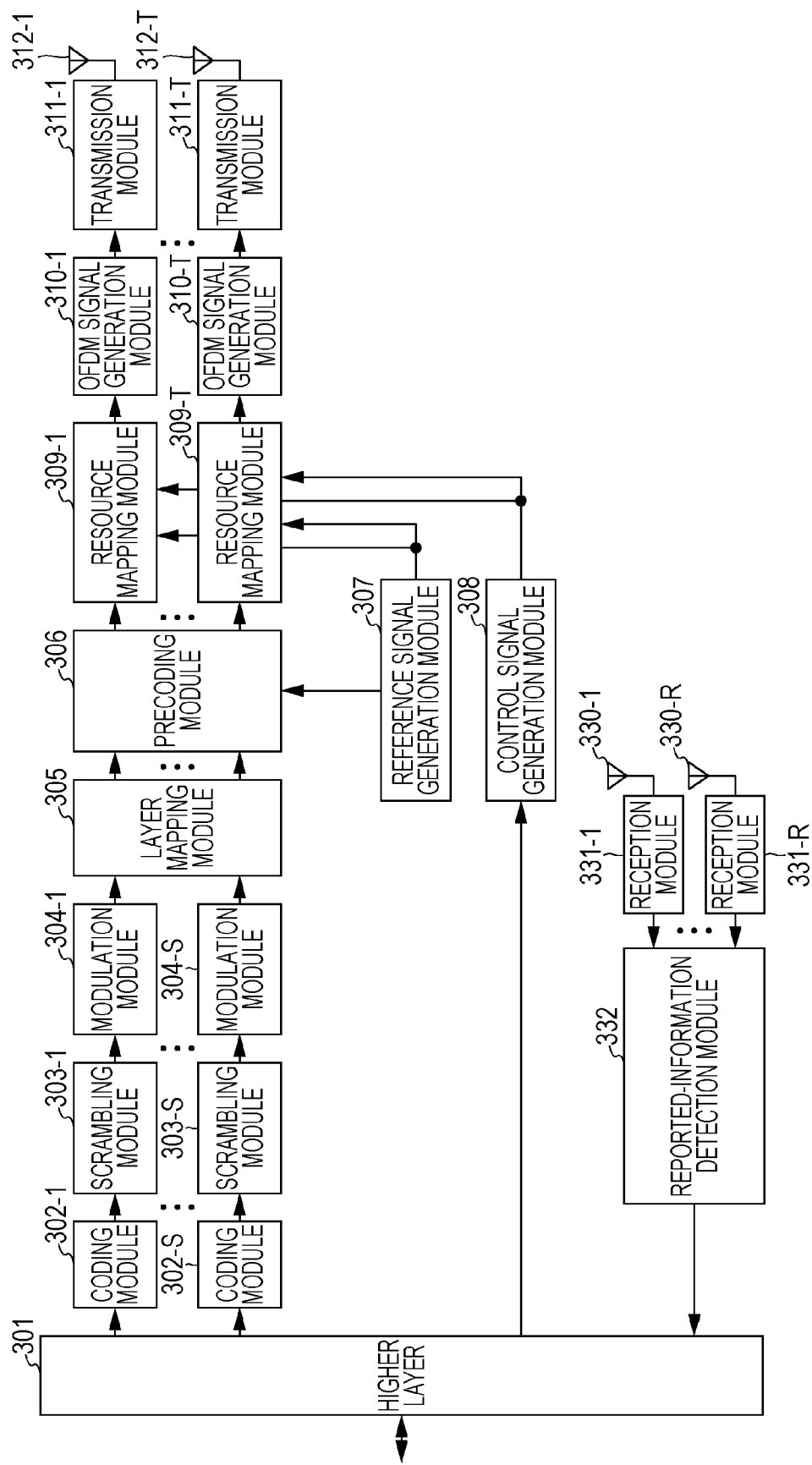
FIG. 9 is a schematic block diagram illustrating a configuration of a base station device 300-1 according to the second embodiment.

FIG. 9 is a schematic block diagram illustrating a configuration of the base station device 300-1 according to the second embodiment. The base station device 300-2 can also be set to have the same configuration. The base station device 300-1 includes a higher layer 301 (a higher layer step), coding modules 302-1 to 302-S (a coding step), scrambling modules 303-1 to 303-S (a scramble step), modulation modules 304-1 to 304-S (a modulation step), a layer mapping module 305 (a layer mapping step), a precoding module 306 (a precoding step), a reference signal generation module 307 (a reference signal generation step), a control signal generation module 308 (a control signal generation step), resource mapping modules 309-1 to 309-T (a resource mapping step), OFDM signal generation modules 310-1 to 310-T (an OFDM signal step), transmission modules 311-1 to 311-T (a transmission step), transmit antenna modules 312-1 to 312-T, receive antenna modules 330-1 to 330-R, reception modules 331-1 to 331-R (a reception step), and a report information detection module 332 (a report information detection step). At this point, S, T, and R indicate the number of streams, the number of transmit antenna, and the number of receive antennas, respectively. Moreover, in a case where one portion or all portions of the base station device 300-1 are integrated into an integrated circuit, a chip control circuit is retained that performs control on each functional block. Furthermore, According to the present embodiment, the base station device 300-1 and the terminal devices 400-1 that is described below are for a block diagram in the case of the single carrier transmission such as the Orthogonal Frequency Division Multiplexing (OFDM) transmission, but can also be applied in the case of the Single Carrier-Frequency Division Multiple Access (SC-FDMA), and the Discrete Fourier Transform-spread-OFDM (DFT-s-OFDM). Modules that has different functions from the modules of the base station device 100-1 (FIG. 3) according to the first embodiment will be described below in a focused manner.

The report information detection module 332 detects the control channel that is fed back (S203, S205, and S208 in FIG. 7, and S303, S305, and S308 in FIG. 8) from the terminal device 400-1 that makes a connection, and outputs a result of the detection to the higher layer 101. Included in the control information that is included in the channel are information (for example, the RRC Connection Request, the RRC Connection Setup Complete, and the like) that is transmitted by the terminal device and that is required for the radio connection setup between the base station device and the terminal device, the terminal capability information (for example, the UE Capability Information), the channel quality information report (the Channel Quality Information (CQI) report), and the like. Furthermore, the report information detection module 332 detects the control channel that includes the neighboring-cell interference information (S311 in FIG. 8) that is fed back from the terminal device 400-1 that makes a connection, and output a result of the detection to the higher layer 101.

The higher layer 301 makes a request to the base station device 300-2 for a notification of the neighboring-cell control information through the backhaul circuit (S209 in FIGS. 7 and S312 in FIG. 8). Furthermore, a higher layer 300-1 acquires the neighboring-cell control information from the neighboring base station device 300-2 over the backhaul line (S210 in FIGS. 7 and S313 in FIG. 8).

The higher layer 301 determines the parameters (the MCS, the rank, the scheduling, the port number, and the transmission modes (the precoding, the transmission diversity, and the like)) for the downlink transmission from the base station device 300-1 to the terminal device 400-1, considering the terminal capability information, the channel quality information report, the neighboring-cell control information and the like that are included in the control channel that is output by the report information detection module 332 (S211 in FIGS. 7 and S314 in FIG. 8).

The higher layer 301 generates the information data and the control information that are transmitted to the terminal device 400-1. The transmission parameter (the demodulation control information) of the downlink signal that is transmitted to the terminal device is included in the control information that is generated by the higher layer 301. Furthermore, the control information (the assistance control information) of the neighboring base station device 300-2 is included in the control information. The higher layer 301 can include a neighboring-cell interference information notification request in the control information (S309 in FIG. 8).

Figure 10:
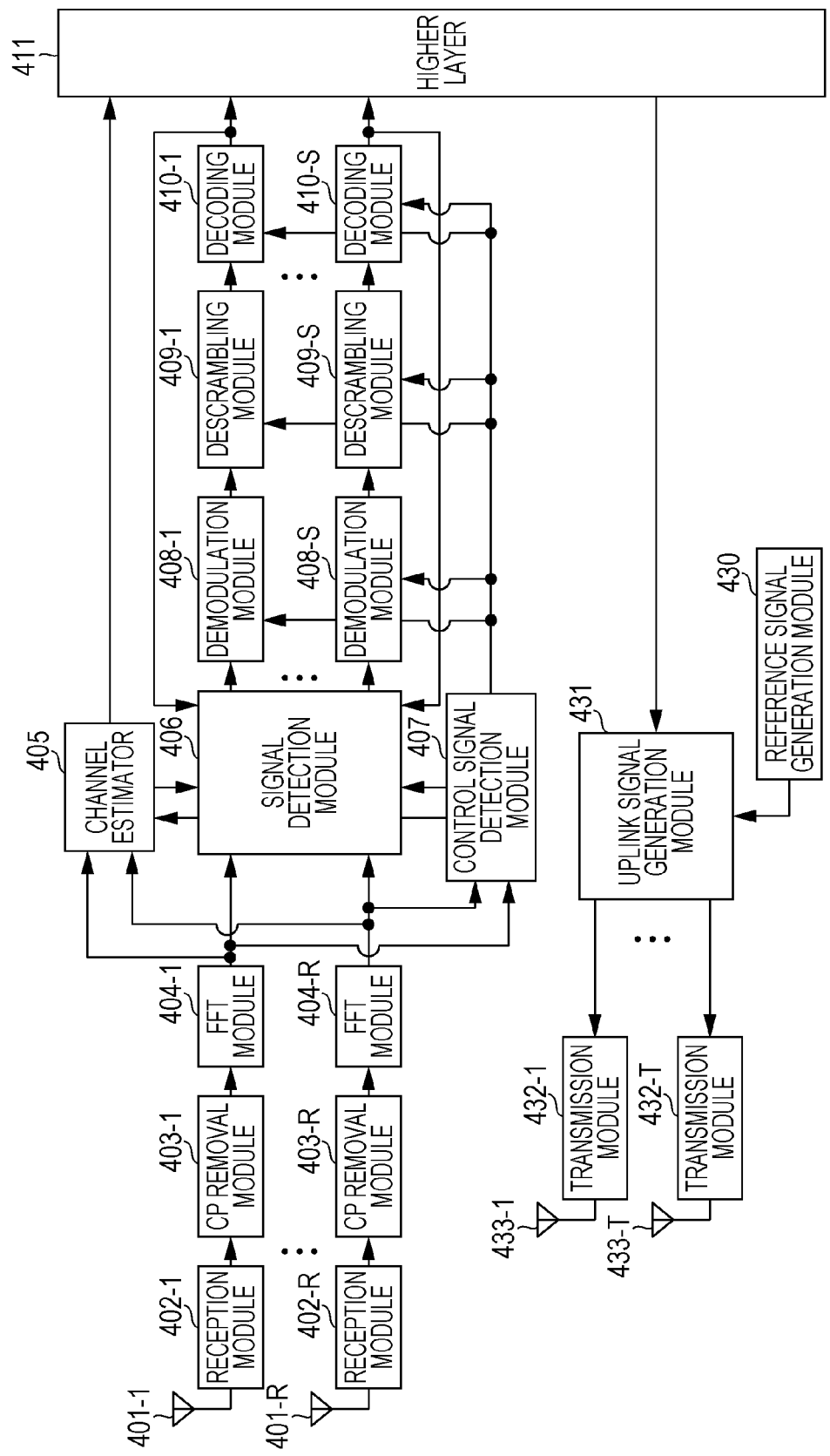
FIG. 10 is a schematic block diagram illustrating a configuration of a terminal device 400-1 according to the second embodiment.

FIG. 10 is a schematic block diagram illustrating a configuration of the terminal device 400-1 according to the second embodiment. The terminal device 400-1 is a terminal device that has the interference suppression function. The terminal device 400-1 includes receive antennas 401-1 to 401-R, reception modules 402-1 to 402-R (a reception step), CP removal modules 403-1 to 403-R (a CP removal step), Fast Fourier Transform (FFT) modules 404-1 to 404-R (a FFT step), a channel estimator 405 (a channel estimation step), a signal detection module 406 (a signal detection step), a control signal detection module 407 (a control signal detection step), demodulation modules 408-1 to 408-S (a demodulation step), descrambling modules 409-1 to 409-S (a descrambling step), decoding modules 410-1 to 410-S (a decoding step), a higher layer 411 (a higher layer step), a reference signal generation module 430 (a reference signal generation step), an uplink signal generation module 431 (an uplink signal generation step), transmission modules 432-1 to 432-T (a transmission step), and transmit antennas 433-1 to 433-T. Furthermore, in a case where one portion or all portions of the terminal device 400-1 are integrated into an integrated circuit, a chip control circuit (not illustrated) is retained that performs control on each functional block. Moreover, R indicates the number of receive antennas. Furthermore, the number of transmit antennas is set to be T, and is set to be the same as that of the base station device 400-1, but the present invention is not limited to this and the number of antennas of the terminal device and the number of antennas of the base station device may be different from each other. Moreover, for the terminal device 400-2 in FIG. 6, when the terminal device 400-2 is set not to have the interference suppression function, the terminal device 400-2 is configured to be a terminal device that results from removing the signal detection module 406 from the terminal device 400-1. Modules that has different functions from the modules of the terminal device 200-1 (FIG. 3) according to the first embodiment will be described below in a focused manner.

The reception modules 402-1 to 402-R receives signals that are transmitted by the base station device 300-1 from the transmit antenna 412-1 to 412-T through the receive antennas 401-1 to 401-R, respectively. Furthermore, the reception modules 402-1 to 402-R receives signals that are transmitted by the base station device 300-2 from the transmit antennas 312-1 to 312-T through the receive antennas 401-1 to 401-R, respectively. That is, for the reception module 402-1, the signal that is transmitted by the base station device 300-1 is a desired signal, and the signal that is transmitted by the neighboring base station device 300-2 is an interference signal. The latter signal is intercell interference.

The control signal detection module 407 extracts the control channel that is included in the signal that is subjected to the time frequency conversion, and acquires the demodulation control information and the assistance control information (S212 in FIG. 7 and S315 in FIG. 8). The control signal detection module 407 notifies each module of information that is information which is included in the demodulation control information and the assistance control information and that is required for realizing a function of each module that makes up the terminal device 400-1.

The channel estimator 405 performs the received-quality measurement (S207 in FIG. 7) by using the reference signals that are included in the signal that is subjected to the time frequency conversion, such as the CRS and the CSI-RS. Furthermore, the channel estimator 405 performs the channel estimation (S213) by using the reference signals such as the CRS, the CSI-RS, and the DM-RS. The channel estimator 405 estimates the received-quality measurement of and the channel estimate of the signal of the base station device 300-1. Furthermore, the channel estimator 405 estimates the channel estimate of the signal of the base station device 300-2. At this point, when performing the estimation, the channel estimator 405 can use the port number information that is included in the demodulation control information and the assistance control information. Furthermore, when performing the estimation, the channel estimator 405 can use the information relating to the duplex scheme that is included in the assistance control information. Accordingly, while determining whether a reference signal is distinguishably an uplink reference signal or a downlink reference signal, the channel estimator 405 can know a resource of the reference signal and a code sequence that are used for the channel estimation.

The signal detection module 406 detects the data signal channel and the control channel that are transmitted to the terminal device. Furthermore, the signal detection module 406 detects the data signal channel and the control channel that are transmitted by a neighboring base station device. At this point, when performing the detection, the signal detection module 406 can use the channel estimate, the demodulation control information, and the information indicating the rank that is included in the assistance control information. Furthermore, when performing the detection, the signal detection 406 can use the demodulation control information and information relating to the transmission mode that is included in the assistance control information. Furthermore, when performing the detection, the signal detection module 406 can use the demodulation control information and the scheduling information that is included in the assistance control information. Furthermore, the signal detection module 406 can use results of the decoding that are fed back from the decoding modules 410-1 to 410-S, for the signal detection. Furthermore, when performing the detection, the signal detection 406 can use the information relating to the duplex scheme that included in the assistance control information.

The signal detection module 406 demultiplexes the transmit signals of the base station device 300-1 and the base station device 300-2, which are received in the state of being spatially multiplexed, using maximum likelihood detection and interference cancellation. For example, the signal detection module 406 can use the successive interference cancellation illustrated in FIG. 5 as the interference cancellation function.

For example, the signal detection module 406, which has the interference cancellation function in FIG. 5, can acquire the number of streams D, using information indicating the ranks that are included in the demodulation control information and the assistance control information, and information relating to the transmission mode. For example, in the communication system in FIG. 6, a sum of the number of streams of the signal that is transmitted by the base station device 300-1 to the terminal device 400-1 and the number of streams of the signal that is transmitted by the base station device 300-2 to the terminal device 400-2 is acquired. Furthermore, when generating the data modulation symbol replicas of the transmit signals from the base station device 300-1 and the base station device 300-2, the signal detection module 406 that has the interference cancellation function in FIG. 5 can acquire the demodulation control information, and the MCS information that is included in the assistance control information. Furthermore, when generating the data modulation symbol replicas of the transmission signals of the base station device 300-1 and the base station device 300-2, the signal detection module 406 that has the interference cancellation function in FIG. 5 can acquire the information relating to the duplex scheme that is included in the assistance control information. Accordingly, the signal that is destined for the terminal device 400-1 can be detected, demodulated, and decoded using results of demodulating and decoding a neighboring-cell (intercell interference) transmission signal.

The demodulation modules 408-1 to 408-S performs the demodulation processing on the signal that is input from the signal detection module 406, and calculates the bit logarithm likelihood ratio (a Log Likelihood Ratio (LLR)). When performing the demodulation processing, the demodulation modules 408-1 to 408-S can use the demodulation control information and the MCS information that is included in the assistance control information.

The descrambling modules 409-1 to 409-S descrambles the codeword on which the scrambling is performed in the base station device, and calculates a bit logarithm likelihood ratio of a codeword. The descrambling modules 409-1 to 409-S can use the demodulation control information and the assistance control information.

The decoding modules 410-1 to 410-S perform the error correction decoding on the bit logarithm likelihood ratio of the codeword, calculates information data and various pieces of control data (a terminal capability information request, requests for notification of the channel quality information and the like, and the like) that are transmitted to the terminal device 400-1, and outputs a result of the calculation to the higher layer 411. Moreover, the higher layer 411 can notify each module of the control information (the MCS information or the like to the terminal device 400-1 and a different terminal device) for performing the demodulation processing, the descrambling, and the decoding processing. At this point, when performing the demodulation processing, the demodulation modules 410-1 to 410-S can use the demodulation control information and the MCS information that is included in the assistance control information.

In response to the terminal capability information request, the higher layer 411 outputs the terminal capability information of the terminal device 400-1, to the uplink signal generation module 431. In response to the request for the notification of the channel quality information and the like, the higher layer 411 outputs the channel quality information and the like to the uplink signal generation module 431. Furthermore, the higher layer 411 acquires pieces of information data that are output by the decoding modules 410-1 to 410-S.

The terminal device 400-1 has a function of transmitting a signal as well. The reference signal generation module 430 generates an uplink reference signal. The uplink signal generation module 431 generates the terminal capability information, the channel quality information, and the uplink signal that includes the neighboring-cell interference information and the like. The uplink signal is a signal that is configured from the SC-FDMA symbol or the OFDMA symbol. The digital and analog conversion, the filtering, the frequency conversion, and the like are performed on an output of the uplink signal generation module 431 in the transmission modules 432-1 to 432-T, and the output is transmitted from the transmit antennas 433-1 to 433-T.

As described above, in the communication system according to the second embodiment, the terminal device is notified of an assistance control information that is information relating to a signal that is transmitted by a neighboring base station device. Therefore, the terminal device can suppress the interference between a cell that the terminal device serves and another cell different from the cell by using the assistance control information. Accordingly, while an influence due to limitation on an amount of feedback information in the communication system is reduced, the inter-user interference can be suppressed, and spectral efficiency can be improved.

(Third Embodiment)

A communication system, a configuration of a base station device, and a configuration of a terminal device according to the present embodiment are the same as those according to the first embodiment and as those according to the second embodiment. According to the present embodiment, the base station device (the base station device 100-1) according to the first embodiment and the base station devices (the base station devices 300-1 and 300-2) according to the second embodiment are referred to as base station devices. Furthermore, according to the present embodiment, the terminal devices (the terminal device 200-1 and 200-2) according to the first embodiment, the terminal devices (the terminal devices 400-1 and 400-2) according to the second embodiment are referred to as terminal devices. Therefore, according to the present embodiment, in a higher layer, the terminal capability information (which is referred to as interference suppression capability according to the present embodiment) is generated and is notified (transferred or signaled) to the base station device. The base station device receives the interference suppression capability in the reception module, generates the assistance control information and notifies the terminal device of the generated assistance control information through the transmission module. The terminal device suppresses the inter-user interference and the inter-cell interference by using the assistance control information that is notified from the base station device. According to the present embodiment, an interference suppression capability notification method is disclosed.

Furthermore, it is possible to apply the communication system according to the present embodiment to a communication system that performs communication among terminal devices, as well. Therefore, the base station device according to the present embodiment may be a device that is equipped with a function of performing transmission, and is referred to as a communication device.

Figure 11:
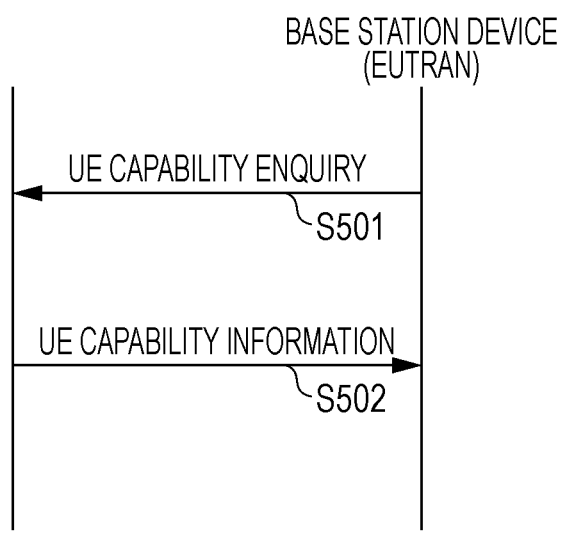
FIG. 11 is a sequence diagram illustrating processing between a base station device and a terminal device in a communication system according to a third embodiment.

FIG. 11 is a sequence diagram illustrating processing between a base station device and a terminal in a communication system according to a third embodiment. The base station device (which may be an Evolved Universal Terrestrial Radio Access Network (EUTRAN)) makes a notification of UE capability enquiry (S501). For example, the UE capability enquiry is notified through Radio Resource Control (RRC) Signaling and the like.

The terminal device makes a notification of UE capability information (terminal device capability information or UE capability information) (S502). The UE capability information is information relating to a function that can be used by the terminal device. For example, the UE capability information is notified through RRC signaling.

Moreover, the UE capability information may be notified as feature group indicators (FGI). Moreover, for example, the feature group indicators are indicators that indicate whether or not tests of some function among all functions (that are required to be built) that have to be built into an item of UE are completed in group units, each of which is configured from one function or multiple functions.

In S502, the terminal device may make a notification of the interference suppression capability that is included in the UE capability information. The interference suppression capability is information that indicates a capability of suppressing the interference in the terminal device, and for example, is information that indicates the presence or absence of the interference suppression function, an interference suppression scheme, the maximum number of interference layers, the maximum number of pieces of receivable terminal information, or the like. The presence or absence of the interference suppression function is information indicating whether or not the terminal device includes a function of suppressing interference, and may indicate whether or not the terminal device supports a function such as a Network Assisted Interference Cancellation and Suppression (NAICS). The interference suppression scheme is information that indicates a reception processing scheme that is used as the interference suppression function, and for example, is Interference Rejection Combining (IRC), Successive Interference Canceller (SIC), Maximum Likelihood Detection (MLD), or the like. Furthermore, the interference suppression scheme may be categorized into a linear scheme and a non-linear scheme. The maximum number of interference layers is the number of layers of interference signals that it is possible for the terminal device to suppress. The maximum number of receivable terminal information is the maximum number of pieces of assistance control information that it is possible for the terminal device to receive. Furthermore, the receivable terminal information may be information that indicates whether or not it is possible for the terminal device to receive the assistance control information. Moreover, the terminal device may include one interference suppression capability in the UE capability information, or may include multiple interference capabilities in the UE capability information.

Furthermore, in S502, the terminal device may make a notification of the interference suppression capability in a state of being included in a UE category that is included in the UE capability information.

FIG. 12 is a first configuration example of the UE category according to the third embodiment. In FIG. 12, A is a UE category number, and A1 to A4 are pieces of information in the UE in a category A. Specifically, A1 is the maximum number of downlink (DL)-SCH transport block bits that are received at 1 transmission time interval (TTI) in the UE in the category A, A2 is the maximum number of downlink (DL)-SCH transport block bits that are received at 1 TTI in the UE in the category A, A3 is a total number of soft channel bits, and A4 is the maximum number of layers that supported for spatial multiplexing for the DL in the UE in the category A. For example, referring to FIG. 12, a category 1 to a category 8 are categories of the terminal devices, each of which is not equipped with the interference suppression function, and a category 9 or later may be set to be categories of the terminal devices, each of which is equipped with the interference suppression function. In this manner, a new UE category number may be defined and the interference suppression capability may be included in the UE category. Moreover, the number of UE category numbers that are added may be 1 or be 2 or greater.

FIG. 13 is a second configuration example of the UE category according to the third embodiment. In FIG. 13, an item B indicates the interference suppression capability, and each of B1 to B8 is a value of the interference suppression capability in the UE corresponding to each category number. For example, in a case where an item B is the maximum number of pieces of receivable terminal information, a value (ranging from B1 to B8) of the UE corresponding to each category number may be defined as illustrated in FIG. 14. In FIG. 14, the maximum number of pieces of receivable termination information of the UE corresponding to the category 1 is 0. By setting the maximum number of pieces of receivable terminal information to 0, the terminal device can indicate that it is not possible for the terminal device to receive the assistance control information. In this manner, by defining the interference suppression capability as an item that is the UE category and including the interference suppression capability in the UE category, the interference suppression capability can make the interference suppression capability correspond to the UE category number. Moreover, the number of items that are the UE categories may be 1 or be 2 or greater.

FIG. 15 is a third configuration example of the UE category according to the third embodiment. In FIG. 15, C is a UE category number, an item D is an interference suppression capability, and each of C1 to C13 is information in a category number C and an item D. As illustrated in FIG. 15, both of the items that the UE category number and the interference suppression capability may be defined, and the interference suppression capability may be included in the UE category. Moreover, each of the number of UE category numbers that are added and the number of items that are the UE categories may be 1 or be 2 or greater.

Furthermore, the base station device may perform each processing operation based on the interference suppression capability that is notified from the terminal device. For example, the base station device may perform scheduling based on the presence or absence of the interference suppression function, the interference suppression scheme, the maximum number of interference layers, and the like. Furthermore, the base station device may set the maximum number of different terminal devices, which is generated as the assistance control information, to be equal to or smaller than the maximum number of terminal devices that are capable of performing receiving, based on the maximum number of pieces of receivable terminal information.

As described above, in the communication system according to the third embodiment, the terminal device notifies the base station device of the interference suppression capability in a state of being included in the UE capability information or the UE category. Furthermore, because the base station device can recognize the interference suppression capability of each terminal device and perform suitable processing, the base station device can improve transmission performance. Therefore, while an influence due to limitation on an amount of feedback information in the communication system is reduced, the inter-user interference and the intercell interference can be suppressed and the spectral efficiency can be improved.

(Fourth Embodiment)

Duplex schemes in a wireless communication system largely include Time Division Duplex (TDD) and Frequency Division Duplex (FDD). The mixing of these duplex schemes in the wireless communication system has been studied. In a case where interference cancellation and suppression are applied in this mixing situation, because the terminal device does not know the duplex scheme of a signal that causes interference, it is difficult for the terminal device to cancel the interference. Furthermore, in a cellular environment in which transmission is performed with TDD in each cell, in some cases, in a certain frame, a ratio between a resource that is allocated for uplink transmission and a resource that is allocated for downlink transmission or a resource configuration differs from one cell to another. In such case, because the terminal device does not know whether the signal that causes the interference is an uplink signal or a downlink signal, it is difficult for the terminal device to cancel the interference.

According to the present embodiment, considering such a situation, there is provided a terminal device, a base station device, a communication system, a reception method, and a transmission method, in each of which it is possible to suppress the intercell interference and improve the spectral efficiency.

A terminal device according to an aspect of the present embodiment includes a reception module that receives a control channel and a spatially multiplexed data signal channel, a control signal detection module that extracts a demodulation control information which is a transmission parameter of a signal that is transmitted to the terminal device, in a data signal channel that is output from the reception module, and assistance control information which is a transmission parameter of a signal that is transmitted to other than the terminal device, in the data signal channel that is output from the reception module, a channel estimator that obtains a channel estimate by using a reference signal, a signal detection module that demultiplexes the data signal that is spatially multiplexed, using the demodulation control information, the assistance control information, and the channel estimate, and a decoding module that decodes a signal that is output by the signal detection module, in which information relating to a transmission frame format of an uplink signal or a downlink signal is included in the assistance control information.

Furthermore, in the terminal device described above, the transmission frame format may be a transmission frame format number in a communication system to which the terminal device belongs.

Furthermore, in the terminal device described above, the transmission frame format may be a bitmap of a subframe that constructs the transmission frame format.

Furthermore, in the terminal device described above, the transmission frame format may be information on either of a subframe to which the uplink signal is allocated and a subframe to which the downlink signal is allocated, among the subframes that construct the transmission frame format.

Furthermore, in the terminal device described above, information indicating a rank may be included in the assistance control information.

Furthermore, in the terminal device described above, information indicating a rank may be included in the assistance control information.

Furthermore, in the terminal device described above, information indicating a port number may be included in the assistance control information.

Furthermore, in the terminal device described above, the reception module may be configured in such a manner that a signal that is transmitted to the terminal device and a signal that is transmitted to other than the terminal device, which is different in duplex scheme from the signal that is transmitted to the terminal device.

Furthermore, in the terminal device described above, the reception module may be configured in such a manner that the signal that is transmitted to the the terminal device and the signal that is transmitted to other than the terminal device, which is different in transmission frame format from the signal that is transmitted to the terminal device.

Furthermore, in the terminal device described above, the signal detection module may be configured in such a manner that the spatially multiplexed data signal is demultiplexed using a result of the decoding.

Furthermore, in the terminal device described above, the signal detection module may include a replica generation module that generates, using the result of the decoding, a replica of a receive signal that is received by the reception module, and an interference cancellation module that subtracts the receive signal replica from the data signal channel that is output from the reception module, and the replica generation module may be configured in such manner that the replica of the receive signal of the uplink signal that is transmitted at least to other than the terminal device.

Furthermore, in the terminal device described above, the signal detection module may be configured in such a manner that maximum likelihood detection is performed.

A base station device according to another aspect of the present embodiment includes a control signal generation module that, for a certain terminal device, generates a control channel which includes demodulation control information that is a transmission parameter of a signal that is transmitted to the terminal device and assistance control information that is a transmission parameter relating to a signal that is transmitted to a terminal device other than the terminal device, a layer mapping module that maps a data signal channel that is destined for multiple terminal devices, to a layer onto which to perform spatial multiplexing, a resource mapping module that maps the control channel and the data signal channel to a radio resource, and a transmit antenna through which an output of the resource mapping module is transmitted, in which information relating to a transmission frame format is included in the assistance control information.

Furthermore, in the base station device, the transmission frame format may be a transmission frame format number in a communication system to which the terminal device belongs.

Furthermore, in the base station device, the transmission frame format may be the bitmap of the subframe that constructs the transmission frame format.

Furthermore, in the base station device, the transmission frame format may be information on either of a subframe to which the uplink signal is allocated and a subframe to which the downlink signal is allocated, among the subframes that construct the transmission frame format.

Furthermore, a communication system according to still another aspect of the present embodiment includes a base station device that includes a control signal generation module that, for a certain terminal device, generates a control channel which includes demodulation control information that is a transmission parameter of a signal that is transmitted to the terminal device and assistance control information that is a transmission parameter relating to a signal that is transmitted to a terminal device other than the terminal device, a layer mapping module that maps a data signal channel that is destined for multiple terminal devices, to a layer onto which to perform spatial multiplexing, a resource mapping module that maps the control channel and the data signal channel to a radio resource, and a transmit antenna through which an output of the resource mapping module is transmitted, and a terminal device that includes a reception module that receives a control channel and a spatially multiplexed data signal channel, a control signal detection module that extracts modulation control information that is a transmission parameter of a signal that is transmitted to the terminal device in a data signal channel that is output from the reception module, and assistance control information that is a transmission parameter of a signal that is transmitted to other than the terminal device in the data signal channel that is output from the reception module, an channel estimator that obtains a channel estimate, using a reference signal, a signal detection module that demultiplexes the data signal that is spatially multiplexed, using the demodulation control information, the assistance control information, and the channel estimate, and a decoding module that decodes a signal that is output from the signal detection module, in which information relating to a transmission frame format of an uplink signal or a downlink signal is included in the assistance control information.

Furthermore, a reception method according to still another aspect of the present embodiment includes a reception step of receiving a control channel and a spatially multiplexed data signal channel, a control signal detection step of extracting demodulation control information that is a transmission parameter of a signal that is transmitted to a terminal device in which the reception method is performed in a data signal channel that is obtained in the reception step, and assistance control information that is a transmission parameter of a signal that is transmitted to other than the terminal device in the data signal channel that is obtained in the reception step, a channel estimation step of obtaining a channel estimate by using a reference signal, a signal detection step of demultiplexing the data signal that is spatially multiplexed, using the demodulation control information, the assistance control information and the channel estimate, and a decoding step of decoding a signal that is output in the signal detection step, in which information relating to a transmission frame format of an uplink signal or a downlink signal is included in the assistance control information.

Furthermore, a transmission method according to still another aspect of the present embodiment includes a control generation signal step of generating for a certain terminal device a control channel which includes demodulation control information that is a transmission parameter of a signal that is transmitted to the terminal device and assistance control information that is a transmission parameter relating to a signal that is transmitted to a terminal device other than the terminal device, a layer mapping step of mapping a data signal channel that is destined for multiple terminal devices, to a layer onto which to perform spatial multiplexing, a resource mapping step of mapping the control channel and the data signal channel to a radio resource, and a transmission step of transmitting an output of the resource mapping module, in which information relating to a transmission frame format is included in the assistance control information.

Furthermore, a communication method according to still another aspect of the present embodiment includes a transmission method that includes a control signal generation step of generating for a certain terminal device a control channel which includes demodulation control information that is a transmission parameter of a signal that is transmitted to the terminal device and assistance control information that is a transmission parameter relating to a signal that is transmitted to a terminal device other than the terminal device, a layer mapping step of mapping a data signal channel that is destined for multiple terminal devices, to a layer onto which to perform spatial multiplexing, a resource mapping step of mapping the control channel and the data signal channel to a radio resource, and a transmission step of transmitting an output in the resource mapping step, and a reception method that includes a reception step of receiving a control channel and a spatially multiplexed data signal channel, a control signal detection step of extracting the demodulation control information that is a transmission parameter of a signal that is transmitted to a base station in which the reception method is performed in a data signal channel that is obtained in the reception step, and assistance control information that is a transmission parameter a signal that is transmitted to other than the base station in the data signal channel of the signal that is transmitted in the reception step, a channel estimation step of obtaining a channel estimate by using a reference signal, a signal detection step of demultiplexing the data signal that is spatially multiplexed using the modulation control information, the assistance control information, and the channel estimate, and a coding step of decoding a signal that is obtained in the signal detection step, in which information relating to a transmission frame format of an uplink signal or a downlink signal is included in the assistance control information.

Figure 16:
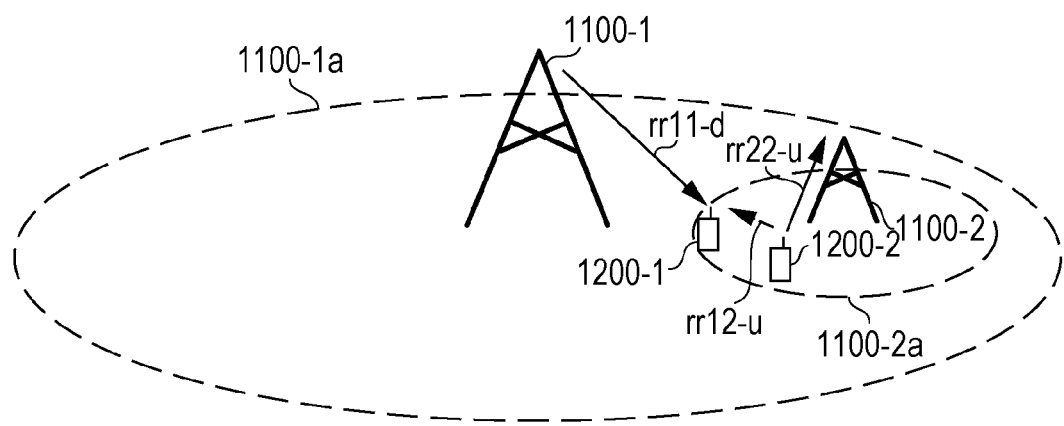
FIG. 16 is a schematic diagram illustrating a configuration of a communication system according to a fourth embodiment.

FIG. 16 is a schematic diagram illustrating a configuration of a communication system according to the present embodiment. In FIG. 16, base stations are arranged in such a manner that a coverage 1100-1a (a macro cell) of a base station device 1100-1 (also referred to as a macro cell base station or a first base station device), and a coverage 1100-2a (a pico cell, a femto cell, a small cell, or the like) of a base station device 1100-2 that is a low power base station (also referred as to a pico cell base station, a femto cell base station, a small cell base station, or a second base station device) that has lower transmission power than the base station device 1100-1 overlap each other. The coverage indicates a range in which the base station device and the terminal device can connect to each other, and is also referred to as a communication area. Furthermore, one terminal device is connected to each base station device. A terminal device 1200-1 is connected to the base station device 1100-1, and a terminal device 1200-2 is connected to the base station device 1100-2. Furthermore, the base station device 1100-1 and the base station device 1100-2 are connected to each other with a backhaul line. A wired connection may be made using an optical fiber, an X2 interface or the like, and a wireless connection may be made as with a relay base station.

The base station device 1100-2 transmits the uplink signal and the downlink signal to the terminal device 1200-2 that connects to the base station device, using Time Division Duplex (TDD). FIG. 16 illustrates an example of a case where in TDD, the terminal device 1200-2 transmits the uplink signal to the base station device 1100-2. In a case where a downlink signal rr11-d of the base station device 1100-1 uses the same frequency band as the transmit and receive signals in the base station device 1200-2, the uplink signal that the terminal device 1200-2 transmits to the base station device 1100-1 causes the intercell interference when the terminal device 1200-1 receives the downlink signal rr11-d (rr12-u).

Moreover, the duplex scheme in the base station device 1100-1 may be Frequency Division Duplex (FDD), and may be Time Division Duplex.

Figure 17:
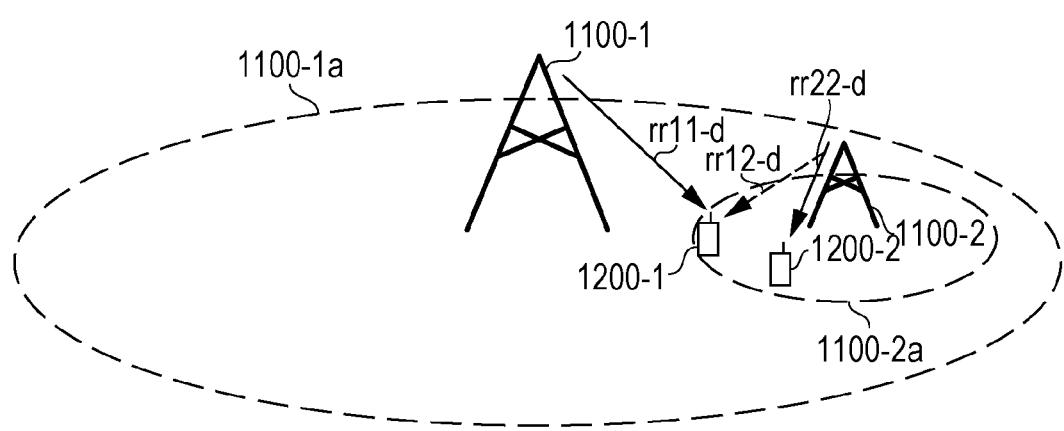
FIG. 17 is another schematic diagram illustrating a configuration of the communication system according to the fourth embodiment.

FIG. 17 is another schematic diagram illustrating a configuration of the communication system according to the present embodiment. In FIG. 17, the same base station devices and terminal devices as those in FIG. 16 are given the same reference numerals. FIG. 17 illustrates an example in which in TDD, the base station device 1100-2 transmits the downlink signal to the terminal device 1200-2. In the case where a downlink signal rr11-d of the base station device 1100-1 uses the same frequency band as the transmit and receive signals in the base station device 1100-2, the downlink signal that the base station device 1100-2 transmits to the terminal device 1200-2 causes the intercell interference when the terminal device 1200-1 receives the downlink signal rr11-d (rr12-d).

Moreover, FIGS. 16 and 17 illustrates an example where a multicell is configured from the macro cell base station and the low power base station, but the present invention is not limited to this. The multicell may be configured from only the macro cell base station and may be configured from only the lower power base station. This is also true for the following description.

Furthermore, in FIG. 16, one low power base station (the base station device 1100-2) is illustrated, but the present invention is not limited to this. A case where multiple low power base stations are arranged within a coverage of the base station device 1100-1 is also included in the present invention. Furthermore, in FIG. 16, one terminal device connects to the base station device, but the present invention is not limited to this. A case where multiple terminal devices connect to the base station device is also included in the present invention.

Furthermore, in the case where multiple low power base stations are present, the transmission power may differ from one low power base station to another. Furthermore, the macro cell base station and the low power base station may be distinguished from each other not only by the transmission power, but may be distinguished for each other also by distinguishing a cell that has backward-compatibility and that supports a scheme that is already in service and a cell that is newly defined and that has no backward-compatibility.

Furthermore, schemes (a version of a communication system, an option, and the like) that are in service between the low power base stations may differ from each other.

Furthermore, the present invention can be applied in any multicell environment, and the number of cells, the number of base stations, the number of terminals, types of cells (for example, a macro cell, a pico cell, a femto cell, and a small cell), and the like are not limited to the present embodiment.

Figure 18:
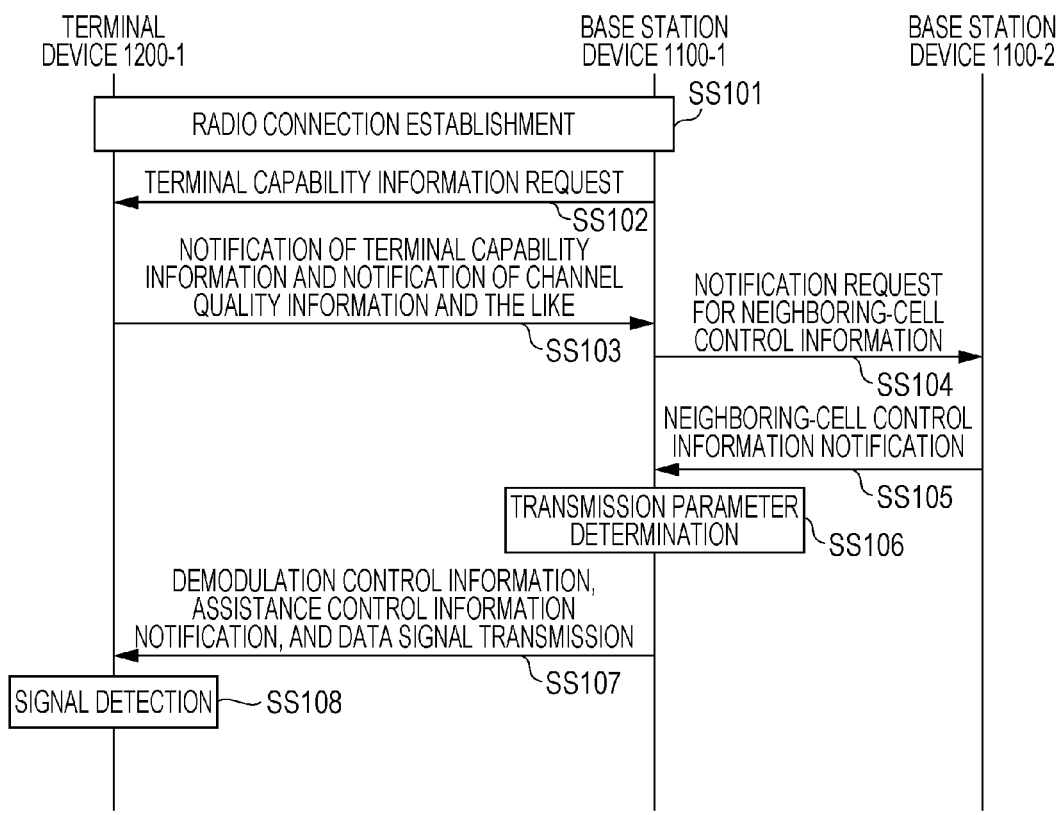
FIG. 18 is a sequence diagram illustrating processing between a base station device and a terminal device in the communication system according to the fourth embodiment.

FIG. 18 is a sequence diagram illustrating processing between the base station device and the terminal in the communication system according to the present embodiment. FIG. 18 is for describing processing in which the terminal device 1200-1 connects to the base station device 1100-1 in a wireless manner and performs downlink data transmission in the communication system that are illustrated in FIGS. 16 and 17.

The terminal device 1200-1 establishes a radio connection (for example, RRC Connection establish) to the base station device 1100-1 (SS101). The terminal device 1200-1 establishes synchronization (for example, frame synchronization or symbol synchronization by means of a synchronization signal) to the base station device 1100-1 and acquires basic system information (for example, is also referred to as a Master Information Block (MIB)) such as a system bandwidth by means of a broadcast channel (is referred to, for example, as a Physical Broadcast Channel) in the base station device 1100-1, a system frame number, and the number of transmit antennas. The base station device 1100-1 can include information relating to a duplex scheme (TDD or FDD) in the broadcast channel. The base station device 1100-1 can include information (which will be described below) relating to the transmission frame format in the broadcast channel.

Next, the base station device 1100-1 makes a request to the terminal device 1200-1 that establishes a radio connection, for the terminal capability information (SS102). When receiving a terminal capability information request (SS102), the terminal device 1200-1 notifies the base station device 1100-1 of the terminal capability information (SS103). For example, the terminal capability information is replaced with UE capability Information in LTE and the like. Terminal capability information can include information relating to a function that can be used by the terminal device. Furthermore, as the terminal capability information, a category of terminal devices can be included.

For example, the terminal device 1200-1 can notify the base station device 1100-1 of information that the terminal device 1200-1 has an interference suppression function (or a cancellation function), as the terminal capability function. For example, the terminal device 1200-1 can notify the base station device 1100-1 that the terminal device 1200-1 belongs to a category of terminals that have the interference suppression function, as the capability information. Moreover, the information that the terminal device 200-1 has the interference suppression function can be further divided by an interference suppression method and the like into multiple pieces of information. For example, the division into information that a linear type interference suppression function is retained and information that a non-linear type interference suppression function is retained can be chosen for definition.

Furthermore, the terminal device 1200-1 can notify the base station device 1100-1 of information indicating that the terminal device 1200-1 includes a function of performing assistance (for example, sharing information relating to a higher layer above a physical layer and relating to a different cell or a different terminal device) through a network, as the terminal capability information. Furthermore, the terminal device 1200-1 can notify the base station device 1100-1 of a release (for example, a specification version) that the terminal device 1200-1 can support, as the terminal capability information.

Furthermore, the terminal device 1200-1 report information required for determining parameters for the downlink transmission between the terminal device 1200-1 and the base station device 1100-1 the downlink transmission parameter, to the base station device 1100-1 (SS103). Information required for determining the parameters for the downlink transmission includes Channel Quality Information (CQI), a rank (for example, a Rank Indicator (RI)), precoding (for example, Precoding Matrix Indicator (PMI), and the like. The channel quality information may be on the received quality itself, and may be on a codebook that is stipulated in advance with a Modulation and Coding Scheme (MCS) information that can be received and the like, in the communication system. Moreover, the terminal device can be set to perform each reporting operation (SS103) at different timings and at different reporting intervals. Furthermore, the terminal device 1200-1 can perform the received-quality measurement required for the reporting with the reference signal (for example, the CRS or the CSI-RS) that is transmitted from the base station device 1100-1, and the like.

Next, the base station device 1100-1 requests the base station device 1100-2 in a neighboring cell to make a notification of the neighboring-cell control information (SS104). Neighboring-cell control information includes transmission frame format information of the base station device in the neighboring cell. The transmission frame format can be determined in advance in the communication system. Furthermore, neighboring-cell control information can include a cell ID, scheduling information, MCS information, information indicating a rank, information (information indicating an antenna number) indicating a port number, information (precoding, transmission diversity, or the like) indicating a transmission mode, information (a power ratio between any two of data signal channel, reference signal, control channel, or the like) indicating transmission power, information (scheduling information of the reference signal, a code sequence of the reference signal, or the like) relating to the reference signal (a CRS or the like) for a neighboring cell that is used for estimating channel information, and information relating to a duplex scheme.

The base station device 1100-2 that receives the neighboring-cell control information request (SS104) makes a notification of the cell control information of the base station device 1100-2 (SS105). Moreover, the neighboring-cell control information notification request (SS104) and the neighboring-cell control information notification (SS105) can be transmitted over the backhaul line.

FIG. 19 illustrates one example of the transmission frame format. FIG. 19 illustrates a transmission frame format in a case where the uplink transmission and downlink transmission are performed using TDD. Each frame format in FIG. 19 is configured from 10 subcarriers (#0 to #9), and a subframe to which the uplink signal is allocated and a subframe to which the downlink signal is allocated are different in ratio and position from each other. In FIG. 19, a downlink is for a subframe to which the downlink signal is allocated in TDD.

An uplink is for a subframe to which the uplink signal is allocated in TDD. A guard is for a subframe for causing the uplink signal and the downlink signal not to interfere with each other. The base station device 1100-2 that performs the uplink transmission and the downlink transmission with the terminal device 1200-2 by TDD can include information relating to the transmission frame formats of the base station device 1100-2 among the transmission frame formats in FIG. 19, in the neighboring-cell control information. The base station device 1100-2 can set the information relating to the transmission frame format to be the transmission frame format number of the base station device 1100-2. The base station device 1100-2 can set the information relating to the transmission frame format to be a bitmap (information on whether the subframe that constructs the transmission frame format is allocated to the uplink or is allocated to the downlink) of the transmission frame format.

Referring back to FIG. 18, the base station device 1100-1 determines a parameter in the downlink that is transmitted to the terminal device 1200-1 (SS106). The base station device 1100-1 determines a transmission parameter for the terminal device 1300-1, using the terminal capability information, the channel quality information and the like that are notified from the terminal device 1200-1, the neighboring-cell control information, and the like. The transmission parameters can include scheduling of a transmission signal, an MCS, a rank, a port number, a transmission mode (precoding, transmission diversity, or the like). Furthermore, the base station device 1100-1 generates the control channel in which the transmission parameter is included (SS106). Furthermore, the base station device 1100-1 can include information (assistance control information) relating to a neighboring base station device 1100-2 in the control channel.

Next, the base station device 1100-1 transmits the control channel including the demodulation control information to the terminal device 1200-1 (SS107). The demodulation control information is control information required for the terminal device 1200-1 to demodulate and decode a signal (a desired signal) that is transmitted to the terminal device 1200-1. The demodulation control information includes the transmission parameter in the data signal that is destined for the terminal device 1200-1.

Furthermore, the base station device 1100-1 transmits the control channel including the assistance control information to the terminal device 1200-1 (SS107). The assistance control information can include the neighboring-cell control information.

The base station device 1100-1 can set the frame format information, which is included in the neighborhood control information, to be the transmission frame format number. Furthermore, the base station device 1100-1 can set the frame format information, which is included in the neighborhood control information, to be the bitmap of the subframe that constructs the transmission frame format. Furthermore, the base station device 1200-1 can set the frame format information, which is included in the neighborhood control information, to be the information on either of the subframe to which the uplink signal is allocated and the subframe to which the downlink signal is allocated, among the subframes that construct the transmission frame format.

Moreover, the demodulation control information and the assistance control information can be included in the Physical Downlink Control CHannel (PDCCH), the Enhanced Physical Downlink Control CHannel (EPDCCH), and the Physical Downlink Shared CHannel (PDSCH), in LTE and the like.

Last, the terminal device that is notified of the demodulation control information and the assistance control information detects a data signal that is destined for the terminal device, using these pieces of information (SS108).

Figure 20:
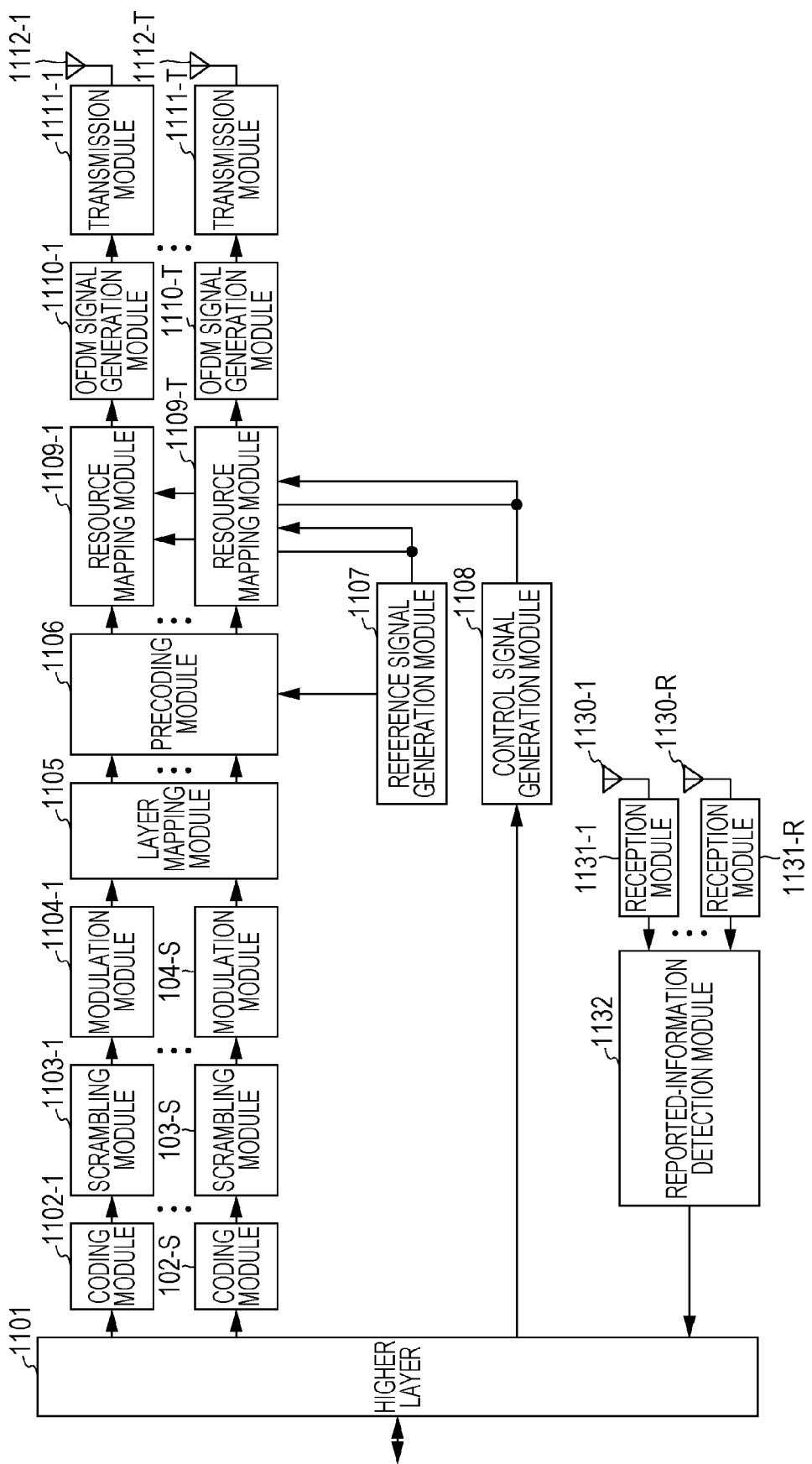
FIG. 20 is a schematic block diagram illustrating a configuration of the base station device according to the fourth embodiment.

FIG. 20 is a schematic block diagram illustrating a configuration of base station device 1100-1 according to the present embodiment. The base station device 1100-1 includes a higher layer 1101 (a higher layer step), coding modules 1102-1 to 1102-S (a coding step), scrambling modules 1103-1 to 1103-S (a scramble step), modulation modules 1104-1 to 1104-S (a modulation step), a layer mapping module 1105 (a layer mapping step), a precoding module 1106 (a precoding step), a reference signal generation module 1107 (a reference signal generation step), a control signal generation module 1108 (a control signal generation step), resource mapping modules 1109-1 to 1109-T (a resource mapping step), OFDM signal generation modules 1110-1 to 1110-T (an OFDM signal step), transmission modules 1111-1 to 1111-T (a transmission step), transmit antenna modules 1112-1 to 1112-T, receive antenna modules 1130-1 to 1130-R, reception modules 1131-1 to 1131-R (a reception step), and a report information detection module 1132 (a report information detection step). At this point, S, T, and R indicate the number of streams, the number of transmit antennas, and the number of receive antennas, respectively. Moreover, in the case where one portion or all portions of the base station device 1100-1 are integrated into an integrated circuit, a chip control circuit is retained that performs control on each functional block.

The base station device 1100-1 receives the uplink signal of the terminal device 1200-1 through the receive antenna module 1130-1 to 1130-R. Included in the uplink signal are the data signal channel (for example, a Physical Uplink Shared Channel (PUSCH) in LTE and the like) on which the information data and the control information are transmitted, and the control channel (for example, a Physical Uplink Control Channel (PUCCH) in LTE and the like) on which the control information is transmitted.

The reception modules 1131-1 to 1131-R down-convert (performs the radio frequency conversion on) signals that are received by the receive antennas 1130-1 to 1130-R into a frequency band in which the digital signal processing such as the signal detection processing is possible, perform the filtering processing that removes spurious, and perform conversion (analog-to-digital conversion) of the signal on which the filtering processing is performed from an analog signal to a digital signal. Furthermore, the reception modules 1131-1 to 1131-R perform the demodulation processing, the decoding processing, and the like, using the digital signal. Accordingly, the various signals (the data signal channel, the control channel, and the like) that are described above can be acquired from the uplink signal. Moreover, the reception modules 1131-1 to 1131-R can perform the demodulation processing, the decoding processing, and the like according to the uplink transmission scheme.

The report information detection module 1132 detects the control channel that is fed back (SS101 and SS103 in FIG. 18) from the terminal device that make a connection, and outputs a result of the detection to the higher layer 1101. Included in the control information that is included in the channel are information (for example, a RRC Connection Request, a RRC Connection Setup Complete, or the like) that is transmitted by the terminal device and that is required for establishing a radio connection between the base station device and the terminal device, terminal capability information (for example, UE Capability Information), a Channel Quality Information (CQI) report, and the like.

In the communication function hierarchy that is defined with the OSI reference model, the higher layers 1101 are higher functional layers above a Physical Layer, for example, a Media Access Control (MAC) layer, a data link layer, a network layer, and the like. Furthermore, the higher layer 1101 makes a notification of other pieces of information required for each module that makes up the base station device 1100-1 to perform a function, as well.

The higher layer 1101 generates the information data and the control information that are transmitted to the terminal device 1200-1. Included in the control information is the transmission parameter (SS106 in FIG. 18) of the downlink signal that is transmitted to the terminal device 1200-1. The higher layer 1101 determines the downlink transmission parameters from the base station device 1100-1 to the terminal device 1200-1 (the MCS, the rank, the scheduling, the port number, and the transmission mode (the precoding, the transmission diversity, or the like)), considering the terminal capability information, the channel quality information report, the neighboring-cell control information and the like that are included in the control channel which is output by the report information detection module 1132 (SS106 in FIG. 18). Furthermore, the control information (the assistance control information) of the neighboring base station device 1100-2 is included in the control information.

The MCS is a modulation and coding scheme that is performed on information data that is transmitted by the base station device 1100-1 to each terminal device. Data modulation processing, for example, are Binary Phase Shift Keying (BPSK), Quadrature Phase Shift Keying (QPSK), M-Quadrature Amplitude Modulation (M-QAM) (for example, M=16, 64, 256, 1024, and 4096), and the like. In an error correction code, the data modulation processing is a coding rate of the error correction code.

The rank is the number of spatial multiplexes that are performed on a signal that is transmitted by the base station device 1100-1 to each terminal device. In a case where the higher layer 1101 is transmitted to multiple terminal devices in the state of being spatially multiplexed (MU-MIMO), when a terminal device that is notified that the interference suppression function is retained is included among the multiple terminals, it is desirable that the rank of a signal that is transmitted to the terminal device that is notified that the interference suppression function is retained is set to be an upper limit and the number of spatial multiplexes that are performed by each terminal device is determined.

The port number indicates from which antenna port the base station device 1100-1 transmits a transmission signal to each terminal device.

The higher layer 1101 determines a resource onto which to map a downlink data signal channel, a control channel, a reference signal, and the like that are transmitted to each terminal device, as the scheduling. The resource is an allocation unit that is defined by time and frequency. For example, in 3GPP, there are a resource element that is defined by 1 OFDM symbol and 1 subcarrier, a resource block that is defined by 14 OFDM symbols and 12 subcarriers, and the like. Furthermore, the resource block is a minimum unit of user arrangement.

The coding modules 1102-1 to 1102-S perform error correction coding on information data that is input from the higher layer 1101, and generates coded bits (referred to as a codeword). Furthermore, the information data, for example, includes a voice signal that is involved in a telephone call, a signal of a static image or of a moving image signal that is captured, a text message, and the like. Coding schemes, which are used by the coding modules 1102-1 to 1102-S when performing the error correction coding, for example, Turbo Coding, Convolutional Coding, Low Density Parity Check Coding (LDPC), and the like.

Moreover, the coding modules 1102-1 to 1102-S may perform rate matching processing on a sequence of coded bits in order to match a coding rate of a sequence of pieces of coded data on which the error correction coding is performed to a coding rate corresponding to a data transmission rate. Furthermore, the coding module 1102-1 to 1102-S may have a function of rearranging and interleaving the data sequence on which the error correction encoding is performed. Furthermore, the error correction coding is performed on a coding rate of the MCS.

The scramble modules 1103-1 to 1103-S perform scrambling on codewords that are input from the coding modules 1102-1 to 1102-S, based on the cell ID of the base station device. Moreover, information relating to a scramble pattern can be assuredly included in the control information.

The modulation modules 1104-1 to 1104-S map a post-scrambling codeword that is input onto the data modulation symbol. Moreover, the data modulation processing is performed based on modulation levels of the MCS. Moreover, the modulation modules 1104-1 to 1104-S may have a function of rearranging and interleaving a generated modulation symbol. Information relating to this interleave pattern can be assuredly included in the control information.

The layer mapping module 1105 performs layer mapping in order to spatially multiplex data modulation symbols that are input from the modulation modules 1104-1 to 1104-S. The number of layer mapping operations depends on a rank of each terminal device, which is determined by the higher layer 1101. For example, in LTE and the like, up to a maximum of 8 layers is supported, but one codeword is mapped onto a maximum of 4 layers.

The reference signal generation module 1107 generates a reference signal, and outputs the reference signal for performing the precoding to the precoding module 1106. The reference signal for performing the precoding, for example, is a Demodulation Reference Signal (DM-RS). Furthermore, the reference signal generation module 1107 outputs the reference signal that is not precoded to the resource mapping modules 1109-1 to 1109-T. The reference signal that is not precoded, for example, is a Cell Specific Reference Signal (CRS) or a measurement reference signal (CSI-Reference Signal (CSI-RS)).

The precoding module 1106 multiples an output of the layer mapping module 1106 by the precoding matrix determined by the higher layer 1101, and generates a signal of each transmit antenna port. The precoding matrix can be determined for every terminal device.

Moreover, the base station device 1100-1 can omit the precoding. In this case, the output of the layer mapping module 1106 is input directly into the resource mapping modules 1109-1 to 1109-T.

The control signal generation module 1108 generates the control channel that is transmitted to each terminal device, using the control information that is input from the higher layer 1101. As the control channel, for example, a Physical Downlink Control Channel (PDCCH), an Enhance Physical Downlink Control Channel (EPDCCH), a Radio Resource Control (RRC) signaling, and the like can be used. The RRC signaling is a control signal of an L3 layer control signal that is included in a PBCH and a PDSCH. Because the RRC signal can transmit a large amount of information and is resistant to an error when compared with the PDCCH, the RRC signaling is signaling that is not frequently transmitted. Furthermore, the control signal generation module 1108 generates a synchronization signal and a broadcast channel.

The control signal generation module 1108 generates a control channel that includes the demodulation control information. Furthermore, the control signal generation module 1108 generates a control channel that includes the assistance control information.

The resource mapping modules 1109-1 to 1109-T map an output of the precoding module 106, a reference signal, a control channel, and the like onto a resource according to the scheduling. The resource mapping modules 1109-1 to 1109-T are categorized by the terminal device, transmission to which is performed by the base station device 1100-1.

Furthermore, the resource mapping modules 1109-1 to 1109-T can map the reference signal onto a resource that is determined based on the port number information.

Inverse Fast Fourier Transform (IFFT) and insertion of Cyclic Prefix (CP) are performed on outputs of the resource mapping modules 1109-1 to 1109-T in Orthogonal Frequency Division Multiplexing (OFDM) signal generation modules 1110-1 to 1110-T, digital and analog conversion, filtering, frequency conversion, and the like are performed on the outputs in the transmission modules 1111-1 to 1111-T, and the outputs are transmitted from transmit antennas 1112-1 to 1112-T.

Moreover, the base station device 1100-2 can have the same configuration. In the base station device 1100-2, the link data signal channel, the control channel, the reference signal, and the like are mapped on the scheduling that is based on the transmission frame format (for example, FIG. 19) in TDD. Furthermore, the uplink signal and the downlink signal are transmitted at the timing that is based on the transmission frame format.

Figure 21:
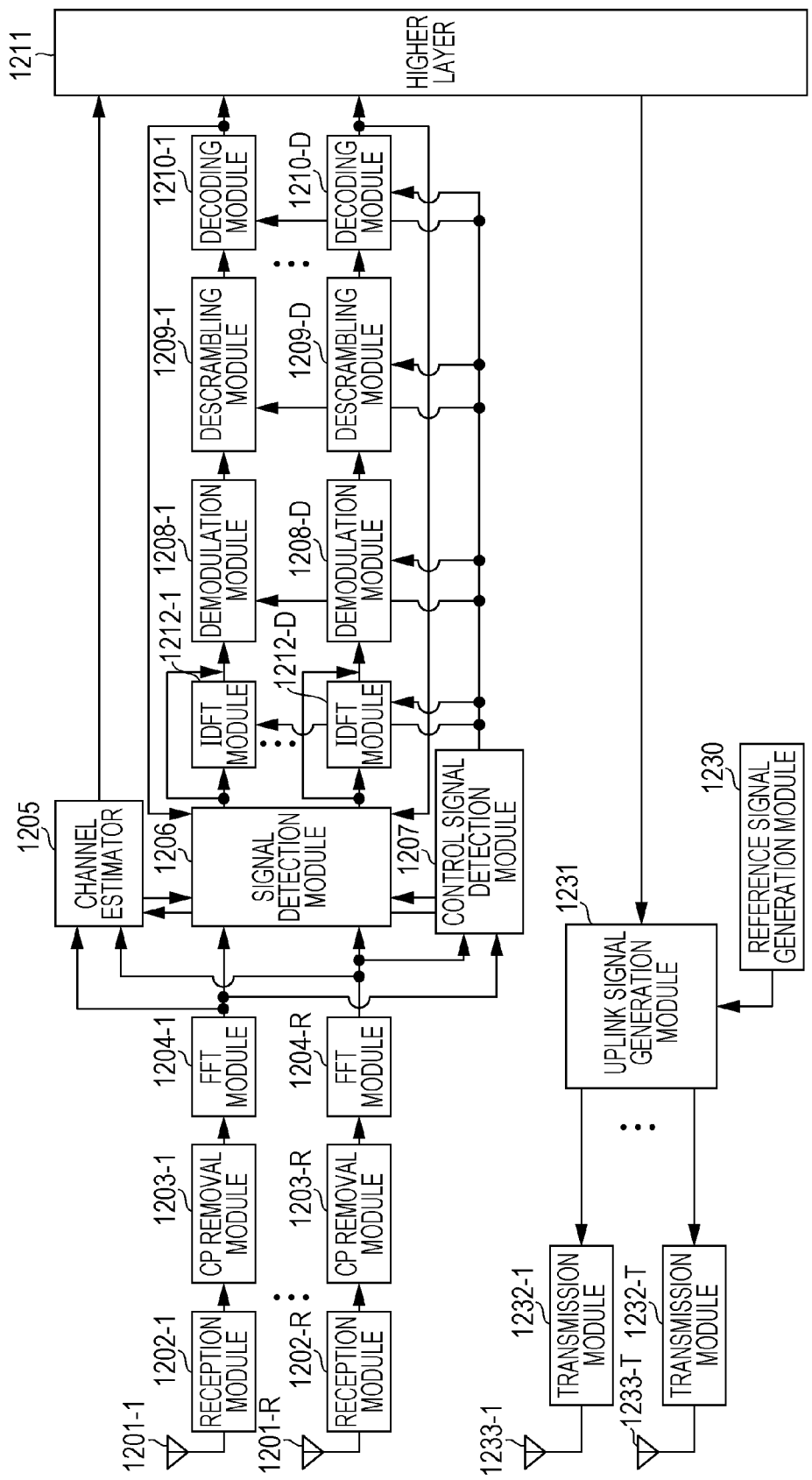
FIG. 21 is a schematic block diagram illustrating a configuration of the terminal device according to the fourth embodiment.

FIG. 21 is a schematic block diagram illustrating a configuration of a configuration of the terminal device 1200-1 according to the present embodiment. The terminal device 1200-1 is a terminal device that has the interference suppression function. The terminal device 1200-1 includes receive antennas 1201-1 to 1201-R, reception modules 1202-1 to 1202-R (a reception step), CP removal modules 1203-1 to 1203-R (a CP removal step), Fast Fourier Transform (FFT) modules 1204-1 to 1204-R (a FFT step), a channel estimator 1205 (a channel estimation step), a signal detection module 1206 (a signal detection step), a control signal detection module 1207 (a control signal detection step), demodulation modules 1208-1 to 1208-D (a demodulation step), descrambling modules 1209-1 to 1209-D (a descrambling step), decoding modules 1210-1 to 1210-D (a decoding step), IDFT modules 1212-1 to 1212-D, a higher layer 1211 (a higher layer step), a reference signal generation module 1230 (a reference signal generation step), an uplink signal generation module 1231 (an uplink signal generation step), transmission modules 1232-1 to 1232-T (a transmission step), and transmit antennas 1233-1 to 1233-T. Furthermore, in a case where one portion or all portions of the terminal device 1200-1 are integrated, as chips, into an integrated circuit, a chip control circuit (not illustrated) is retained that performs control on each functional block. Moreover, R indicates the number of receive antennas. Furthermore, the number of transmit antennas is set to be T, and is set to be the same as that of the base station device 1100-1, but the present invention is not limited to this and the number of antennas of the terminal device and the number of antennas of the base station device may be different from each other. However, D is the number of streams of a sum of the number of spatial multiplexes that are performed on a signal destined for the terminal device 1200-1 and the number of spatial multiplexes that are performed on an interference signal. For example, in FIGS. 16 and 17, a sum of the number of sequences (the number of spatial multiplexes) of an output of a layer mapping module 1105 of the base station device 1100-1 and the number of sequences of an output of a layer mapping module 1105 of the base station device 1200-1 or the number of spatial multiplexes in the uplink signal generation module 1231 of the terminal device 1200-2 is attained.

The reception modules 1202-1 to 1202-R receive signals that are transmitted by the base station device 1100-1 from the transmit antennas 1112-1 to 1112-T, through the receive antenna module 1201-1 to 1201-R. Furthermore, the reception modules 1202-1 to 1202-R receive the downlink signal that is transmitted by the base station device 100-2, and the uplink signal that is transmitted by the terminal device 1200-2, through the receive antenna modules 1201-1 to 1201-R. That is, for the reception module 1202-1, a signal that is transmitted by the base station device 1100-1 is a desired signal, and the uplink signal and the downlink signal between the base station device 1100-2 and the terminal device 1200-2 are interference signals. The latter signal is intercell interference.

Furthermore, the reception modules 1202-1 to 1202-R perform reception frequency conversion, filtering, analog and digital conversion, and the like on the receive signal. Removal of the cyclic prefix is performed on outputs of the reception modules 1202-1 to 1202-R in the CP removal modules 1203-1 to 1203-R, and time frequency conversion is performed on the outputs in the FFT modules 1204-1 to 1204-R.

The channel estimator 1205 performs the channel estimation by using the reference signals such as the CRS, the CSI-RS, the DM-RS, and the SRS. The channel estimator 1205 calculates the channel estimate of a signal of the base station device 1100-1. Furthermore, the channel estimator 1205 can calculate the channel estimate of the downlink signal that is transmitted by the base station device 1100-2 or the uplink that is transmitted by the terminal device 1200-2. At this point, when performing the estimation, the channel estimator 1205 can use the port number information that is included in the demodulation control information and the assistance control information. Furthermore, when performing the estimation, the channel estimator 1205 can use a duplex scheme and information relating to the transmission frame format information that are included in the assistance control information. Accordingly, while determining whether a reference signal is distinguishably an uplink reference signal or a downlink reference signal, the channel estimator 1205 can know a resource of the reference signal and a code sequence that are used for the channel estimation.

The control signal detection module 1207 extracts the control channel that is included in the signal that is subjected to the time frequency conversion, and acquires the demodulation control information and the assistance control information (SS108 in FIG. 18). The control signal detection module 1207 notifies each module of information that is information which is included in the demodulation control information and the assistance control information and that is required for realizing a function of each module that makes up the terminal device 1200-1. For example, the control signal detection module 1207 extracts the information that is included in the assistance control information and that relates to the transmission frame format of the base station device in a neighboring cell, and inputs the extracted information into the signal detection module 1206. Accordingly, because the receive signal replica can be generated in compliance with the modulation schemes, the transmission schemes, and the like of the uplink signal and the downlink signal between the base station device 1100-2 and the terminal device 1200-2, (which will be described in detail below), the signal detection module 206 can suitably cancel the interference in compliance with the transmission scheme for a neighboring cell. Furthermore, the control signal detection module 1207 extracts the information that is included in the assistance control information and that relates to the transmission frame format of the base station device in a neighboring cell, and inputs the extracted information into the IDFT modules 1212-1 to 1212-S. Accordingly, because the IDFT modules 1212-1 to 1212-S determines whether or not it is required to perform IDFT processing in compliance with the transmission schemes of the uplink signal and the downlink signal between the base station device 1100-2 and the terminal device 1200-2, the IDFT modules 1212-1 to 1212-S can suitably cancel the interference in accordance with the transmission scheme for the neighboring cell.

Information relating to the transmission frame format that is output by the control signal detection module 1207 can be set to be a transmission frame format number. Accordingly, the signal detection module 1206 can recognize an uplink signal allocation resource of and a downlink signal allocation resource of transmission frame from the transmission frame format number.

Furthermore, the information relating to the transmission frame format that is output by the control signal detection module 1207 can be set to be the bitmap of the transmission frame format. Accordingly, the signal detection module 1206 can recognize the uplink signal allocation resource of and the downlink signal allocation resource of the transmission frame from the bitmap itself.

Furthermore, accordingly, the signal detection module 1206 can recognize the uplink signal allocation resource of and the downlink signal allocation resource of the transmission frame from the bitmap itself.

The information relating to the transmission frame format can be set to be information relating to information relating to the uplink signal or information relating to the downlink signal, in the transmission frame format. Accordingly, the signal detection module 1206 can recognize the uplink signal allocation resource of and the downlink signal allocation resource of the transmission frame.

The signal detection module 1206 detects the data signal channel and the control channel that are transmitted to the terminal device 1200-1. Furthermore, the signal detection module 1206 detects the data signal channel and the control channel that are transmitted to other than the terminal device 1200-1. At this point, when performing the detection, the signal detection module 1206 can use information indicating the transmission frame format that is output by the control signal detection module 1207. When performing the detection, the signal detection module 1206 can use the information indicating the transmission frame format of the base station device 1100-1, which is included in the broadcast channel. Furthermore, when performing the detection, the signal detection module 1206 can use the channel estimate, the demodulation control information, and the information indicating the rank that is included in the assistance control information. Furthermore, when performing the detection, the signal detection module 1206 can use the demodulation control information and transmission mode information that is included in the assistance control information. Furthermore, when performing the detection, the signal detection module 1206 can use the demodulation control information and the scheduling information that is included in the assistance control information. Furthermore, the signal detection module 1206 can use results of the decoding which are fed back from the decoding modules 1210-1 to 1210-D, for the signal detection.

In a case where a signal that is input from the signal detection module 1206 is a signal that went through DFT-Spread OFDM (Single Carrier-FDMA), the IDFT modules 1212-1 to 1212-D perform the IDFT processing on the signal. On the other hand, in a case where the signal that is input from the signal detection module 1206, for example, is a signal on which the OFDMA is performed, an output signal of the signal detection module 1206 is input directly into the demodulation modules 1208-1 to 1208-D without going through the IDFT processing.

When performing the detection, the IDFT modules 1212-1 to 1212-S can use the information indicating the transmission frame format that is output by the control signal detection module 207. For example, in a case where the uplink signal is a signal that went through the DFT-Spread OFDM, it is determined whether or not the uplink signal is from the information indicating the transmission frame format, and it is determined whether or not the IDFT processing is performed.

In a case where the signal that is output from the signal detection module 1206 is a signal that is destined for the terminal device 1200-1, or is a downlink signal that is destined for other than the terminal device 1200-1, the signal that is output from the signal detection module 1206 skips the IDFT processing operations in the IDFT modules 1212-1 to 1212-D, and is input into the demodulation modules 1208-1 to 1208-D.

The demodulation modules 1208-1 to 1208-D performs the demodulation processing on the signals that are input from the IDFT modules 1212-1 to 1212-D or on the signal that is input from the signal detection module 206, and calculates a bit logarithm likelihood ratio (a Bit Log Likelihood Ratio (LLR)). When performing the demodulation processing, the demodulation modules 1208-1 to 1208-S can use the demodulation control information and the MCS information that is included in the assistance control information.

The descrambling modules 1209-1 to 1209-D descrambles the codeword on which the scrambling is performed in the base station device, and calculates a bit logarithm likelihood ratio of a codeword. The descrambling modules 1209-1 to 1209-S can the demodulation control information and the assistance control information.

The decoding modules 1210-1 to 1210-D perform the error correction decoding on the bit logarithm likelihood ratio of the codeword (the post-decoding bit logarithm likelihood ratio), calculates post-decoding bit logarithm likelihood ratios of information data and various pieces of control data (a terminal capability information request, requests for notification of the channel quality information and like, and the like) that are transmitted to the terminal device 1200-1, and outputs a result of the calculation to the higher layer 1211. Moreover, the higher layer 1211 can notify each module of the control information (the MCS information or the like to the terminal device 1200-1 and a different terminal device) for performing the demodulation processing, the descrambling, and the decoding processing. At this point, when performing the demodulation processing, the demodulation modules 1210-1 to 1210-S can use the demodulation control information and the MCS information that is included in the assistance control information.

Furthermore, the decoding modules 1210-1 to 1210-D performs the error correction decoding on the bit logarithm likelihood ratio (the post-demodulation bit logarithm likelihood ratio) of the codeword, and calculates the post-decoding bit logarithm likelihood ratios of the information data and the various pieces of control data that are transmitted to other than the terminal device 1200-1. Then, the decoding modules 1210-1 to 1210-D can feed back the post-decoding bit logarithm likelihood ratio for the terminal device 1200-1 or for other than the terminal device 1200-1, to the signal detection module 206. Furthermore, the decoding modules 1210-1 to 1210-D may output a sequence of bits that results from performing hard judgment on the post-decoding bit logarithm likelihood ratio, to the higher layer 1211 or the signal detection module 1206.

In response to the terminal capability information request, the higher layer 1211 outputs the terminal capability information of the terminal device 1200-1, to the uplink signal generation module 1231. In response to the request for the notification of the channel quality information and the like, the higher layer 1211 outputs the channel quality information and the like to the uplink signal generation module 1231. Furthermore, the higher layer 1211 acquires information data that is output by the decoding modules 1210-1 to 1210-S.

The terminal device 1200-1 has a function of transmitting a signal as well. The reference signal generation module 1230 generates the uplink reference signal. The uplink signal generation module 1231 generates the uplink signal that includes the terminal capability information, the channel quality information, and the like. The uplink signal is modulated in compliance with a transmission scheme (for example, a signal that is configured from SC-FDMA symbols or OFDM symbols) of the communication system. The digital and analog conversion, the filtering, the frequency conversion, and the like are performed on an output of the uplink signal generation module 1231 in the transmission modules 1232-1 to 1232-T, and the output is transmitted from the transmit antennas 1233-1 to 1233-T.

Figure 22:
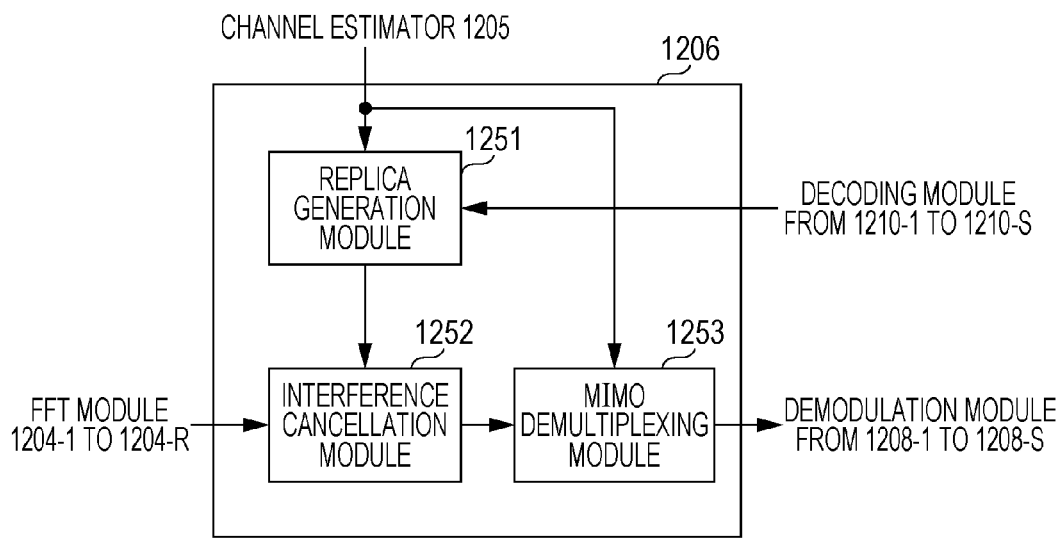
FIG. 22 is one example of a schematic block diagram illustrating a configuration of a signal detection module according to the fourth embodiment.

FIG. 22 is one example of a schematic block diagram illustrating a configuration of the signal detection module 1206 according to the present embodiment. The signal detection module 1206 in FIG. 22 is a block in a case where the Successive Interference Cancellation (SIC) is included as an interference cancellation function. The signal detection module 1206 is configured from a replica generation module 1251 (a replica generation step), an interference cancellation module 1252 (an interference cancellation step), and a MIMO demultiplexing module 1253 (a MIMO demultiplexing step).

The replica generation module 1251 generates the receive signal replica by using the channel estimate that is input from the channel estimator 1205, and the LLRs that are input from the decoding modules 1210-1 to 1210-S. As the receive signal replica, there is a replica of a signal that is interference for the terminal device 1200-1, among signals that are received by the terminal device 1200-1. For example, in FIG. 16, a signal rr12-$u$ that is transmitted by the terminal device 1200-2 corresponds to the receive signal replica. For example, in FIG. 17, a signal rr22-$d$ that is transmitted by the terminal device 1100-2 corresponds to the receive signal replica. The interference cancellation module 1252 subtracts the receive signal replica from the signal that is input from the FFT modules 1204-1 to 1204-R, and outputs a result of the subtraction to demodulation modules 1208-1 to 1208-S. Moreover, in a case where a MIMO signal is received, the replica generation module 1251 can include a replica for cancelling inter-antenna interference in the receive signal replica.

At this point, a signal R(k) in a k-th subcarrier that is input into the signal detection module 1206 of the terminal device 1200-1 is expressed as the following equations. However, for D, for example, in FIGS. 16 and 17, a sum of the number of sequences (the number of spatial multiplexes) of an output S(k) of a layer mapping module 1105 of the base station device 1100-1 and the number of sequences of an output S(k) of a layer mapping module 1105 of the base station device 1200-1 or the number of spatial multiplexes in the uplink signal generation module 1231 of the terminal device 1200-2 is attained. Furthermore, a matrix H is an equivalent channel matrix including the precoding. Furthermore, for a signal that is included in the receive signal and that went through the DFT-Spread OFDM, a matrix H is an equivalent channel matrix including the IDFT processing. Furthermore, N(k) is noise, and T indicates a transposed matrix.

[Math 13]

$$R(k) = H(k)S(k) + N(k) \qquad (13)$$

[Math 14]

$$R(k) = [R_1(k) \ \ldots \ R_R(k)]^T \qquad (14)$$

[Math 15]

$$H(k) = \begin{pmatrix} H_{11}(k) & \ldots & H_{1D}(k) \\ \vdots & \ddots & \vdots \\ H_{R1}(k) & \ldots & H_{RD}(k) \end{pmatrix} \qquad (15)$$

[Math 16]

$$S(k) = [S_1(k) \ \ldots \ S_D(k)]^T \qquad (16)$$

[Math 17]

$$N(k) = [N_1(k) \ \ldots \ N_R(k)]^T \qquad (17)$$

The interference cancellation module 1252 subtracts the receive signal replica (the stream replica) that is generated in the replica generation module 1251, from an output signal of the FFT module. At the time of the i-th repeating processing, for an output signal of the interference cancellation module that results when subtracting an n-th stream (n is 1 and so forth up to D), $\tilde{R}_{n,i}(k)$ is expressed as the following equation.

[Math 18]

$$\tilde{R}_{n,i}(k) = R(k) - \hat{R}_{n,i}(k) \qquad (18)$$

where R(k) indicates an FFT output, $\hat{R}_{n,i}(k)$ indicates a receive signal replica of a stream, which is removed n-th time in i-th repeating processing, and k indicates a subcarrier index. Moreover, $\hat{R}_{1,0}(k)=0$ is retained.

The interference replica $\hat{R}_{n,i}(k)$ is generated using the data modulation symbol replica that is generated using the LLRs which are output by the decoding modules 1210-1 to 1210-S, and the channel estimate that is estimated by the channel estimator 1205. For example, in a case where the signal detection of the n-th stream is performed, receive signal replicas of a stream 1 to a stream (n−1) and of a stream (n+1) to a stream D are generated. More specifically, at the time of the i-th repeating processing, the interference replica is generated using symbol replicas of the stream 1 to the stream (n−1) that are generated in the i-th repeating processing, symbol replicas of the stream (n+1) to the stream D that are generated in (i−1)-th repeating processing, and the channel estimate. At the time of the i-th repeating processing, for the output signal for the n-th stream, of the reception replica generation module, $\hat{R}_{n,i}(k)$ is expressed as the following equation.

[Math 19]

$$\hat{R}_{n,i}(k) = \left( \sum_{u=1}^{n-1} H_u(k)\hat{S}_{u,i}(k) + \sum_{u=n+1}^{D} H_u(k)\hat{S}_{u,i-1}(k) \right) \qquad (19)$$

where, $H_u(k)$ is a channel estimate of a stream u, and $\hat{S}_{u,i}(k)$ is a modulation symbol replica that is generated in the i-th repeating processing for the streams u. Moreover, in a case where i=0 (first time processing), the receive signal replica is generated from only the symbol replicas of the stream 1 to the stream (n−1) that are already generated with 0-th repeating processing and from the channel estimate.

Figure 23:
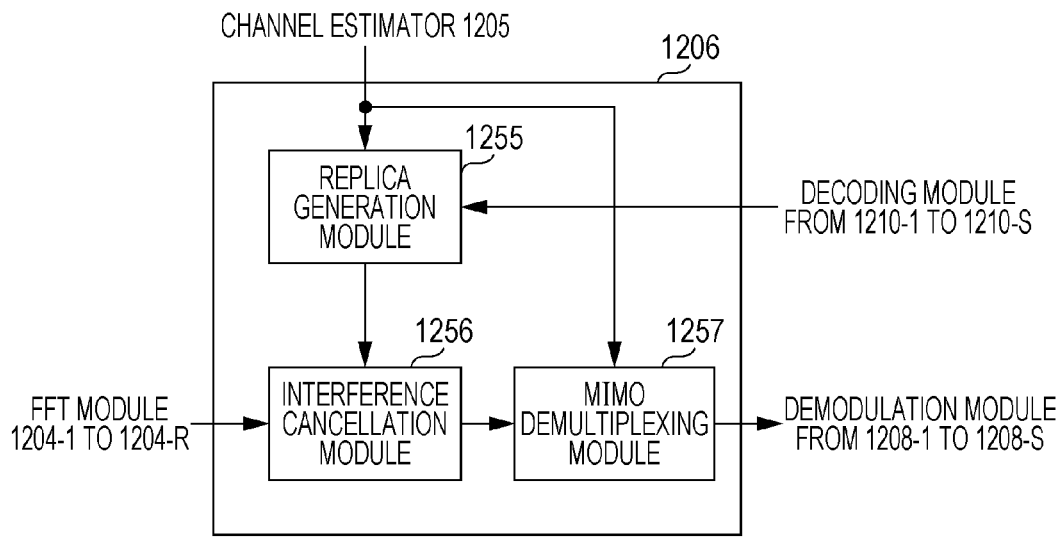
FIG. 23 is one example of a schematic block diagram illustrating a configuration of a replica generation module according to the fourth embodiment.

FIG. 23 is one example of a schematic block diagram illustrating a configuration of the replica generation module 1251 according to the present embodiment. The replica generation module 1251 includes scrambling modules 1271-1 to 1271-D (a scramble step), symbol replica generation modules 1272-1 to 1272-D (a symbol replica generation step), a layer mapping module 1273 (a layer mapping step), precoding modules 1274-1 to 1274-U (a precoding step), an uplink replica generation module 1275 (an uplink replica generation step), and a downlink replica generation module 1276 (a downlink replica generation step). Furthermore, in a case where one portion or all portions of the replica generation module 1251 are integrated into an integrated circuit, a chip control circuit (not illustrated) is retained that performs control on each functional block.

The scrambling modules 1271-1 to 1271-D perform the scrambling that is based on a cell ID of each base station device, on outputs of the decoding modules 1210-1 to 1210-D.

The symbol replica generation modules 1272-1 to 1272-D generate the data modulation symbol replica that results from the QPSK modulation, the 16 QAM modulation, and the like, using outputs from the scrambling modules 1271-1 to 1271-D. Processing by a modulation symbol replica generation module is described using the QPSK modulation as an example. When LLRs for bits that construct a QPSK modulation symbol are set to be λ(b0) and λ(b1), a replica of a QPSK modulation symbol is expressed as the following equation.

[Math 20]

$$\frac{1}{\sqrt{2}}\tanh(\lambda(b_0)/2) + \frac{j}{\sqrt{2}}\tanh(\lambda(b_1)/2) \qquad (20)$$

Where j indicates an imaginary number. Moreover, also with other modulation schemes such as 16 QAM, it is possible to generate the symbol replica in the same manner. Furthermore, in a case where a hard-judgment bit string is input, the replica that is generated by performing the error correction coding or the modulation can be used in the same manner as in the processing that is performed in the base station device.

The layer mapping module 1273 performs the layer mapping in order to spatially multiplex data modulation symbols that are input from the symbol replica generation modules 1272-1 to 1272-D. The number of layer mapping operations depends on a rank of each terminal device, which is determined by the higher layer 1101.

The precoding modules 1274-1 to 1274-U multiplies an output of the layer mapping module 1273 by the precoding matrix that is based on the precoding which is performed on a signal destined for the terminal device 1200-1, and for other than the terminal device 1200-1, and generates a signal of each transmit antenna port. U is the number of users. In a case of FIG. 16 or 17, U=2 is attained. For example, in the case of FIG. 16 or 17, the precoding modules 1274-1 to 1274-U performs multiplication by the precoding matrix that is based on the precoding which is performed by the base station device 1100-1 and the base station device 1100-2 or the terminal device 1200-2, and generates a signal of each transmit antenna port. Moreover, in the channel estimation, in a case where the equivalent channel that includes the precoding is estimated (for example, in a case where the channel estimation is performed using DMRS), the processing that performs the multiplication by the precoding matrix can be omitted.

The uplink replica generation module 1275 (a first receive signal replica generation module) generates the receive signal replica of an uplink signal from what is about the uplink signal and from the channel estimate that is output from the channel estimator 1205, among output signals of the precoding modules 1274-1 to 1274-U. For example, the uplink signal ($rr12$-$u$) that is transmitted by the terminal device 1200-2 in FIG. 16 is generated. In this case, the channel estimate (a matrix H) is an equivalent channel matrix including the IDFT processing.

The downlink replica generation module 1276 (a second receive signal replica generation module) generates the receive signal replica of the uplink signal from what is about the downlink signal and from the channel estimate that is output from the channel estimator 1205, among the output signals of the precoding modules 1274-1 to 1274-U. For example, the downlink signal ($rr11$-$d$) that is transmitted by the base station device 1100-1, and the downlink signal ($rr22$-$d$) that is transmitted by the base station device 1100-2 in FIG. 17 are generated.

Referring back to FIG. 22, the MIMO demultiplexing module 1253 performs demultiplexing of a stream of a signal that results from performing spatial multiplexing (MIMO) on an output of the interference cancellation module 1252, using the channel estimate that is an output of the channel estimator 1205. For the demultiplexing method, a method of reproducing a data signal of a stream, for example, with Maximum Likelihood Detection (MLD), can be applied. Furthermore, the demultiplexing method can be used such as calculating MMSE weight for the output of the interference cancellation module 1252 and then multiplying the output of the interference cancellation module 1252 by the calculated weight.

For example, the MIMO demultiplexing module 1253 can demultiplex the stream by multiplying the output signal that results after the interference cancellation module 1252 subtracts the n-th stream, by weight coefficients WZF, n(k), WMMSE, and n(k) that are based on a ZF reference and an MMSE reference. The following equations can be used.

[Math 21]

$$W_{ZF,n}(k) = H_n^H(k)(H_n(k)H_n^H(k))^{-1} \quad (21)$$

[Math 22]

$$W_{MMSE,n}(k) = H_n^H(k)(H_n(k)H_n^H(k) + \sigma_2 I_R)^{-1} \quad (22)$$

where H indicates complex conjugate transposition of a matrix, −1 indicates an inverse matrix, σ2 indicates distribution of interference cancellation residual and noise, and IR indicates a R×R unit matrix. Furthermore, $H_n(k)$ in a case of the first time processing (i=0) in the repeating successive interference cancellation is expressed as the following equation.

[Math 23]

$$H_n(k) = \begin{pmatrix} H_{1n}(k) & \cdots & H_{1D}(k) \\ \vdots & \ddots & \vdots \\ H_{Rn}(k) & \cdots & H_{RD}(k) \end{pmatrix} \quad (23)$$

$H_n(k)$ in a case of the repeating processing (i>0) in the repeating successive interference cancellation is expressed as the following equation.

[Math 24]

$$H_n(k) = \begin{pmatrix} H_{1n} \\ \vdots \\ H_{Rn} \end{pmatrix} \quad (24)$$

Figure 24:
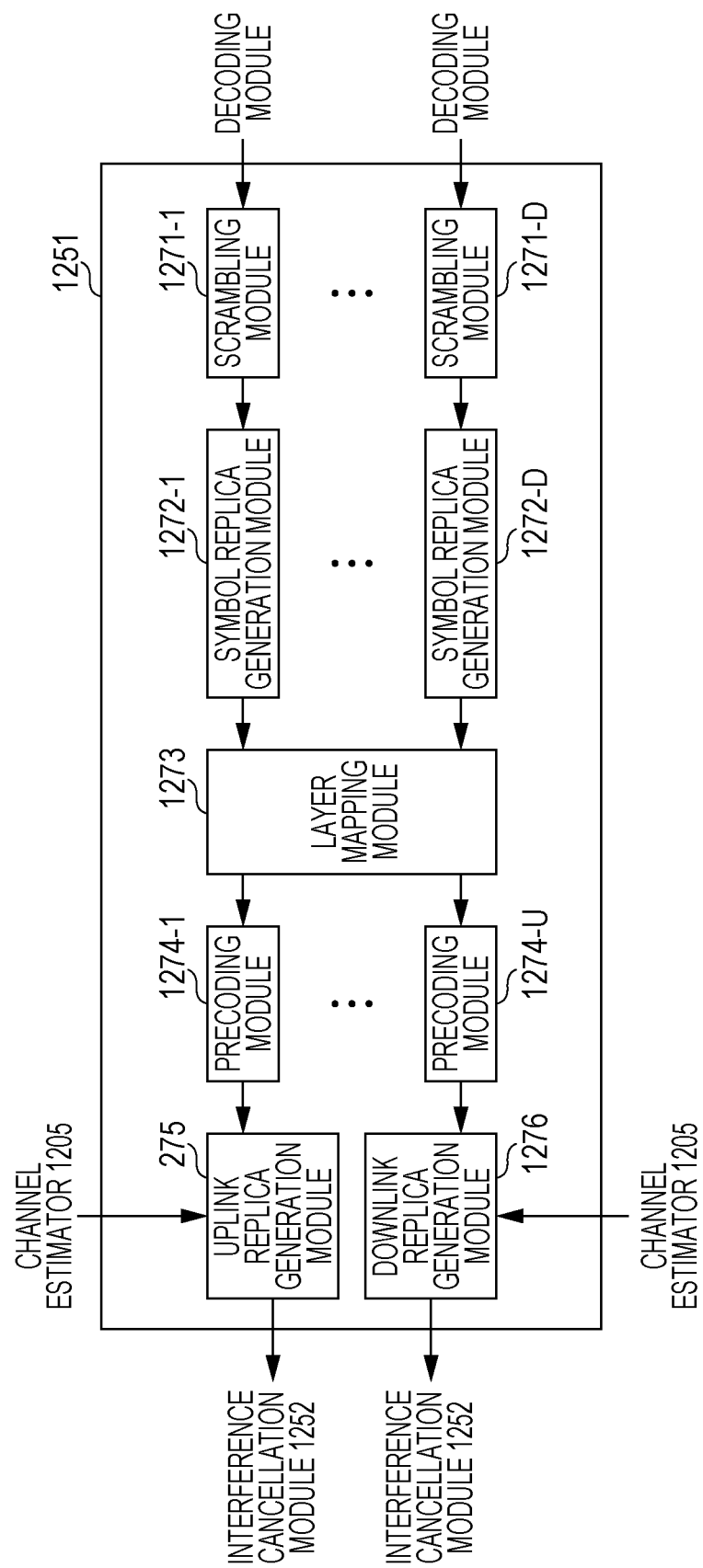
FIG. 24 is one example of another schematic block diagram illustrating a configuration of the signal detection module according to the fourth embodiment.

FIG. 24 is one example of another schematic block diagram illustrating a configuration of the signal detection module 1206 according to the present embodiment. The signal detection module 1206 in FIG. 24 is configured from a replica generation module 255, an interference cancellation module 1256, and a MIMO demultiplexing module 1257. Modules each of which has different processing from that in FIG. 7 will be described below in a focused manner. FIG. 24 illustrates an example in which MMSE-Interference Rejection Combining (MMSE-IRC) and successive interference cancellation are used.

NUE is set to be the number of terminal devices, and m is set to be an index of the detection-target terminal device. A matrix H(k) in Equation (3) and a matrix S(k) in Equation (4) are defined as the following equations.

[Math 25]

$$H(k) = \begin{pmatrix} H_{11}(k) & \cdots & H_{1D}(k) \\ \vdots & \ddots & \vdots \\ H_{R1}(k) & \cdots & H_{RD}(k) \end{pmatrix} = (H_1(k) \ \ldots \ H_m(k) \ \ldots \ H_{NUE}(k)) \quad (25)$$

[Math 26]

$$S(k) = [S_1(k) \ \ldots \ S_m(k) \ \ldots \ S_{NUE}(k)]^T \quad (26)$$

where a matrix $H_m(k)$ is an equivalent channel matrix including the precoding in a k-th subcarrier of a terminal device 1200-$m$. Furthermore, $S_m(k)$ is a desired signal in the k-th subcarrier of the terminal device 1200-$m$.

A replica generation module 1255 generates the receive signal replica by using the channel estimate that is input from the channel estimator 1205, and the LLRs or the hard-judgment bits that are input from the decoding modules 1210-1 to 1210-D.

The interference cancellation module 1256 subtracts the receive signal replica that is generated in the replica generation module 1255, from the output signal of the FFT module.

The MIMO demultiplexing module 1257 calculates reception weight WIRC,m(k) using H(k) that is input from the channel estimator 1205. For example, the following equation is used.

[Math 27]

$$W_{IRC,m}(k) = H_m^H(k)\left(H_m(k)H_m^H(k) + \sum_{\substack{p \neq m \\ p \in A}} H_p(k)H_p^H(k) + R_{ICI}\right)^{-1} \quad (27)$$

where a matrix RICI is a covariance matrix of non-target interference (including the intercell interference and also the interference cancellation residual) and of noise, and A is a set of indexes of the terminal devices that are targets for detection and are not detected.

Furthermore, the MIMO demultiplexing module 1257 multiplies R(k) that is input into the signal detection module 1206, by the reception weight $W_{IRC,m}(k)$, and estimates $S_m(k)$.

At this point, a flow of processing operations in FIG. 24 in a system of the terminal device is described. For example, in the terminal device 1200-1, in a case where $S1(k)$ is detected as a desired signal, the signal detection module 1206 in FIG. 24 performs the following processing.

In the first time processing (i=0), the interference cancellation module 1256 does not perform interference cancellation. The MIMO demultiplexing module 1257 estimates $S3(k)$, and outputs $S3(k)$ to the demodulation modules 1208-1 to 1208-D. Thereafter, $S3(k)$ is demodulated and decoded. The replica generation module 1255 generates the receive signal replica relating to $S3(k)$ using the LLRs or the hard-judgment bit strings that are input from the coding modules 1210-1 to 1210-D.

When i=1, the interference cancellation module 1256 subtracts the receive signal replica relating to $S3(k)$ that is input from the replica generation module 1255, from the output signal of the FFT module. A MIMO detection module 1257 estimates $S2(k)$ from the output signal of the interference cancellation module 1256.

In the last time processing (i=2), the interference cancellation module 1256 subtracts the receive signal replica relating to $S3(k)$ that is input from the replica generation module 255, starting from R(k), and the receive signal replica relating to $S2(k)$, from the output signal of the FFT module. The MIMO demultiplexing module 1257 estimates $S1(k)$ from the output signal of the interference cancellation module 1256.

In this manner, in processing other than the last time processing, the signal detection module 1206 in FIG. 24 sequentially subtracts an interference component relating to the terminal device 1200-*m* from the receive signal. Furthermore, in the last time processing, a desired signal that results from subtracting all interference signals from the receive signal is estimated. Moreover, according to the present embodiment, the interference components are subtracted in this order: $S3(k)$, $S2(k)$, but the order is not limited to this. The interference components may be subtracted in this order: $S2(k)$, $S3(k)$.

Moreover, the equation described above is one example of the interference cancellation, and the present invention can be applied to the terminal device to which the interference cancellation is applied, without depending on a type of interference cancellation and a method of calculating weight.

As described above, in the communication system according to the present embodiment, the terminal device is notified of information relating to the transmission frame format for a neighboring cell. Therefore, the terminal device can suppress the intercell interference by using the information relating to the transmission frame format. Accordingly, in the communication system in which different duplex schemes are present, the inter-user interference can be suppressed, and the spectral efficiency can be improved.

(Fifth Embodiment)

According to the present embodiment, in some cases, the base station device that uses TDD is present as a neighboring base station device. For example, FIGS. 16 and 17 illustrate a case where with TDD, the base station device 1100-1 and the base station device 1100-2 together connect to the terminal device 1200-1 and the terminal device 1200-2. The base station device 1100-1 and the base station device 1100-2 can use the transmission frame format in TDD, in which ratios between a resource to which the uplink signal is allocated and a resource to which the downlink signal is allocated are different (for example, a transmission format number (1) in FIG. 19 is applied to the base station device 1100-1, and a transmission format number (3) in FIG. 19 is applied to the base station device 1100-2. What distinguishes the fifth embodiment from the fourth embodiment will be described below in a focused manner.

According to the present embodiment, in SS101 in FIG. 18, the base station device 1100-1 can include the information relating to the transmission frame format in a broadcast channel. The base station device 1100-1 can set the information relating to the transmission frame format to be the transmission frame format number in FIG. 19. The base station device 1100-2 can set the information relating to the transmission frame format to be the bitmap of the transmission frame format in FIG. 19.

According to the present embodiment, in SS106 and SS107 in FIG. 18, the base station device 1100-1 can include the information (the assistance control information) relating to the neighboring base station device 1100-2 in the control channel. The base station device 1100-1 can include the information relating to the transmission frame format of the neighboring base station device 1100-2 in the assistance control information. The base station device 1100-1 can set the information relating to the transmission frame format to be the transmission frame format number of the neighboring base station device 1100-2. The base station device 1100-1 can set the information relating to the transmission frame format to be a difference between the transmission frame format number of the base station device 1100-1 and the transmission frame format number of the neighboring base station device 100-2.

The base station device 1100-1 can set the information relating to the transmission frame format to be the bitmap of the transmission frame format. The base station device 1100-1 can set the bitmap to be information on whether a subframe that constructs the transmission frame format is allocated to the uplink or is allocated to the downlink. Furthermore, the base station device 1100-1 can set the bitmap to be a difference between the bitmap of the transmission frame format of the base station device 1100-1 and the bitmap of the transmission frame format of the neighboring base station device 1100-2.

Furthermore, the base station device 1100-1 can set the information relating to the transmission frame format to be the information on either of the subframe to which the uplink signal is allocated and the subframe to which the downlink signal is allocated, among the subframes that construct the transmission frame format. Furthermore, the base station device 1100-1 can set the information relating to the transmission frame format to be transmission information (the information on either of the subframe to which the uplink signal is allocated and the subframe to which the downlink signal is allocated) on subframes (for example, the uplink is allocated to the subframe of the transmission frame format of the base station device 1100-1 and the downlink is allocated to the subframe of the transmission frame format of the neighboring base station device) that are different in resource allocation from each other.

According to the present embodiment, in SS108 in FIG. 18, the terminal device 1200-1 detects a data signal that is destined for the terminal device 1200-1, using the demodulation control information that is notified and the assistance control information including the information relating to the transmission frame format.

As described above, According to the present embodiment, in the communication system that is configured from multiple base station devices that use a TDD duplex scheme, the terminal device is notified of the information relating to the transmission frame format for the neighboring cell. Accordingly, the terminal device can suppress the intercell interference and can improve the spectral efficiency, considering that there is a difference in resource allocation.

A program running on a base station device and a mobile station device according to the present invention is a program (a program for causing a computer to perform functions) that controls a CPU and the like in such a manner as to realize the functions according to the embodiment of the present invention. Then, information that is handled in these devices is temporarily stored in a RAM while being processed. Thereafter, the information is stored in various ROMs or HDDs, and whenever required, is read by the CPU to be modified or written. As a recording medium on which to store the program, among a semiconductor (for example, a ROM, a nonvolatile memory card, and the like), an optical storage medium (for example, a DVD, a MO, a MD, a CD, a BD, and the like), a magnetic storage medium (for example, a magnetic tape, a flexible disk, and the like), and the like, any one may be possible. Furthermore, in some cases, the functions according to the embodiments described above are realized by running the loaded program, and in addition, the functions according to the present invention are realized in conjunction with an operating system or other application programs, based on an instruction from the program.

Furthermore, in a case where programs are distributed on the market, the programs, each of which is stored on a portable recording medium, can be distributed or the program can be transmitted to a server computer that connects through a network such as the Internet. In this case, a storage device of the server computer is also included in the present invention. Furthermore, some of or all of the portions of the mobile station device and the base station device according to the embodiments described above may be realized as an LSI that is a typical integrated circuit. Each functional block of a reception device may be individually built into a chip, and some or all functional blocks may be integrated into a chip. In a case where each functional block is integrated into a circuit, an integrated circuit control module is added that controls these functional blocks.

Furthermore, a technique of the integrated circuit is not limited to an LSI, and an integrated circuit for the functional block may be realized with a dedicated circuit or a general-purpose processor. Furthermore, if with advances in a semiconductor technology, a circuit integration technology with which an LSI is replaced appears, it is also possible to use an integrated circuit to which such a technology is applied.

Moreover, the invention in the present application is not limited to the embodiments described above. Furthermore, application of the terminal device according to the invention in the present application is not limited to the mobile station devices. It goes without saying that the terminal device can be applied to a stationary-type electronic apparatus that is installed indoors or outdoors, or a non-movable-type electronic apparatus, for example, an AV apparatus, a kitchen apparatus, a cleaning or washing machine, an air-conditioning apparatus, office equipment, a vending machine, and other household apparatuses.

The embodiments of the present invention are described in detail above referring to the drawings, but the specific configuration is not limited to the embodiments. A design and the like within a scope not deviating from the gist of the present invention fall within a scope of claims.

INDUSTRIAL APPLICABILITY

The present invention can suitably be used for a terminal device, a base station device, a communication system, a reception method, a transmission method, and a communication method.

REFERENCE SIGNS LIST

100-1, 300-1, 300-2 BASE STATION DEVICE
100-1-1, 100-1-2, 300-1-1, 300-2-2 TRANSMIT ANTENNA GROUP
200-1, 200-2, 400-1, 400-2 TERMINAL DEVICE
101, 301 HIGHER LAYER
102-1 TO 102-S, 302-1 TO 302-S CODING MODULE
103-1 TO 103-S, 303-1 TO 303-S SCRAMBLING MODULE
104-1 TO 104-S, 304-1 TO 304-S MODULATION MODULE
105, 305 LAYER MAPPING MODULE
106, 306 PRECODING MODULE
107, 307 REFERENCE SIGNAL GENERATION MODULE
108, 308 CONTROL SIGNAL GENERATION MODULE
109-1 TO 109-T, 309-1 TO 309-T RESOURCE MAPPING MODULE
110-1 TO 110-T, 310-1 TO 310-T OFDM SIGNAL GENERATION MODULE
111-1 TO 111-T, 311-1 TO 311-T TRANSMISSION MODULE
112-1 TO 112-T, 312-1 TO 312-T TRANSMIT ANTENNA
130-1 TO 130-R, 330-1 TO 330-R RECEIVE ANTENNA
131-1 TO 131-R, 331-1 TO 331-R RECEPTION MODULE
132, 332 REPORT INFORMATION DETECTION MODULE
201-1 TO 201-R, 401-1 TO 401-R RECEIVE ANTENNA
202-1 TO 202-R, 402-1 TO 402-R RECEPTION MODULE
203-1 TO 203-R, 403-1 TO 403-R CP REMOVAL MODULE
204-1 TO 204-R, 404-1 TO 404-R FFT MODULE
205, 405 CHANNEL ESTIMATOR
206, 406 SIGNAL DETECTION MODULE
207, 407 CONTROL SIGNAL DETECTION MODULE
208-1 TO 208-S, 408-1 TO 408-S DEMODULATION MODULE
209-1 TO 209-S, 409-1 TO 409-S DESCRAMBLING MODULE
210-1 TO 210-S, 410-1 TO 410-S DECODING MODULE
211, 411 HIGHER LAYER
230, 430 REFERENCE SIGNAL GENERATION MODULE
231, 431 UPLINK SIGNAL GENERATION MODULE 232-1 TO 232-T, 432-1 TO 432-T TRANSMISSION MODULE
233-1 TO 233-T, 433-1 TO 433-T TRANSMIT ANTENNA
251 REPLICA GENERATION MODULE
252 INTERFERENCE CANCELLATION MODULE
253 MIMO DEMULTIPLEXING MODULE
1100-1, 1100-2 BASE STATION DEVICE
1200-1, 1200-2 TERMINAL DEVICE
1101 HIGHER LAYER
1102-1 TO 1102-S CODING MODULE
1103-1 TO 1103-S SCRAMBLING MODULE
1104-1 TO 1104-S MODULATION MODULE
1105 LAYER MAPPING MODULE
1106 PRECODING MODULE
1107 REFERENCE SIGNAL GENERATION MODULE
1108 CONTROL SIGNAL GENERATION MODULE
1109-1 TO 1109-T RESOURCE MAPPING MODULE
1110-1 TO 1110-T OFDM SIGNAL GENERATION MODULE
1111-1 TO 1111-T TRANSMISSION MODULE
1112-1 TO 1112-T TRANSMIT ANTENNA
1130-1 TO 1130-T RECEIVE ANTENNA
1131-1 TO 1131-R RECEPTION MODULE
1132 REPORT INFORMATION DETECTION MODULE
1201-1 TO 1201-R RECEIVE ANTENNA
1202-1 TO 1202-R RECEPTION MODULE
1203-1 TO 1203-R CP REMOVAL MODULE
1204-1 TO 1204-R FFT MODULE
1205 CHANNEL ESTIMATOR
1206 SIGNAL DETECTION MODULE
1207 CONTROL SIGNAL DETECTION MODULE
1208-1 TO 1208-S DEMODULATION MODULE
1209-1 TO 1209-S DESCRAMBLING MODULE
1210-1 TO 1210-S DECODING MODULE
1211 HIGHER LAYER
1212-1 TO 1212-D IDFT MODULE
1230 REFERENCE SIGNAL GENERATION MODULE
1231 UPLINK SIGNAL GENERATION MODULE
1232-1 TO 1232-T TRANSMISSION MODULE
1233-1 TO 1233-T TRANSMIT ANTENNA
1251, 1255 REPLICA GENERATION MODULE
1252, 1256 INTERFERENCE CANCELLATION MODULE
1253, 1257 MIMO DEMULTIPLEXING MODULE
1271-1 TO 1271-D SCRAMBLING MODULE
1272-1 TO 1272-D SYMBOL REPLICA GENERATION MODULE
1273 LAYER MAPPING MODULE
1274-1 TO 1274-U PRECODING MODULE
1275 UPLINK REPLICA GENERATION MODULE
1276 DOWNLINK REPLICA GENERATION MODULE

The invention claimed is:

1. A base station apparatus, comprising:
reception circuitry; and
transmission circuitry that transmit, to a terminal apparatus, assistance information by using a Physical Downlink Shared Channel (PDSCH) in a first cell; wherein
the assistance information is using to suppress an interference from a second cell;
the second cell is a neighbor cell of the first cell; and
the assistance information includes at least a cell ID of the second cell, information regarding a power ratio between a reference signal and a data signal channel in the second cell, and information regarding a transmission mode in the second cell.

2. The base station apparatus according to claim 1, wherein the assistance information further includes information regarding a power ratio between a first data signal channel and a second data signal channel in the second cell.

3. The base station apparatus according to claim 1, wherein the assistance information includes information that the base station apparatus received from another base station apparatus.

4. The base station apparatus according to claim 1, wherein
the reception circuitry receives User Equipment (UE) capability information from the terminal apparatus; and
the UE capability information includes information that the terminal apparatus has a capability to cancel or suppress an interference.

5. A terminal apparatus comprising:
transmission circuitry; and
reception circuitry that receives, from a base station apparatus, assistance information by using a Physical Downlink Shared CHannel (PDSCH) in a first cell; wherein
the assistance information is used to suppress an interference from a second cell;
the second cell is a neighbor cell of the first cell; and
the assistance information includes at least a cell ID of the second cell, information regarding a power ratio between a reference signal and a data signal channel in the second cell, and information regarding a transmission mode in the second cell.

6. The terminal apparatus according to claim 5, wherein the assistance information further includes information regarding a power ratio between a first data signal channel and a second data signal channel in the second cell.

7. The terminal apparatus according to claim 5, wherein the assistance information includes information that the base station apparatus received from another base station apparatus.

8. The terminal apparatus according to claim 5, wherein
the transmission circuitry transmits User Equipment (UE) capability information to the base station apparatus; and
the UE capability information includes information that the terminal apparatus has a capability to cancel or suppress an interference.

9. A method performed by a terminal apparatus, the method comprising:
receiving, from a base station apparatus, assistance information by using a Physical Downlink Shared CHannel (PDSCH) in a first cell; wherein
the assistance information is capable of being used to suppress an interference from a second cell;
the second cell is a neighbor cell of the first cell; and
the assistance information includes at least a cell ID of the second cell, information regarding a power ratio between a reference signal and a data signal channel in the second cell, and information regarding a transmission mode in the second cell.

10. The method according to claim 9, wherein the assistance information further includes information regarding a power ratio between a first data signal channel and a second data signal channel in the second cell.

11. The method according to claim 9, wherein the assistance information includes information that the base station apparatus received from another base station apparatus.

12. The method according to claim 9, further comprising:
transmitting User Equipment (UE) capability information to the base station apparatus before receiving the assistance information from the base station apparatus; wherein the UE capability information includes information that the terminal apparatus has a capability to cancel or suppress an interference.

13. The base station apparatus according to claim 1, wherein the assistance information further includes information regarding a duplex scheme.

14. The terminal apparatus according to claim 5, wherein the assistance information further includes information regarding a duplex scheme.

15. The method according to claim 9, wherein the assistance information further includes information regarding a duplex scheme.

* * * * *